(12) United States Patent
Forouzanfar

(10) Patent No.: US 12,480,479 B2
(45) Date of Patent: Nov. 25, 2025

(54) HEAT ENGINE

(71) Applicant: ProEnviroEnergy Inc., Kitchener (CA)

(72) Inventor: Sepehr Forouzanfar, Kitchener (CA)

( * ) Notice: Subject to any disclaimer, the term of this patent is extended or adjusted under 35 U.S.C. 154(b) by 0 days.

(21) Appl. No.: 18/530,362

(22) PCT Filed: May 12, 2023

(86) PCT No.: PCT/CA2023/050661
§ 371 (c)(1),
(2) Date: Dec. 6, 2023

(87) PCT Pub. No.: WO2023/220813
PCT Pub. Date: Nov. 23, 2023

(65) Prior Publication Data
US 2025/0075684 A1   Mar. 6, 2025

Related U.S. Application Data

(60) Provisional application No. 63/371,259, filed on Aug. 12, 2022, provisional application No. 63/364,805, filed on May 17, 2022.

(51) Int. Cl.
*F03G 7/06*   (2006.01)
*F01B 23/10*   (2006.01)
*F01B 25/02*   (2006.01)

(52) U.S. Cl.
CPC .......... *F03G 7/06114* (2021.08); *F01B 23/10* (2013.01); *F01B 25/02* (2013.01)

(58) Field of Classification Search
CPC ....... F03G 7/06114; F01B 23/10; F01B 25/02
See application file for complete search history.

(56) References Cited

U.S. PATENT DOCUMENTS

| | | | |
|---|---|---|---|
| 4,055,955 A * | 11/1977 | Johnson | F03G 7/065 60/527 |
| 4,150,544 A * | 4/1979 | Pachter | F03G 7/0641 60/527 |
| 4,341,075 A | 7/1982 | Backlund | |

(Continued)

OTHER PUBLICATIONS

"The Amateur Scientist". Scientific American, Apr. 1971 (Apr. 1971), vol. 224, Issue 4, pp. 118-122 (Year: 1971).*

(Continued)

*Primary Examiner* — Shafiq Mian
(74) *Attorney, Agent, or Firm* — Santosh K. Chari; CPST Intellectual Property Inc.

(57) ABSTRACT

A heat engine is provided. The heat engine includes a chassis, a work output member, and an operating mechanism for operating the work output member. The chassis supports one or more heat engine components, including the work output member. The work output member is adapted to generate and output mechanical power to an electric power generation system for generating electrical power. The operating mechanism includes a first actuator band array and a second actuator band array connected to displace the work output member in a first direction and a second direction, respectively, in response to heat exposure. A heat switching mechanism is operable to cyclically expose each of the first and second actuator band array to heat to cause cyclic displacement of the work output member in the first and second direction for generating the mechanical power.

41 Claims, 59 Drawing Sheets

(56) References Cited

U.S. PATENT DOCUMENTS

| | | | |
|---|---|---|---|
| 5,390,763 | A | 2/1995 | Liedtke |
| 9,236,556 | B2 * | 1/2016 | Ma et al. |
| 9,404,392 | B2 * | 8/2016 | Kare .................... H02K 7/1823 |
| 9,488,128 | B2 | 11/2016 | Sparkman |
| 10,072,638 | B2 | 9/2018 | McKay et al. |
| 10,615,720 | B2 | 4/2020 | Yang et al. |
| 10,824,177 | B2 | 11/2020 | Butcka |
| 11,149,720 | B2 | 10/2021 | Li et al. |
| 11,181,100 | B2 | 11/2021 | Kaneko et al. |
| 2014/0150419 | A1 | 6/2014 | Godwin |
| 2016/0186615 | A1 * | 6/2016 | Kare ....................... F01D 15/10 |
| | | | 60/670 |
| 2017/0314539 | A1 | 11/2017 | Kim et al. |

OTHER PUBLICATIONS

Strong, C.L., The Amateur Scientist, Scientific American, Apr. 1971, vol. 224, pp. 118-122.

Braun, M., Effect of Temperature on Stretched Rubber Bands, Journal of Applied Physics, 1937, vol. 8, Issue 2, pp. 138-141.

\* cited by examiner

HEAT ENGINE

CROSS REFERENCE TO PRIOR APPLICATIONS

The present application is a national entry of PCT Application No. PCT/CA2023/050661, which claims priority from U.S. Patent Application No. 63/364,805, filed May 17, 2022, and U.S. Patent Application No. 63/371,259, filed Aug. 12, 2022. The contents of these prior applications are incorporated herein by reference as if set forth in their entirety.

TECHNICAL FIELD

The present disclosure generally relates to heat engines, and more particularly, to heat engines operable with low temperature sources and/or at low temperature differences, for example, between natural environments, or between a natural environment and a waste heat source.

BACKGROUND

The concerns for global warming and the need to address these concerns has led to significant changes of policies all around the world, especially in the developed countries, to lower the use of fossil fuels for energy requirements. Although fossil fuels are abundantly available and still address a major part of the global energy requirements, the interest towards utilizing alternative energy resources, having lower environmental impact, has been ever evolving. Some examples of alternative energy resources include nuclear energy and known technologies using wind power and/or solar energy. However, these technologies pose significant limitations that prevent them from being widely used. For example, nuclear power plants have significant installation risks and environmental side effects from the radioactive waste pollutions. Further, while use of renewable energy resources such as in solar power systems or wind energy power plants have the advantage of not polluting the environment and not contributing to global warming, they still pose significant limitations compared to fossil fuels; for example, higher costs, irregular nature, and their availability dependence on the geographic locations. Therefore, much research is targeted towards addressing these needs for lowering the use of fossil fuels and exploring the potential ways for increasing the feasibility, and decreasing the cost of investment associated with using the natural or renewable energy resources. Additionally, it is desired to have these potential solutions also contribute to the solution for global warming at the same time.

Another example of natural energy resources can be the great storage of thermal energy that exists in the environment, i.e., air, water, and land. However, the low temperature difference between these thermal energy storages limits their use in addressing the energy requirements. Most of the conventional methods used for electrical power generation from thermal energy require significantly high temperatures of a working fluid to work, for example, enough sudden gas expansion to make a usable mechanical move for electric power generation, which is the functional principle for gas turbines, steam power plants, and other combustion engine types that are used for electrical power generation. Alternatively, the use of heat pipes as efficient heat transfer mechanism compared to other conventional ways of heat exchanging systems have been known and used for decades. Generally, heat pipes are known for use in waste heat recovery and have been employed in some practical applications, however, the low temperature waste heat exchanged by heat pipes has not yet been usable for electric power generation.

Some systems for using natural resources for generating power have been developed. For example, US Patent publication No. 2017/0314539 describes a rotation-type actuator including a fiber having a twisted structure that rotates continuously in response to a temperature fluctuation to convert heat energy, which has been wasted in surrounding environments, into mechanical energy which is then used to generate electric power. U.S. Pat. No. 4,341,075 describes a method and a device for converting low temperature heat energy into mechanical or electrical energy, wherein at least one liquid or gas chamber performs work in response to temperature variations. U.S. Pat. No. 10,615,720 describes a power generator including a deformation unit and a piezoelectric unit. The deformation unit is coupled to the piezoelectric unit and comprises a conductive polymer, which is configured to deform upon contacting moisture to thereby apply a mechanical force to the piezoelectric unit to in turn generate electricity. U.S. Pat. No. 10,072,638 describes a device for harvesting thermal energy using pulsed heat. Further, U.S. Pat. No. 9,488,128 describes a type of thermal torque engine that employs a hot box heated by a thermal agent and a wheel having a plurality of peripherally mounted canisters with diametrically opposed canisters connected by a conduit. By alternatively exposing the opposing canisters to heat, which occurs as the result of the movement of the pressurized refrigerant to opposing canisters, the change of balance due to movement of refrigerant weight, creates a torque to move the wheel. US Patent Publication No. 2014/0150419 describes an engine having a plurality of movable masses (e.g., fluid contained in and movable between vessels) that are coupled to and arranged about a shaft. When subject to a pressure differential, mass moves to a higher vessel thereby increasing its potential energy and producing a gravitational moment that encourages rotation of the plurality of masses in a particular direction.

There still exists a need for a system that overcomes at least one of the deficiencies known in the art, such as a system that can efficiently utilize low temperature heat and/or low temperature differences existing in natural thermal storages to generate electric power for small as well as large scale applications.

SUMMARY

In one aspect, a heat engine is provided. The heat engine includes a chassis for supporting one or more heat engine components. The heat engine further includes a work output member supported on the chassis and adapted to generate and output mechanical power to an electric power generation system for generating electrical power. The heat engine also includes an operating mechanism coupled to and adapted to operate the work output member for generating the mechanical power. The operating mechanism includes a first actuator band array operatively connected to the work output member and adapted to displace the work output member in a first direction in response to heat exposure. The operating mechanism also includes a second actuator band array operatively connected to the work output member and adapted to displace the work output in a second direction in response to heat exposure. Further, the operating mechanism includes a heat switching mechanism that is operable to cyclically expose each of the first and second actuator band arrays to heat, thereby causing cyclic displacement of the work output member in the first and second directions for generating the mechanical power.

In another aspect, a power generation system is provided. The power generation system includes an electric power generation system for generating the electrical power and a heat engine operatively coupled to the electric power generation. The heat engine includes a chassis for supporting one or more heat engine components. The heat engine further includes a work output member supported on the chassis and adapted to generate and output mechanical power to the electric power generation system for generating electrical power. The heat engine also includes an operating mechanism coupled to and adapted to operate the work output member for generating the mechanical power. The operating mechanism includes a first actuator band array operatively connected to the work output member and adapted to displace the work output member in a first direction in response to heat exposure. The operating mechanism also includes a second actuator band array operatively connected to the work output member and adapted to displace the work output in a second direction in response to heat exposure. Further, the operating mechanism includes a heat switching mechanism that is operable to cyclically expose each of the first and second actuator band arrays to heat, thereby causing cyclic displacement of the work output member in the first and second directions for generating the mechanical power.

BRIEF DESCRIPTION OF THE DRAWINGS

Embodiments will now be described with reference to the appended drawings wherein.

DETAILED DESCRIPTION

The present disclosure provides heat engines that are operable by using abundant thermal energy existing in nature, for example, by using the low temperature differences between two adjacent environments, such as that of air, water, or land and/or by using heat from low temperature resources, such as, low temperature waste heat. Thermal energy stored in the environment fluctuates within a few tens of centigrade degrees depending on the geographic location, for example, due to daily and/or seasonal temperature changes, and the heat engines of the present disclosure are able to utilize such temperature changes to generate electric power. Examples of such natural thermal energy resources include, but are not limited to, the temperature difference between water at the bottom of oceans, seas, lakes, etc., and nearby geographic locations that experience below zero temperatures in winters, or the solar thermal energy collected where lands or seas nearby are at lower temperatures, and/or the lands and desserts that experience substantial temperature changes between the day and night, and so on. The thermal energy is converted by the heat engines described herein, to mechanical output required to produce electric power. Moreover, the heat engines according to various example implementations presented herein may be capable of operating to generate electric power from natural resources regardless of the actual temperature of the two adjacent environments, i.e., whether they are too high or too low as long as they are different.

The heat engines described herein not only provide an effective solution for global warming by lowering the temperature of environment (e.g., one of the adjacent environments where the heat engine is implemented) but also reduce the need for fossil fuels. These heat engines provide a cost effective and efficient way of utilizing the thermal energy from ordinary temperature environments and other resources, to generate electrical power, as compared to other conventional systems. Further, the heat engines according to the present disclosure can be implemented in various power generating applications, such as, but not limited to, a renewable power plant, battery charging stations for electric vehicles (EVs), offshore and isolated bases especially, in very hot or very cold locations, and telecommunications posts with minimal to no need for infrastructure. Furthermore, these heat engines can be scaled, for example, to power small or large appliances, vehicles, houses, buildings, and the like, without deviating from the scope of the claimed subject matter. Some example implementations of the heat engines will now be described with reference to the accompanying drawings.

Figure 1:
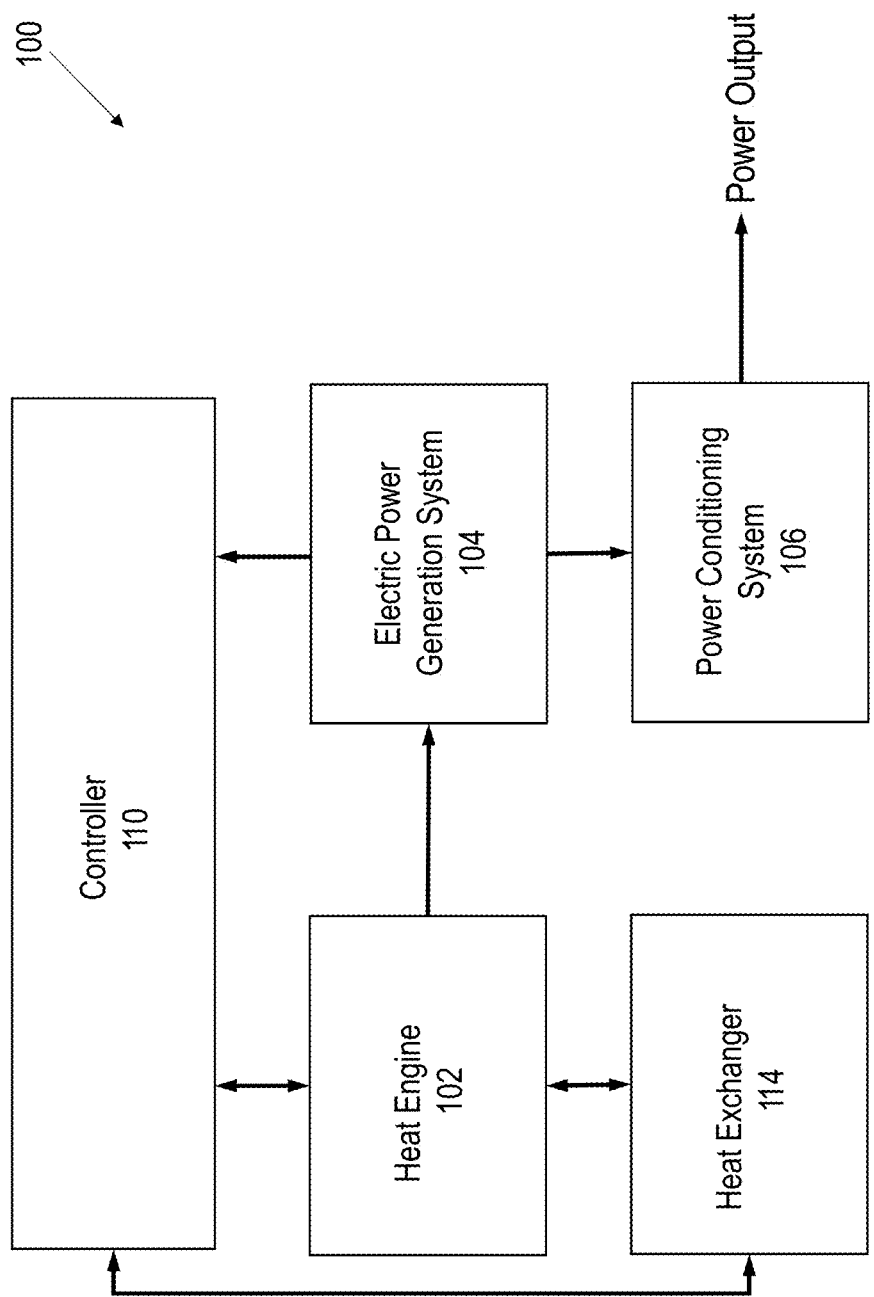
FIG. 1 illustrates a simplified schematic of a power generation system according to an aspect of the present disclosure.
Figure 2:
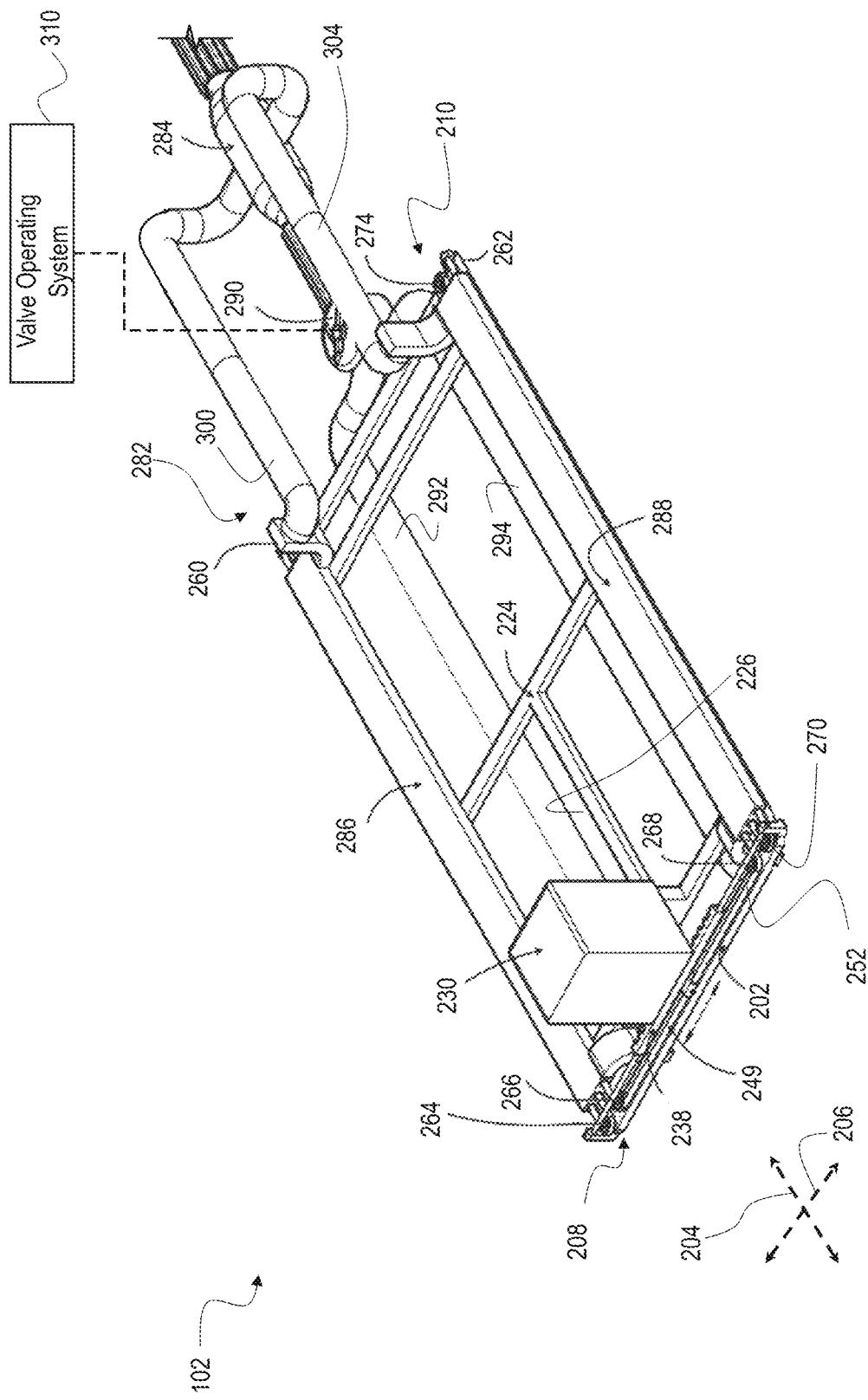
FIGS. 2 through 9 illustrate a heat engine according to a first example implementation of the present disclosure.
Figure 3:
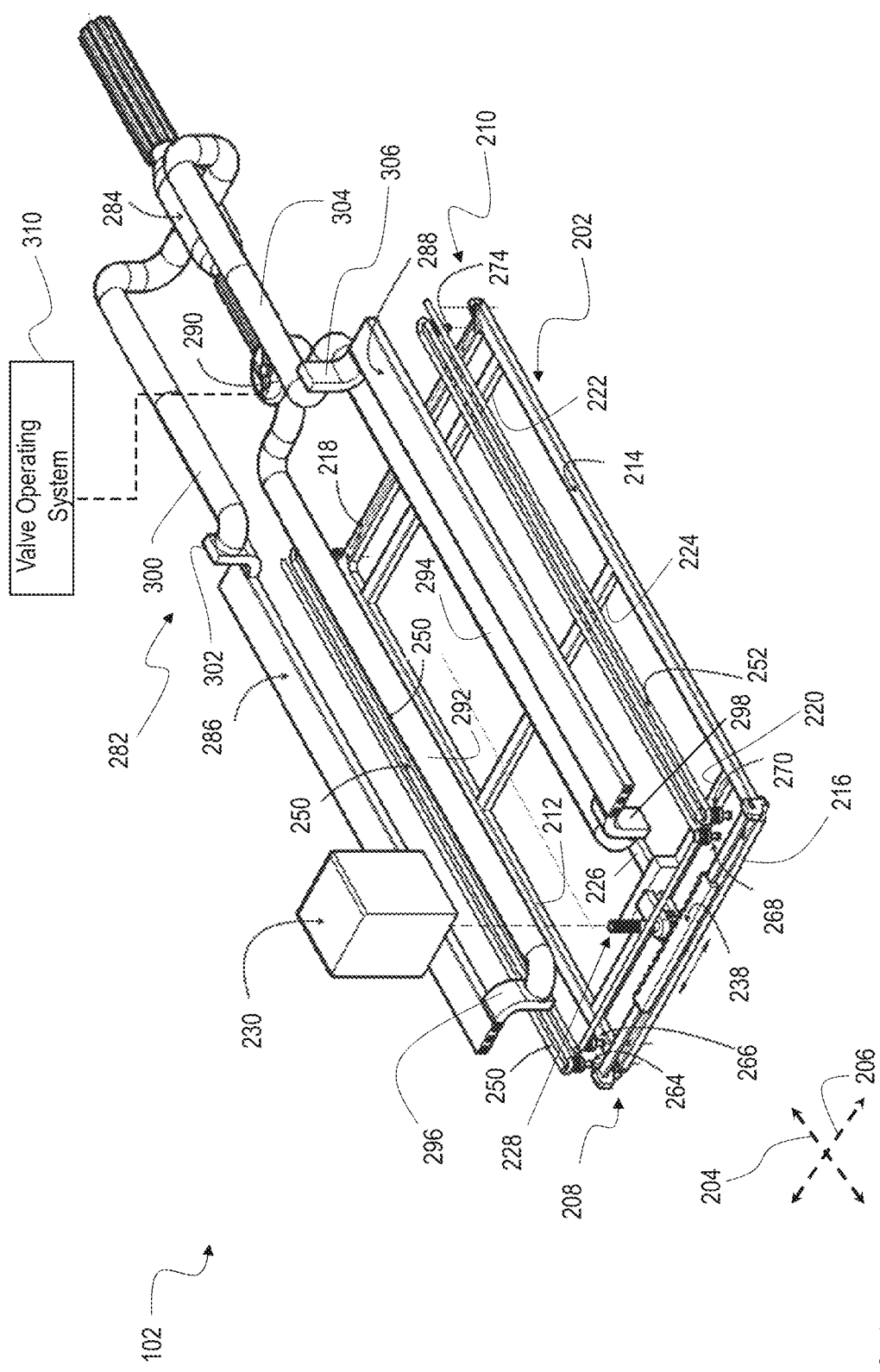

FIG. 1 illustrates a simplified schematic of an example power generation system 100 according to various example implementations of the present disclosure. The power generation system 100 may be configured to generate electric power for powering a facility, such as a house, a building, a remote base, a telecommunication post/tower, an electric vehicle charger, and so on. As illustrated, the power generation system 100 includes a heat engine 102, an electric power generation system 104 that includes an electric power generator, for generating electrical power, a power conditioning system 106, and a heat exchanger 114 connected to and configured to provide thermal energy to the heat engine 102. The power generation system 100 may also include a controller 110 for operating one or more components of the power generation system 100, such as the heat engine 102 and the heat exchanger 114, based on one or more data signals received from, for example, the heat engine 102, the heat exchanger 114, and the electric power generation system 104. The data signals may include, for instance, temperature, flow, pressure data signals, or the like, which may be utilized by the controller 110 to control operations of the one more components of the power generation system 100. It will be appreciated that in various implementations, the controller 110 may include additional instrumentation and control systems for controlling operations of other components of the power generation system 100.

The heat engine 102 may be a device that can convert heat or thermal energy received from a thermal energy source via the heat exchanger 114 into useful work and provide a mechanical output (e.g., by means of a rotating or oscillating member) that can drive mechanical load. The heat engine 102 may include gearboxes, and/or other mechanical mechanisms to condition rotational output of the heat engine 102 required for electric power generation. In various implementations, the thermal energy source (hereinafter referred to as the heat source) may be any low temperature source, including but not limited to, low temperature waste heat from a power plant, or may be a natural thermal storage source, such as the environmental thermal energy gradient between two or more adjacent or nearby geographic locations, or solar energy, geothermal energy, or other types of available sources of heat, for example, waste heat or thermal energy from other commercial or industrial processes. In some examples, solar thermal energy, such as that collected in vacuum glass tubes commonly used in solar water heaters or solar chillers, or collected by mirror-wise collectors, or any other collecting means, may also be effectively utilized to operate the heat engine(s) 102 described herein. It may be appreciated that although the present disclosure is provided with respect to heat engines that can operate at low temperature gradients and environments, the concepts presented herein may similarly be implemented to utilize high temperature sources as well, without deviating from the scope of the claimed subject matter.

The electric power generation system 104 may be a device or a system that can convert mechanical power (received from the heat engine 102) into electric power. The electric power generation system 104 may include conventional (commutated electro-magnetic) generators, alternators, piezoelectric generators, etc. In some examples, the electric power generation system 104 may be a generator and may also include any associated apparatus with the generator, such as bearings, thermal management/cooling systems, transformer(s), alternating current (AC)—direct current (DC) inverter/converter, DC-DC converter, control electronics, couplings, gears/gearing, clutches, transmissions, etc.

The output from the electric power generation system 104 may be fed to the power conditioning system 106 for converting the generated electric power into a suitable form as required according to the end application. In various implementations, the power conditioning system 106 may include AC and/or DC converters, transformers for increasing or decreasing voltages, and so on, to make the power output from the electric power generation system 104 suitable according to the requirements of the end application. For example, the power conditioning system 106 may be configured to commission or modify the generated electric power output from the generator, e.g., rectifying or inverting, or changing voltage for use as a charging station, or for connecting the power plant to the grid.

In some implementations, the controller 110 may include operable connections to various sensors and systems of the power generation system 100, and may be configured to receive information about one or more operating parameters thereof, such as temperature, pressure, frequency, voltage, current, and the like, or position of one or more actuators, and send commands to various actuators and systems through the connections to operate, for example, the heat engine 102 and the heat exchanger 114. Although a single controller is illustrated, it will be appreciated that the power generation system 100 may include multiple controllers, for instance, separate controllers for controlling the operations of, for example, the heat engine 102, the heat exchanger 114, the electric power generation system 104, and so on. In some implementations, the controller 110 may be embodied as a computing device (e.g., a computer) having a single microprocessor or multiple microprocessors, computer memory (e.g., non-transitory computer-readable medium), and other components configured to receive inputs from the sensors and/or other components of the heat engine 102, the heat exchanger 114, and the electric power generating system 104, and generate output signals based on the inputs. For example, such a controller may include a memory, a secondary storage device, a clock, and a processing hardware for accomplishing a task consistent with the present disclosure.

Referring now to FIGS. 2 through 9, an example of the heat engine 102 according to an implementation is described. The heat engine 102 includes an engine chassis 202 having a longitudinal axis 204 and a lateral axis 206. The engine chassis 202 supports one or more heat engine components, including but not limited to the ones described herein. As shown more clearly in FIG. 3, the engine chassis 202 may be embodied as a rectangular chassis frame having a first longitudinal end 208 and a second longitudinal end 210 longitudinally opposite to the first longitudinal end 208 along the longitudinal axis 204. The chassis 202 may include a first longitudinal arm 212 and a second longitudinal arm 214 extending along the longitudinal axis 204, and a first lateral arm 216 and a second lateral arm 218 disposed at the opposite longitudinal ends of the chassis 202 and extending laterally between the first longitudinal arm and the second longitudinal arm 214 along the lateral axis 206. In some implementations, the chassis 202 may also include a third lateral arm 220 disposed proximal to the first lateral arm 216, a fourth lateral arm 222 disposed proximal to second lateral arm 218, and a fifth lateral arm 224 disposed between the third lateral arm 220 and the fourth lateral arm 222, for example, laterally extending in the center of the chassis 202. Furthermore, a longitudinal support arm 226 may extend longitudinally between the fifth lateral arm 224 and the third lateral arm 220. The structural configuration of the chassis 202 is merely an example, and it may be appreciated that any other form, shape, and structure of the chassis 202 may alternatively be implemented to achieve similar results.

In an implementation, the heat engine 102 includes a work output member, such as an output shaft 228 mounted on one longitudinal end, e.g., the first longitudinal end 208 of the chassis 202. The heat engine 102 may be configured to convert thermal energy into mechanical work, for example, by rotating the output shaft 228. Rotation of the output shaft 228 may serve as an input to the electric power generation system 104 via a gear box 230, wherein the electric power generation system 104 converts the received input mechanical rotational power into electrical power. For example, the gear box 230 may include one or more components for performing a number of functionalities, including but not limited to, increasing the speed of the rotations of the output shaft 228, and/or converting the rotations of the output shaft 228 into suitable input rotational power (e.g., bidirectional rotations into unidirectional rotations) for the electric power generation system 104, and transfer the rotational power via an exit shaft (not shown) to a conductor shaft or rotor (not shown) of the electric power generation system 104 to generate electrical power by known mechanisms.

The heat engine 102 further includes an operating mechanism coupled to, and configured to operate the work output member, i.e., the output shaft 228 in this example, for generating the mechanical rotational power. As shown more clearly in FIGS. 4 and 7, in some implementations, the output shaft 228 may be mounted on a mounting assembly 232 coupled to and between the first lateral arm 216 and the third lateral arm 220 and to the longitudinal support arm 226 of the chassis 202. The mounting assembly 232 includes a mounting wall 233 coupled to the third lateral arm 220 and the longitudinal support arm 226. Further, a mounting base member 234 and a mounting top member 236, including bearings to support the output shaft 228 therein, extend longitudinally between the first lateral arm 216 and the third lateral arm and are coupled to the mounting wall 233. The mounting assembly 232 may further support a gear assembly 238 for operating, in this example rotating, the output shaft 228. In an implementation, the gear assembly 238 may be a rack and pinion gear assembly, having a linear rack gear 240 meshed or engaged with a circular or pinion gear 242, such that the linear movement of the rack gear 240 causes rotation of the pinion gear 242, which in turn rotates the output shaft 228. The linear rack gear 240 may be supported on a guiding bar 244 that extends laterally along the length of the first lateral arm 216. The linear rack gear 240 may include an elongated through receptacle (not shown) that allows the guiding bar 244 to pass therethrough and mount the gear 240 thereon. As illustrated, the guiding bar 244 may be secured on each end to the first longitudinal arm 212 and the second longitudinal arm 214 via securing mechanisms 246 and 248, respectively. The guiding bar 244 may be adapted to provide smooth linear movement confinement and guiding for the rack gear 240 during operation. It will be appreciated that the gear assembly 238 and its components are merely examples and that other arrangements may be used to achieve similar results without deviating from the claimed subject matter.

Further, as part of the operating mechanism, the heat engine 102 may further include an actuation mechanism 249 having one or more actuation components that are configured to operate the work output member by displacing the work output member when exposed to heat. To this end, the actuation mechanism 249 may include a first actuator band array 250 (the first actuation component) and a second actuator band array 252 (the second actuation component) configured to drive the rack gear 240 in a first direction (shown by arrowhead D1) and an opposite second direction (shown by arrowhead D2) on the guiding bar 244. In one implementation, each of the first actuator band array 250 and the second actuator band array 252 includes a single actuator band (thus, hereinafter referred to as the first and second actuator bands 250 and 252) that is made of a material that has a high thermal expansion or contraction coefficient. As will be understood, thermal expansion coefficient represents a tendency of a material to change (or increase), for example, their dimension, shape, area, volume, and/or density in response to a change in temperature. Similarly, thermal contraction coefficient represents the tendency of a material to change (or decrease) their dimension, shape, area, volume, and/or density, etc., in response to a change in temperature. Therefore, a high thermal expansion or contraction coefficient may correspond to a higher tendency of a material to change their dimensions in response to an even low temperature change, for example, caused by ordinary temperature thermal energy sources. Thus, when exposed to a change in temperature, the actuator bands 250, 252 either expand or contract to change their respective lengths, thereby exerting a push/pull force on the linear rack gear 240, which in turn displaces the gear 240 in either the first direction D1 or the second direction D2, as will be explained later in the following description. An alternating cyclic displacement of the linear rack gear 240 in the first direction D1 and the second direction D2 in turn causes bi-lateral rotations of the work output member, e.g., the output shaft 228. In an example implementation, the actuator bands 250, 252 may be embodied as stretched rubber bands, i.e., rubber bands in stretched configuration that experience significant contraction in response to temperature increase and significant expansion in response to temperature decrease and/or when the heat is removed. Further, in some implementations, the gear box 230 may include one or more components (not shown) that convert these bi-lateral rotations into uni-lateral rotations, increase speed of the rotations to a level required by the electric power generation system 104 for generating electric power, and transmit these output rotational power to the generator assembly via the exit shaft.

Figure 5:
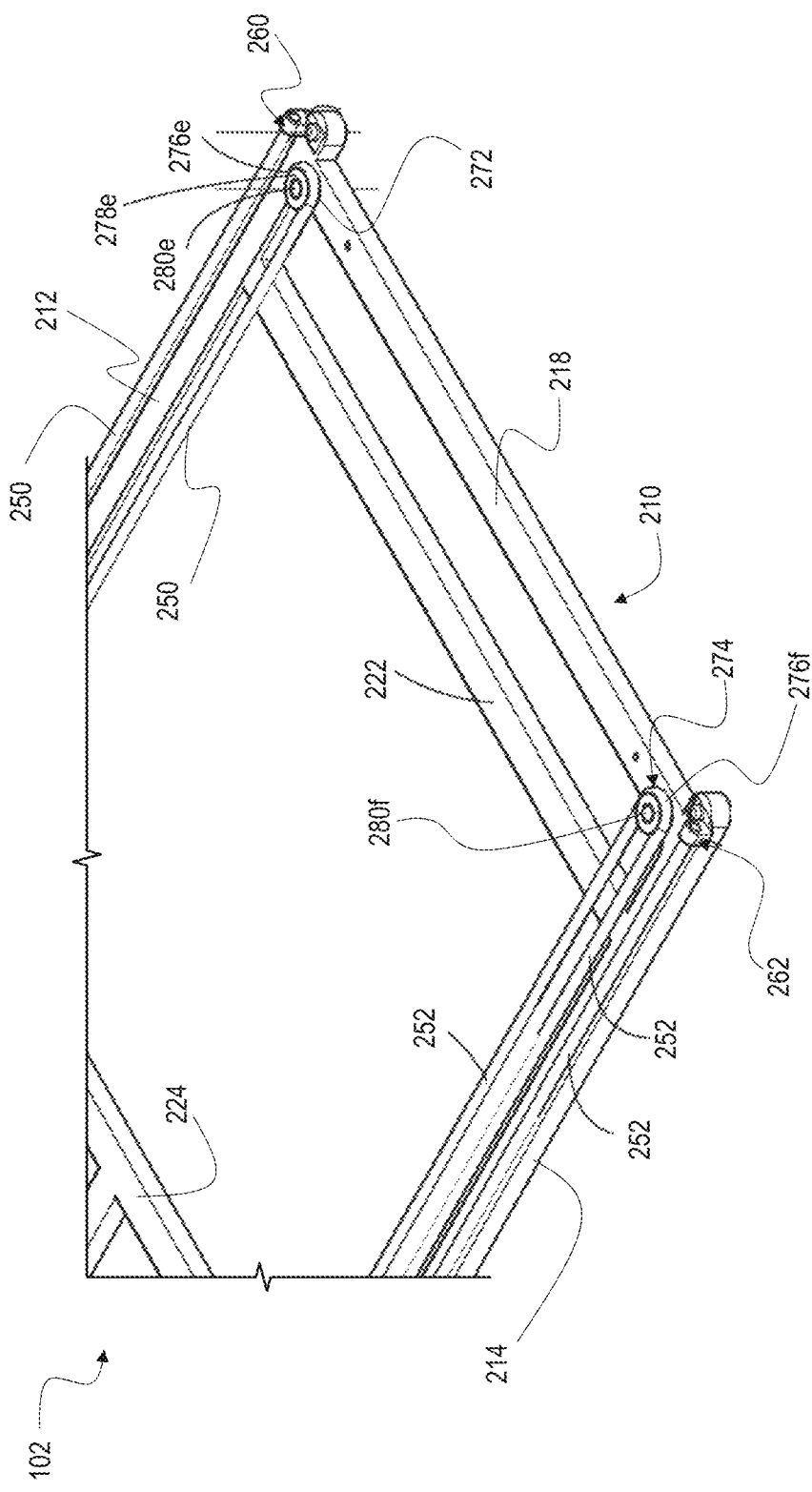
Figure 6:
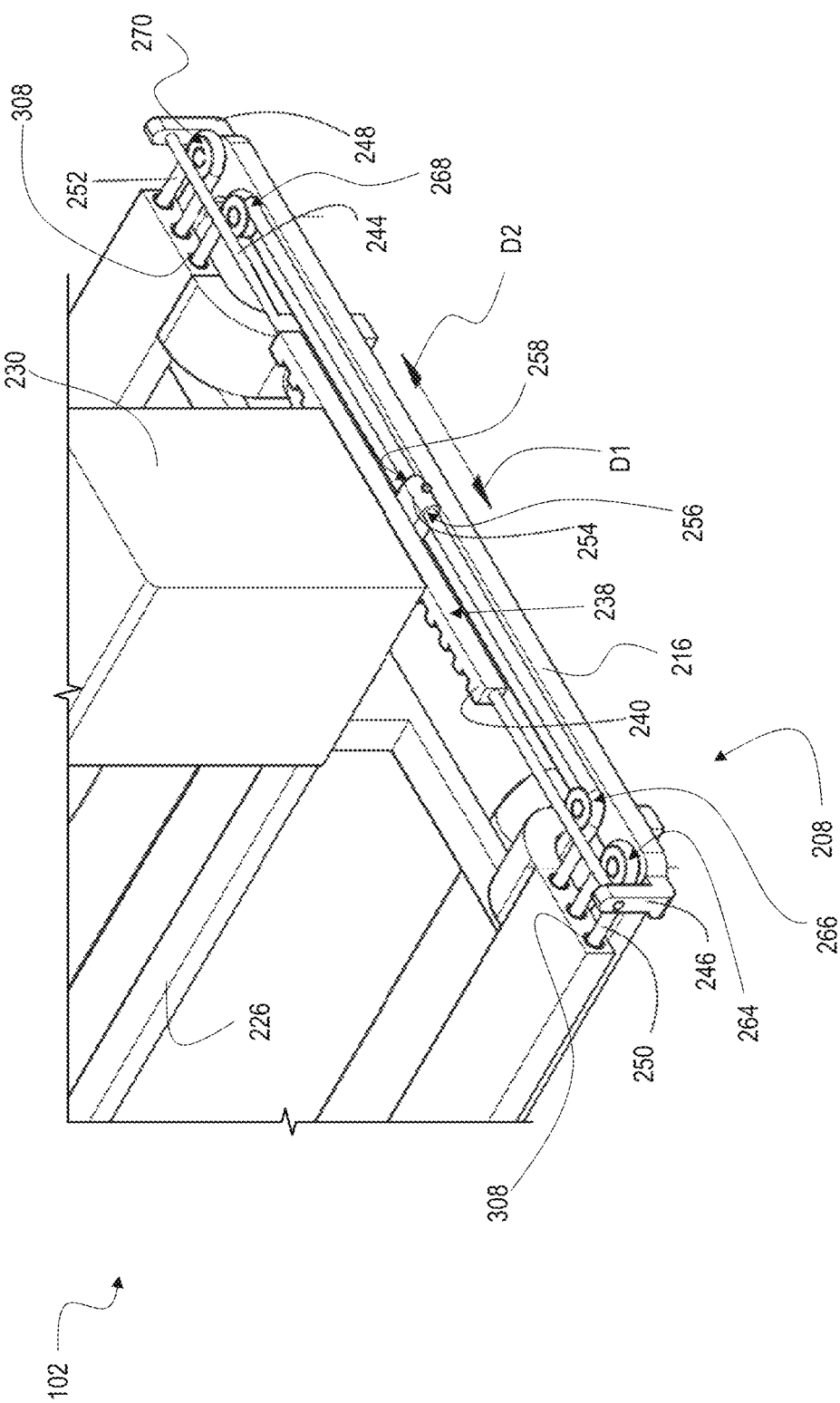
Figure 7:
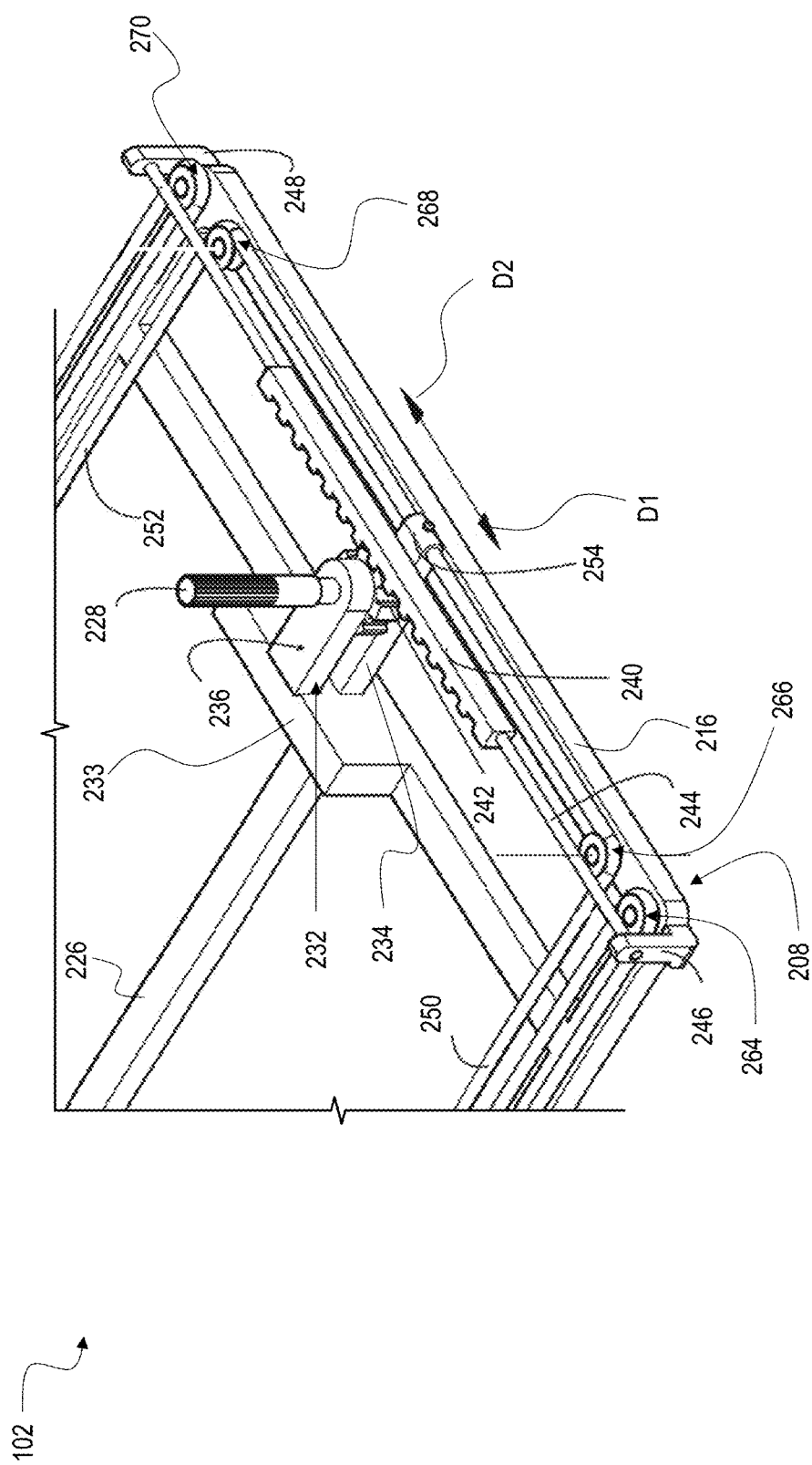

In the illustrated implementation (shown more clearly in FIGS. 6 and 7), the linear rack gear 240 includes a band mounting member 254 having a first end 256 and a second end 258 adapted to receive and secure one end of each of the first actuator band 250 and the second actuator band 252, respectively, thereto. The band mounting member 254 may, in some implementations, be formed integrally with the linear rack gear 240, whereas, in some alternative implementations, may be a separate component coupled to the linear rack gear 240. The band mounting member 254 may include receiving holes on each of the first end 256 and the second end 258 to receive and secure the first end of the respective one of the first and second actuator bands 250, 252, therein. Further, in an implementation, the second end of each of the first actuator band 250 and the second actuator band 252 is configured to be secured to the chassis 202 using a fastening member, such as a bush. For example, as shown in FIG. 5, the second end of first actuator band 250 is secured at the second longitudinal end 210 to the end of the first longitudinal arm 212 proximal or adjacent to the second lateral arm 218 of the chassis 202 by a bush 260. Similarly, the second end of the second actuator band 252 is secured at the second longitudinal end 210 to the end of the second longitudinal arm 214 adjacent to the second lateral arm 218 of the chassis 202 by a bush 262.

In order to have an appreciable change in length of the bands 250, 252, and hence an appreciable displacement force exerted on the gear 240, a length and/or cross-section of the bands 250, 252, to be exposed to the temperature change may be selected in accordance with the expansion/contraction percentage of a given length of the material in response to the temperature change. Thus, for a material having a high thermal expansion/contraction coefficient, higher the length of band exposed to temperature change (i.e., heat in this example), higher the change in length and hence, higher the displacement provided for the gear 240. Therefore, a length and/or cross-section of the bands 250, 252 to be exposed to the temperature change may be kept smaller for small scale applications than the length for larger scale applications, and may accordingly be changed to achieve similar results.

In some implementations, the actuator bands 250, 252 may be configured to extend between the longitudinal ends 208, 210 of the chassis 202 and along the entire length of the longitudinal arms 212, 214 in one or more suitable configurations to have a desired length that is to be exposed to heat. For example, as shown in the illustrated implementation, the actuator bands 250, 252 may linearly extend to cover the length of the respective longitudinal arms 212, 214 three times in an S-shaped configuration. However, the bands 250, 252 may be positioned in any other configuration along the length of the longitudinal arms 212, 214 to achieve similar results.

Figure 4:
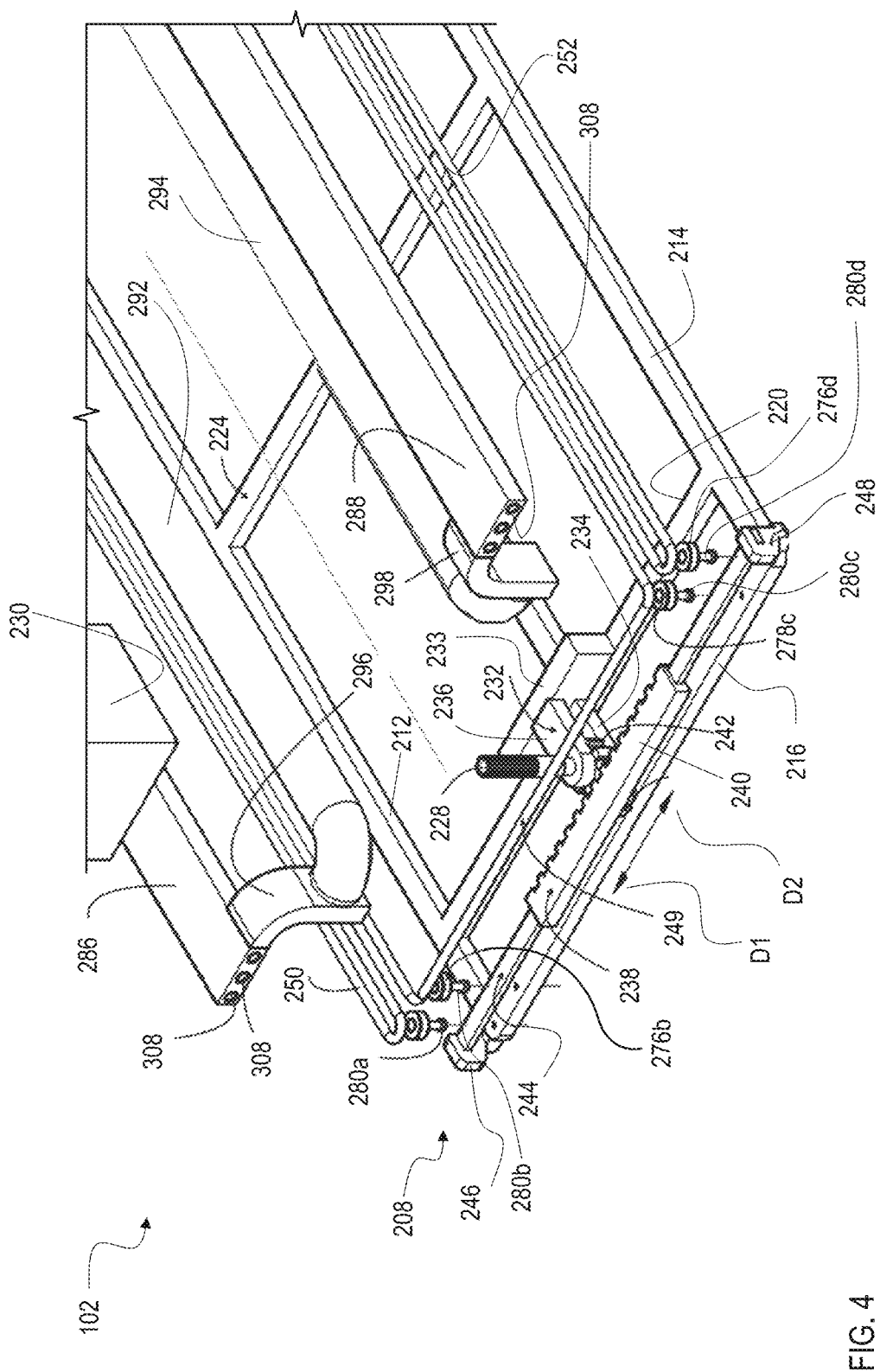

To support the bands 250, 252, the chassis 202 may support a number of band contacting assemblies mounted at various locations on the chassis 202 to facilitate extending the actuator bands 250, 252 along the lengths of the longitudinal arms 212, 214. For example, in the illustrated implementation, the chassis 202 may support six band contacting assemblies 264, 266, 268, 270, 272, 274 to facilitate extending the bands 250, 252 between the band mounting member 254 and the bushes 260, 262. As illustrated, two band contacting assemblies, such as the first assembly 264 and the second assembly 266 may be configured to support the first actuator band 250 at the first longitudinal end 208 and may be connected to the first lateral arm 216 adjacent to the first longitudinal arm 212. Similarly, two band contacting assemblies, such as the third assembly 268 and the fourth assembly 270 may be configured to support the second actuator band 252 at the first longitudinal end 208 and may be connected to the first lateral arm 216 adjacent to the second longitudinal arm 214. Further, one band contact assembly, such as the fifth assembly 272 is configured to support the first actuator band 250 at the second longitudinal end 210 and may be mounted on the second lateral arm 218 adjacent to the first longitudinal arm 212. Finally, one assembly, such as the sixth assembly 274 is configured to support the second actuator band 252 at the second longitudinal end 210 and may be mounted on the second lateral arm 218 adjacent to the second longitudinal arm 214. As shown in FIGS. 4 and 5, each of the assemblies 264 to 274 include a respective free rotating pulley, such as pulleys 276a to 276f collectively referred to as the pulleys 276, mounted on respective free running ordinary bearings, such as bearings 278a to 278f collectively referred to as the bearings 278, which in turn are mounted on respective shafts, such as shafts 280a to 280f collectively referred to as the shafts 280, fixed to the chassis 202, as illustrated. It will be appreciated that the number and positions of these assemblies 264 to 274 are also merely exemplary and may be varied to achieve similar results.

The first and the second actuating bands 250, 252 may be configured to be supported on these band contacting assemblies 264 to 274 such that these assemblies allow for accommodating the change of length of the bands 250, 252 when they are exposed to change in temperature, in this example heat, and exerting a force on the rack gear 240 during operation. For example, when the actuator bands 250, 252 are exposed to heat and change their lengths (by contracting or expanding), they produce a bilateral force acting on both their ends, which in turn creates a torque on the respective pulleys 276 in each of the six assemblies 264 to 274. Further, since one end of the bands 250, 252 is fixed to the chassis 202, the pulleys 276 transfer the added forces to pull the other end of the bands 250, 252 connected to the gear assembly 238 and displace the gear 240 in corresponding one of the directions D1 and D2.

As described above, in an example implementation, the first actuator band 250 as well as the second actuator band 252 may be stretched elastomer bands, such as stretched rubber bands, that are secured at one end to the band mounting member 254 of the gear assembly 238 and are secured at their respective second ends to the chassis 202 while also being supported on the respective band contacting assemblies 264 to 274, as explained above. Due to their high thermal contraction coefficient, these stretched elastomer actuator bands 250, 252 contract to change their respective lengths when exposed to thermal energy, thereby exerting a pull force to displace the gear 240 in the first direction D1 (i.e., towards the first longitudinal arm 212) and the opposite second direction D2 (i.e., towards the second longitudinal arm 214), respectively. According to various alternative implementations, the actuator bands 250, 252, may be made of other similar elastomers, including but not limited to, silicone-based rubber, polyurethane, styrene-butadiene copolymer, natural rubber, and/or any other material that has large thermal expansion or contraction coefficient. Further, the actuator bands 250, 252 may be used in many different shapes and configurations, such as, but not limited to, bands with circular, rectangular, or other types of cross-sectional profiles. In some other implementations, long pieces of flat sheets, or shape of long tubes, and/or any other tubular construction of actuator bands 250, 252 may be implemented to achieve similar results. Furthermore, although two actuator bands are shown and described in this implementation, it will be appreciated that the heat engine 102 may include any number of actuator bands as required and suited for the end applications.

The heat engine 102 may further be connected to the heat exchanger 114 for receiving thermal energy and exposing the first and second actuator bands 250, 252 to the thermal energy or heat. In an example implementation, the heat exchanger 114 may be embodied as a heat pipe 282 configured to expose the actuator bands 250, 252 to heat. As will be appreciated, the heat pipe is a two-phase heat transfer device which uses latent heat of fluids to transfer thermal energy from one place (e.g., an evaporator section) to another (e.g., a condenser section) by means of simultaneous evaporation and condensation in a sealed container. In one example implementation, such as the one illustrated herein, the heat pipe may be a thermosyphon, whereas in other alternative implementations, the heat pipe may be a wick heat pipe, or any other type of heat pipe known in the art. In yet other implementations, the heat engine 102 may utilize any other type of heat exchanging mechanism, including but not limited to, radiation, conduction, and convention, to transfer thermal energy to the first and second actuator bands 250, 252.

As illustrated, the heat exchanger or the heat pipe 282 includes a first heat exchanger section 284, for example, an evaporator section (hereinafter referred to as the evaporator section 284) having a working fluid therein to receive heat or thermal energy from a heat source. The heat pipe 282 further includes a second heat exchanger section 286, for example, a condenser section (hereinafter referred to as the first condenser section 286) and a third heat exchanger section 288, also a condenser section (hereinafter referred to as the second condenser section 288), positioned downstream of the first heat exchanger section 284 and fluidly connected to the first heat exchanger section 284 via a heat switching mechanism 290. As shown in the illustrated example, the first and second condenser sections 286, 288 may be positioned along the first longitudinal arm 212 and the second longitudinal arm 214, respectively. Although the heat pipe 282 is shown and described to include only two condenser sections, it may be appreciated that the heat pipe can have any number of condenser sections as may be required according to the end applications. During operation, the working fluid in liquid state absorbs heat in the first heat exchanger section or the evaporator section 284 and is converted into pressurized vapor state. The vaporized heated working fluid then moves to the condenser sections 286, 288 where it rejects heat and condenses back into liquid. To facilitate faster condensation of the vaporized working fluid, the condenser sections 286, 288 may be kept non-insulated or partially insulated from outside. The condensed working fluid is then returned to the evaporator section 284 to repeat the process. In some examples, a thermosyphon type of heat pipe 282 may be usable or even preferred where an environment, in which the condenser sections 286, 288 are positioned, is disposed at a height greater than a height of the environment where the evaporator section 284 is placed, thereby having the heat pipe 282 oriented in a manner such that the gravity assists in fast return of the heated working fluid from the condenser sections 286, 288 back to the evaporator section 284. Examples of the working fluid may include, but are not limited to, water, carbon-dioxide, ammonia, nitrogen, or any other fluid suitable for operating the heat pipe 282. In some implementations, the heat pipe 282 may be a low temperature heat pipe that may be configured to use a working fluid that has low boiling point, such as ammonia. However, any other working fluid may alternatively be used to achieve similar results. The detailed working of the evaporator section 284 and the condenser sections 286, 288 of the present disclosure will be described later with reference to FIGS. 8 and 9.

The heat pipe 282 may further include a first intermediate section 292 that may be an adiabatic section, configured to be fluidly connected between the first heat exchanger section or the evaporator section 284 and the second heat exchanger section or the first condenser section 286 via the heat switching mechanism 290. Similarly, the heat pipe 282 includes a second intermediate section 294, which is also an adiabatic section, configured to be fluidly connected between the evaporator section 284 and the third heat exchanger section or the second condenser section 288 via the heat switching mechanism 290. Each of the first and second adiabatic sections 292, 294 are placed in colder environment as compared to that of the evaporator section 284 and are kept thermally insulated from outside to convey the vaporized working fluid to the corresponding first and second condenser sections 286, 288.

Further, the first intermediate or the first adiabatic section 292 is fluidly connected to the first condenser section 286 by a first flow connecting member 296, whereas the second intermediate or second adiabatic section 294 is fluidly connected to the second condenser section 288 by a second flow connecting member 298. As more clearly shown in FIG. 9, the condenser sections 286, 288 may be positioned above the respective adiabatic sections 292, 294 and the chassis 202, whereas the adiabatic sections 292, 294 may be positioned under the chassis 202. Thus, the flow connecting members 296, 298 may be disposed in a vertical orientation that may extend perpendicularly to the longitudinal axis 204 of the chassis 202 to connect the adiabatic sections 292, 294 to the respective condenser sections 286, 288. Further, the heat pipe 282 may also include a first fluid return section 300 connected between the first condenser section 286 and the evaporator section 284 via a third flow connecting member 302. Similarly, a second fluid return section 304 may be connected between the second condenser section 288 and the evaporator section 284 via a fourth flow connecting member 306. As shown, the flow connecting members 302, 306 may also be positioned in a vertical position and the fluid return sections 300, 304 may be positioned above the respective condenser sections 286, 288. In some implementations, the flow connecting members 296, 298, 302, and 306 may include one way check valves to permit a one-way flow of the working fluid based on pressure differential during operation. In some implementations, where the colder environment is at a higher height or altitude than the warmer environment, the heat pipe 282 is oriented in a manner such that the flow connecting members 296, 298 may be considered as defining a top portion of the heat pipe 282 and the evaporator section 284 may define a lower portion of the heat pipe 282. Thus, the vaporized working fluid releases heat and flows downward (assisted by gravity) through the corresponding one of the condenser sections 286, 288. As will be appreciated that the entire configuration and arrangement of the various components of the heat pipe 282 described above is merely an example and that other configurations may also be implemented to achieve similar results without deviating from scope of the claimed subject matter.

Further, in some implementations, each of the condenser sections 286, 288 may be hollow polygonal containers, such as hollow rectangular cube shaped containers, including one or more receptacles 308 disposed therein to receive the first and the second actuator bands 250, 252 extending therethrough. For example, the receptacles 308 may be configured to have a cross-sectional profile, for example, a tubular profile, complementing the cross-sectional profiles of the respective actuator bands 250, 252. The receptacles 308 may be configured to extend through the entire length of the respective condenser sections 286, 288, and may be fixed, for example, welded, to the ends of the respective condenser sections 286, 288. Therefore, the portions of the actuator bands 250, 252 that extend within the receptacles 308 are the ones that are exposed to the change in temperature, i.e., the heat that is released by the vaporized working fluid flowing through the respective condenser sections 286, 288. In the illustrated implementation, each of the condenser sections 286, 288 may include three tubular receptacles 308 for receiving the respective actuator bands 250, 252 that are wrapped three times along the length of the respective longitudinal arms 212, 214. In order to have heat conduction to the actuator bands 250, 252, in some implementations, the receptacles 308 may be made of a thermally conductive material, such as copper, while the rest of the condenser sections 286, 288 may be kept partially or non-insulated from outside to allow the colder environment to cool down the condenser sections 286, 288 and consequently the vaporized working fluid flowing therethrough fast enough after the released heat from the vaporized working fluid is absorbed by the actuator bands 250, 252. To this end, the outer body of the condenser sections 286, 288 may be made of aluminum, for example, with half thermal conductivity coefficient compared to the copper body of the receptacles 308. Additionally, the adiabatic sections 292, 294 may be thermally insulated from outside to prevent any heat loss from the vaporized working fluid before it reaches the condenser sections 286, 288. As the heat is released in the condenser sections 286, 288, the condensed working fluid flows back to the evaporator section 284 via the fluid return sections 300, 304. Further, the fluid return sections 300, 304 are not thermally insulated from outside to facilitate return of any non-condensed working fluid also back to the evaporator section 284.

Further, in some implementations, the heat switching mechanism 290 may be a flow control valve, hereinafter referred to as the flow control valve 290, and may be positioned in the evaporator section 284 to control and direct the flow of the heated working fluid therefrom towards either the first condenser section 286 or the second condenser section 288 via the respective adiabatic sections 292, 294. In one example, the flow control valve 290 may be embodied as a directional control valve that selectively allows fluid flow from the evaporator section 284 to one of the condenser sections 286, 288 at a time. Depending on the position of the flow control valve 290, the heated or vaporized working fluid is directed to either the first adiabatic section 292 and the first condenser section 286 (i.e., when the valve 290 is operated to be in a first valve position) or the second adiabatic section 294 and the second condenser section 288 (i.e., when the valve is operated to be in a second valve position). Therefore, position of the flow control valve 290 may be switched alternately and cyclically between the first and second valve positions to alternately and cyclically direct the heated working fluid to each of the first condenser section 286 and the second condenser section 288, thereby cyclically exposing the respective actuator bands 250, 252 to the temperature change or heat. As explained above, since the bands 250, 252 are connected at one end to the chassis 202, the successive contraction or expansion (depending on the material) of the bands 250, 252 in response to cyclic exposure to heat generates a torque on the pulleys 276 that in turn transfer the added forces to pull the gear assembly 238, thereby cyclically displacing the gear assembly 238 in the first and second directions D1, D2 to cause bi-lateral rotations of the output shaft 228.

The flow control valve 290 may be driven and switched between the first and the second valve positions by a valve operating system 310. In some implementations, the valve operating system 310 may be embodied as a mechanical actuation system configured to mechanically operate the flow control valve 290, for example, by a snap mechanism connected to the one or more moving components, e.g., the output shaft 228 of the heat engine 102. In some alternative implementations, the valve operating system 310 may be embodied as a small external power source. In some yet other implementations, the valve operating system 310 may be a part of the controller 110, wherein the controller 110 may be configured to receive data signals from the heat engine 102, the heat pipe 282, and the electric power generation system 106 and may be configured to control the operations of the flow control valve 290 based on the received data signals. As will be appreciated, a mechanical valve operating system 310 may be used for small to medium scale power generating applications whereas for large scale applications, the electric valve operating system 310 may be implemented. However, it will be appreciated that the external electric power generating system may consume much less power compared to the expected power generation capacities of the large-scale power plants.

In some example implementations, the heat engine 102 and the heat pipe 282 may be located at any facility that experiences a temperature difference, such that the evaporator section 284 is placed in an environment having a temperature T1 greater than a temperature T2 of an environment in which the condenser sections 286, 288 and the adiabatic sections 292, 294 are located. In simple words, the evaporator section 284 is placed in a warmer environment whereas the condenser sections 286, 288 and the adiabatic sections 292, 294 are placed in a colder environment. As will be appreciated that the thermal energy stored in the environment fluctuates within a few tens of centigrade degrees depending on the location because of daily and seasonal temperature changes. The heat pipe 282 may be placed in any such environment and may be configured to use this stored thermal energy to expose the actuator bands 250, 252 to this thermal energy to drive the output shaft 228 and generate electric power, as described above. Further, the heat engine 102 may be implemented in environments having extreme weather conditions ranging from very cold locations to very hot places and may use the temperature difference of the two nearby natural thermal storages. Thus, the heat engine 102 using the heat pipe 282 is able to allow generation of electric power for both small as well as large scale applications by using thermal capacity of land, water, air, and/or other natural resources. In some other implementations, the heat pipe 282 may be connected to a low temperature waste heat source and use the low temperature waste heat to generate electricity in a similar manner as described above.

Figure 8:
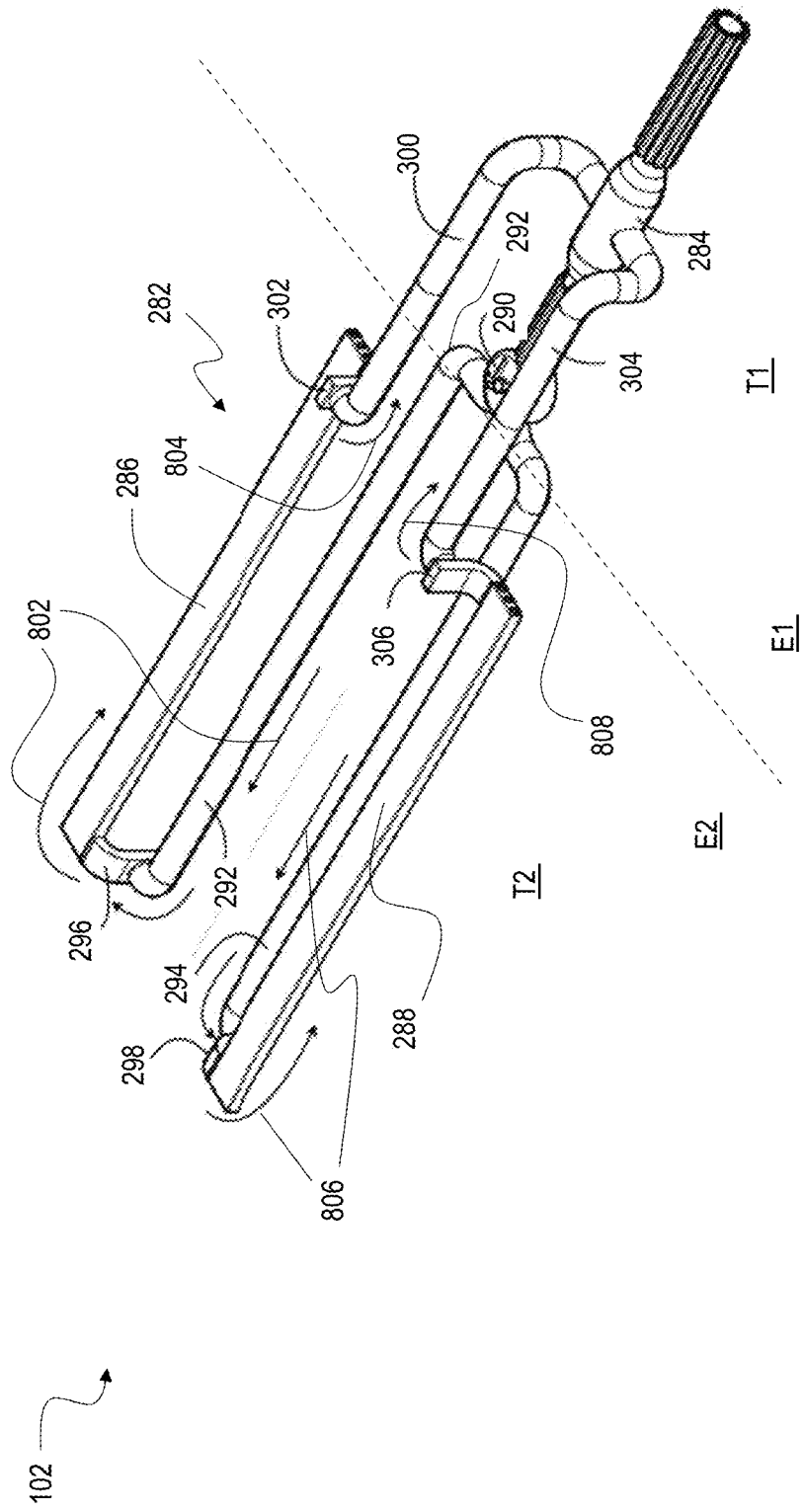
Figure 9:
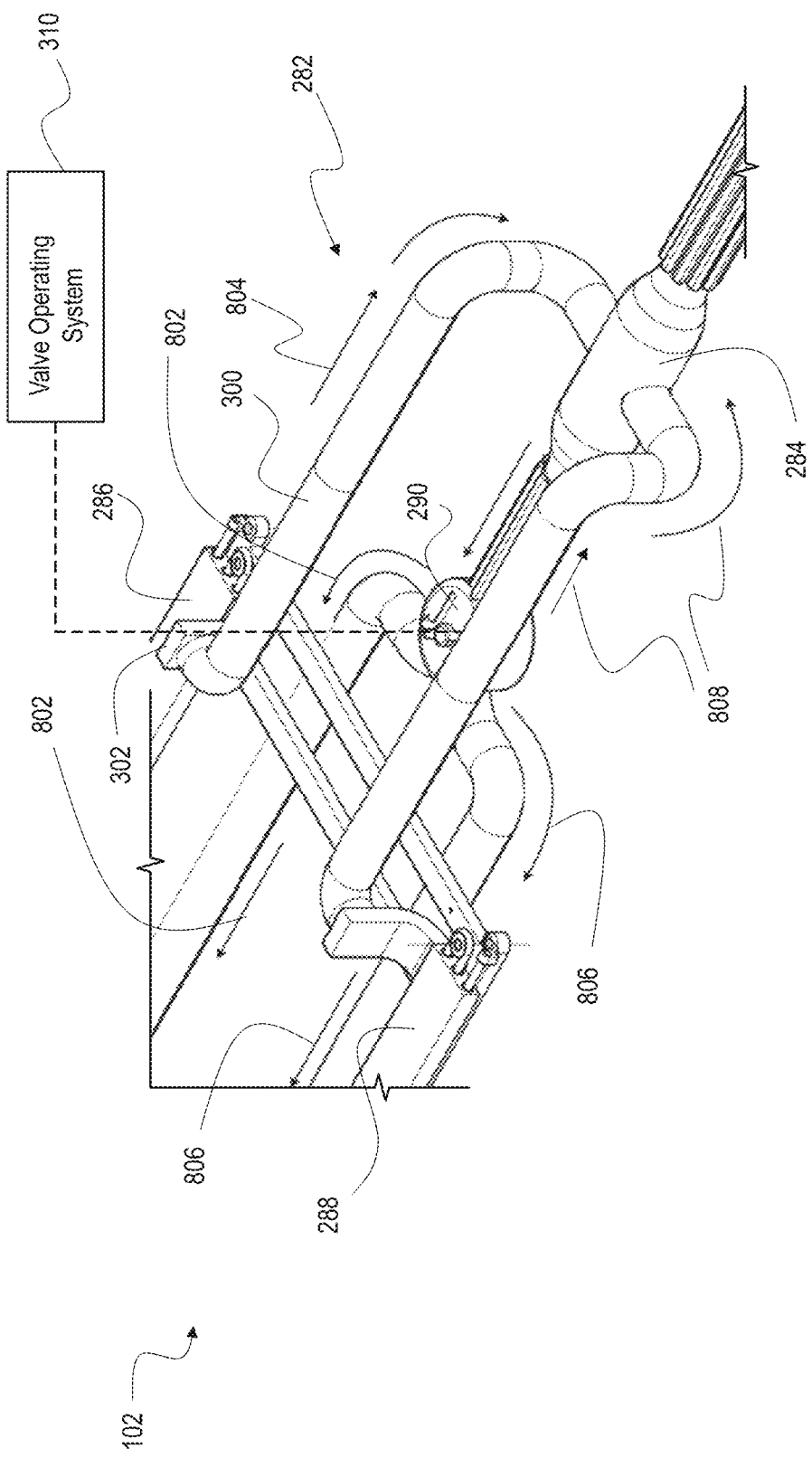

Referring now to FIGS. 8 and 9, operation of the heat pipe 282 will be described in greater detail. As explained above, the evaporator section 284 of the heat pipe 282 is positioned or located in an environment E1 that has temperature T1 and the condenser sections 286, 288 are located or positioned in an environment E2 that has temperature T2. According to the example implementations of the present disclosure, temperature T2 is lower than temperature T1, in that, the evaporator section 284 is positioned in a warmer environment as compared to that of the condenser sections 286, 288. The working fluid in the evaporator section 284 absorbs heat from the high temperature environment and is converted to heated and/or vaporized state from liquid state. The heated or vaporized fluid is then cyclically directed in an alternating manner to each of the condenser sections 286, 288 by switching the flow control valve 290 between the first valve position and the second valve position. As shown in FIG. 8, in the first fluid flow cycle, for example, when the flow control valve 290 is in the first valve position, the heated or vaporized working fluid flow is directed to follow the fluid path shown by a first set of arrows 802, i.e., to the first condenser section 286 via the first adiabatic section 292 and the first flow connecting member 296. As the vaporized working fluid flows through the first condenser section 286, first actuator band 250 disposed therein is exposed to heat that is released by the working fluid. The exposed-to-heat portion of the first actuator band 250 is then contracted, which produces a bilateral force acting on the ends of the band 250 and generates a torque on the pulleys 276 of the assemblies 264, 266, and 272 supporting the first actuator band 250. Since one end of the band 250 is fixed to the chassis 202, the pulleys 276a, 276b, and 276e transfer the added force to pull the connecting end of the rack gear 240 resulting in displacement of the gear assembly 238 in the first direction D1 and rotating the output shaft 228 in the first direction D1. The vaporized working fluid, as it moves along the condenser section 286, condenses back to liquid form, which, along with any remaining non-condensed quantity, is returned to the evaporator section 284 via the first fluid return section and the third flow connecting member 302, as shown by arrow 804.

Further, in the next fluid flow cycle, for example, when the flow control valve 290 is in the second valve position, the heated or vaporized working fluid is directed to follow the fluid path shown by a third set of arrows 806, i.e., to the second condenser section 288 via the second adiabatic section 294 and the second flow connecting member 298. As the vaporized working fluid flows through the second condenser section 288, the second actuator band 252 is exposed to heat and contracted to pull the gear assembly 238 in the second direction D2, in a similar manner as described above.

In an implementation, as explained above, by cyclically switching the positions of the flow control valve 290, the first and the second actuator bands 250, 252 are cyclically exposed to the heat to cyclically displace the gear assembly 238 in the opposite first and the second directions D1, D2, thereby generating the continuous bi-lateral rotations of the output shaft 228. The bi-lateral rotations may further be converted by the gear box 230 into continual unilateral rotations, and are increased in speed by using suitable mechanisms and gears to the level required by the electric power generation system 104 for electric power generation. The electric power generation system 104 coupled to the exit shaft of the gear box 230 then generates the electric power that can be conditioned depending on the application of the power generation system 100. For example, the electric power can be rectified to be used as a charging power plant, or can be conditioned to be connected to a power grid, or can be fed to an inverter, the output of which may be used for other applications.

Figure 10:
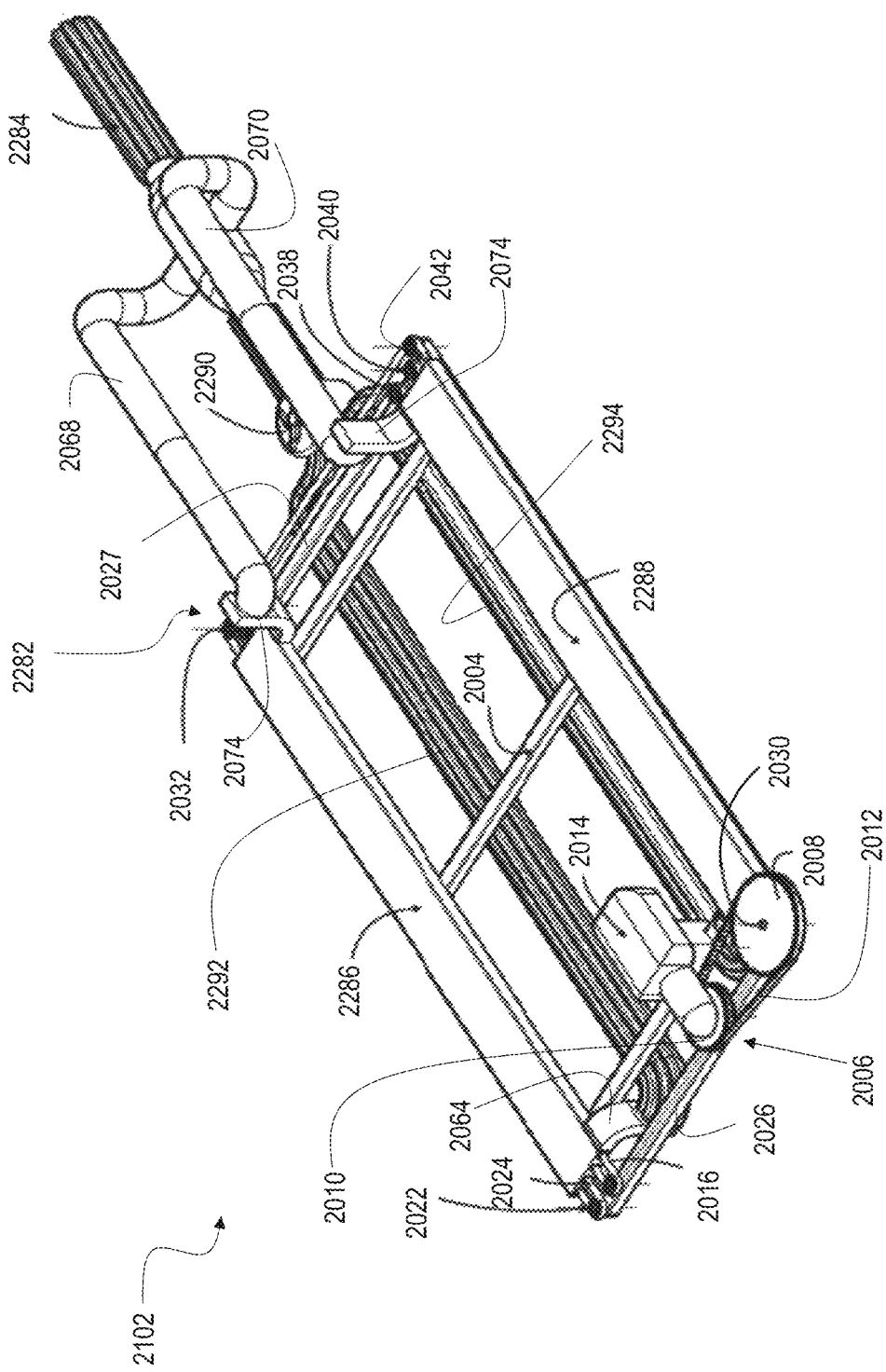
FIGS. 10 through 13 illustrate a heat engine according to a second example implementation.
Figure 62:
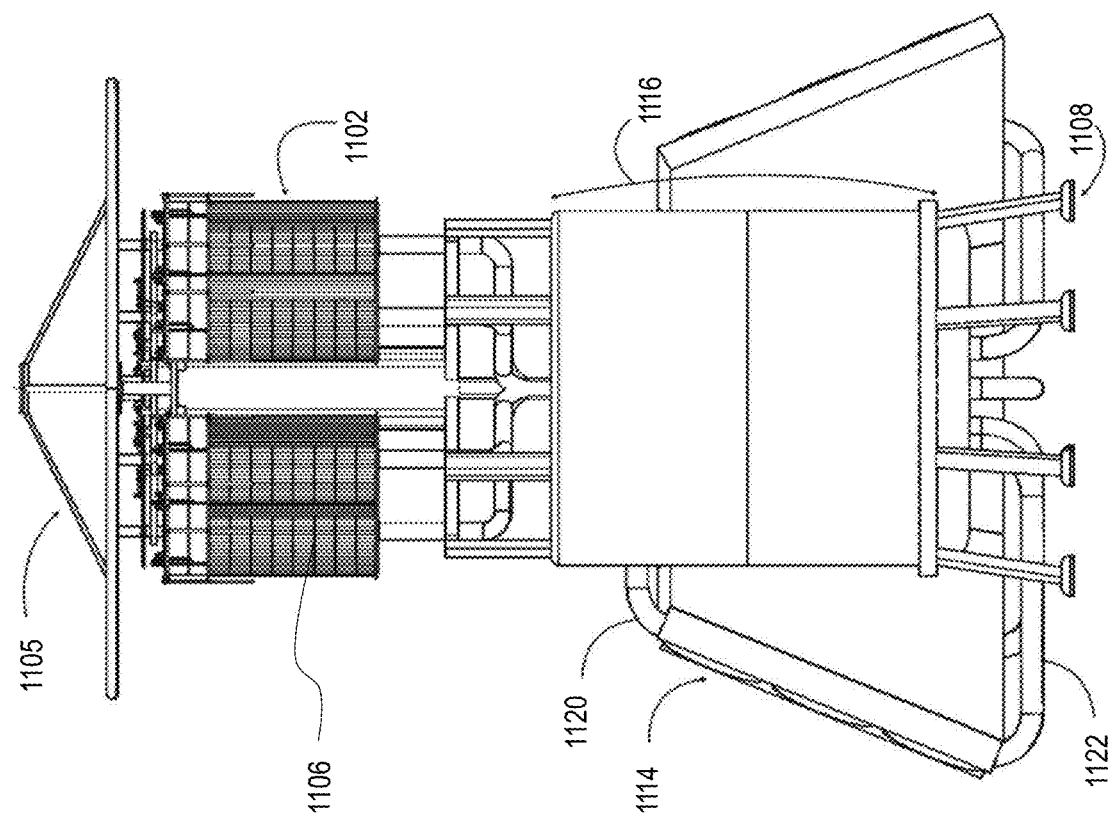
Figure 63:
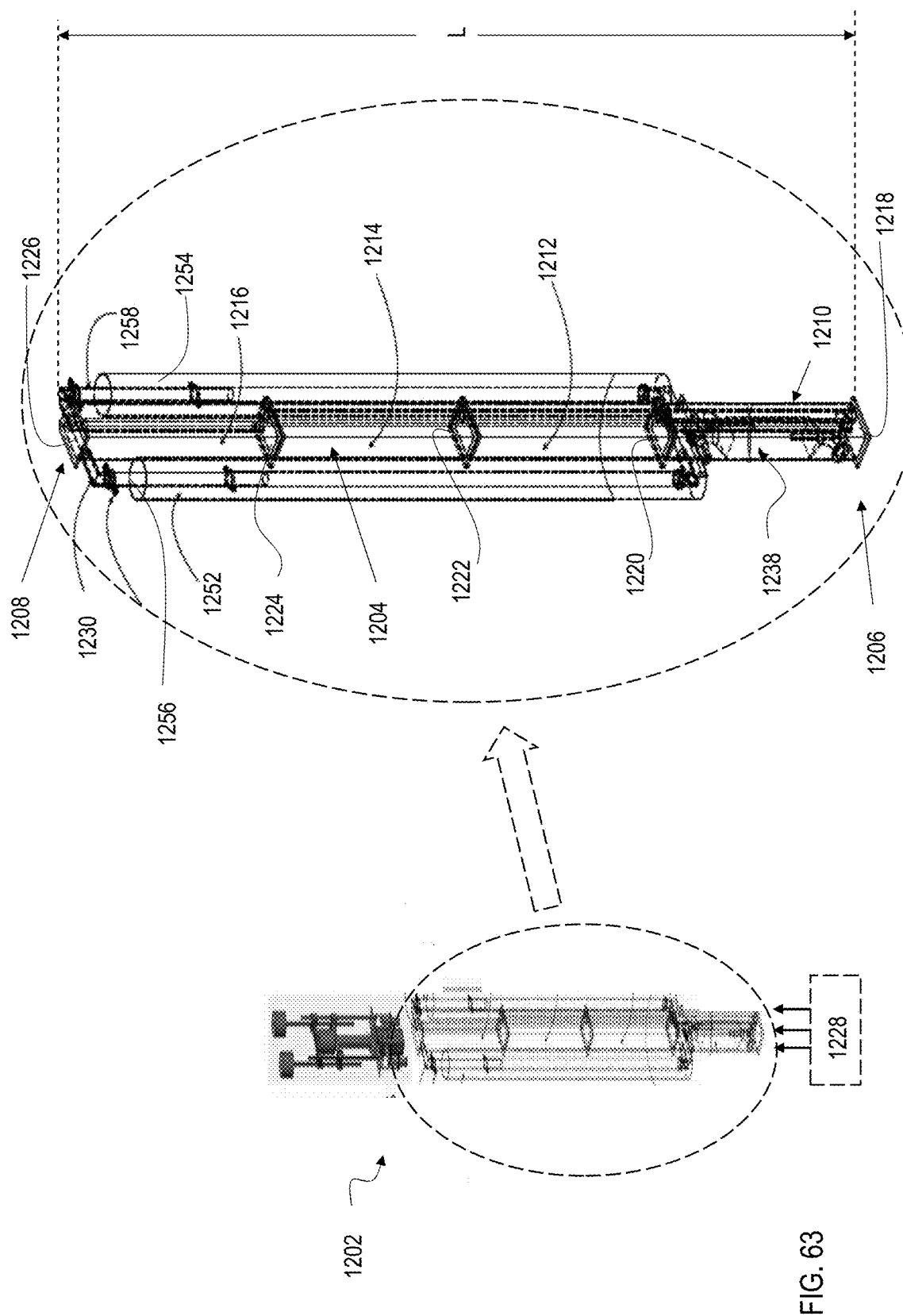
FIGS. 63 through 67 illustrate a heat engine according to a tenth example implementation
Figure 64:
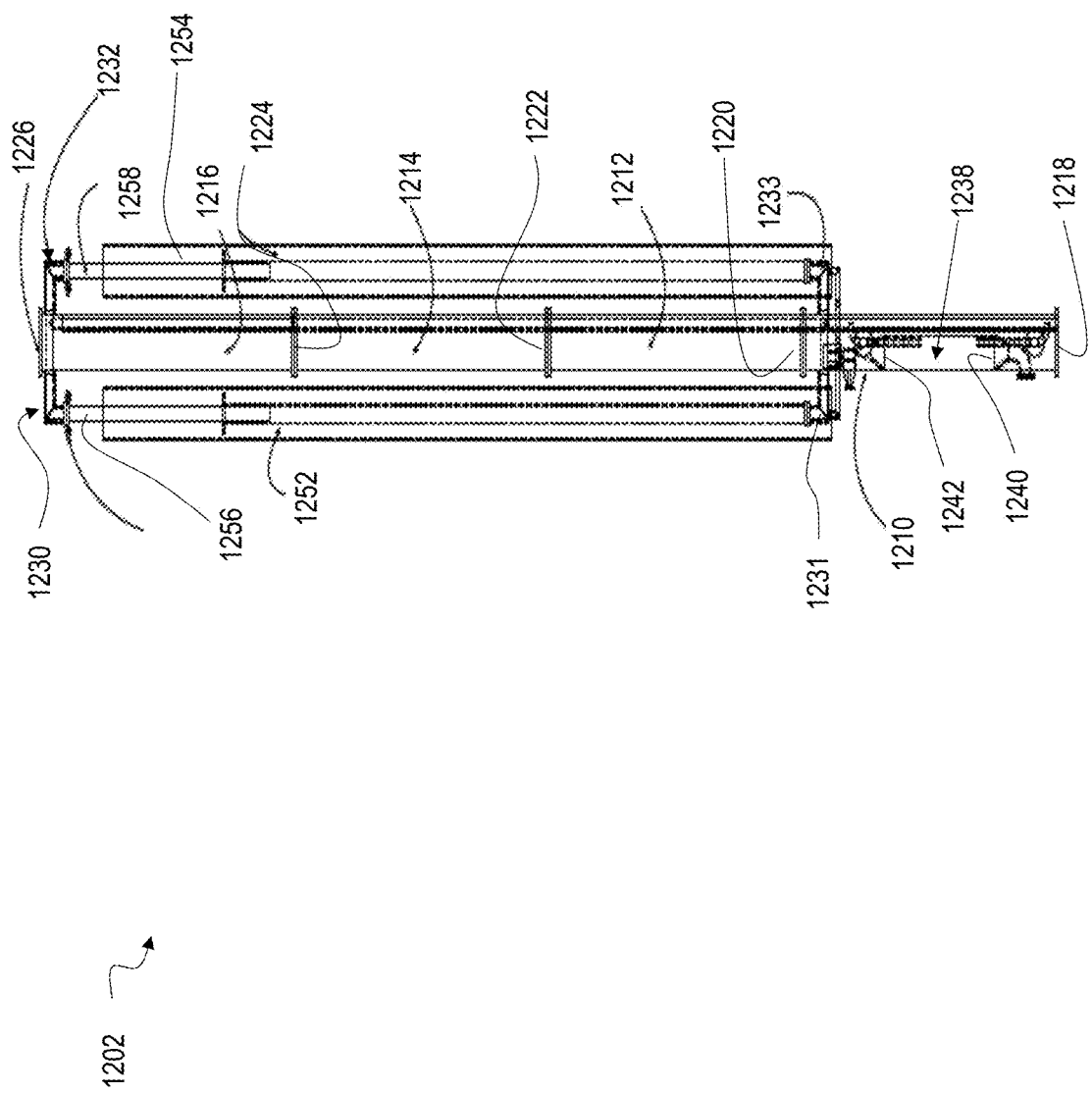

Referring now to FIGS. 10 through 62, alternative example implementations of the heat engine, according to the concepts presents in the present disclosure, are provided.

FIGS. 10 through 13 illustrate a heat engine 2102 according to a second implementation of the present disclosure. The heat engine 2102 includes a chassis 2004 having two opposite longitudinal ends and configured to support various components of the engine 2102. The heat engine 2102 includes a work output member 2006 mounted on one longitudinal end of the chassis 2004. In one implementation, as illustrated, the work output member 2006 may be embodied as a belt drive arrangement (hereinafter referred to as the drive arrangement 2006) including a driving member (e.g., a driving pulley member) 2008 and a driven member 2010 (e.g., a driven pulley member) supported on a shaft 2011 (shown in FIGS. 11 and 12) and connected to the driving member 2008 by a drive belt 2012. The rotation of the driving member 2008 in turn drives the driven member 2010. In this implementation, the output rotations of the driven member 2010 are transferred to a generator assembly by a gear box 2014 via an exit shaft (not shown), in a similar manner as described above. The drive arrangement 2006 of this implementation is configured to produce unilateral rotations, as will be described in the following description, and therefore, the gear box 2014, in this example, may not include an arrangement for converting the bi-lateral rotations of the output shaft into unilateral rotations. However, similar to the gear box 230, the gear box 2014 in this implementation, may also include mechanisms for increasing the speed of rotations, rectifying and/or conditioning the rotational output that is provided to the generator assembly for generation of electric power.

Figure 11:
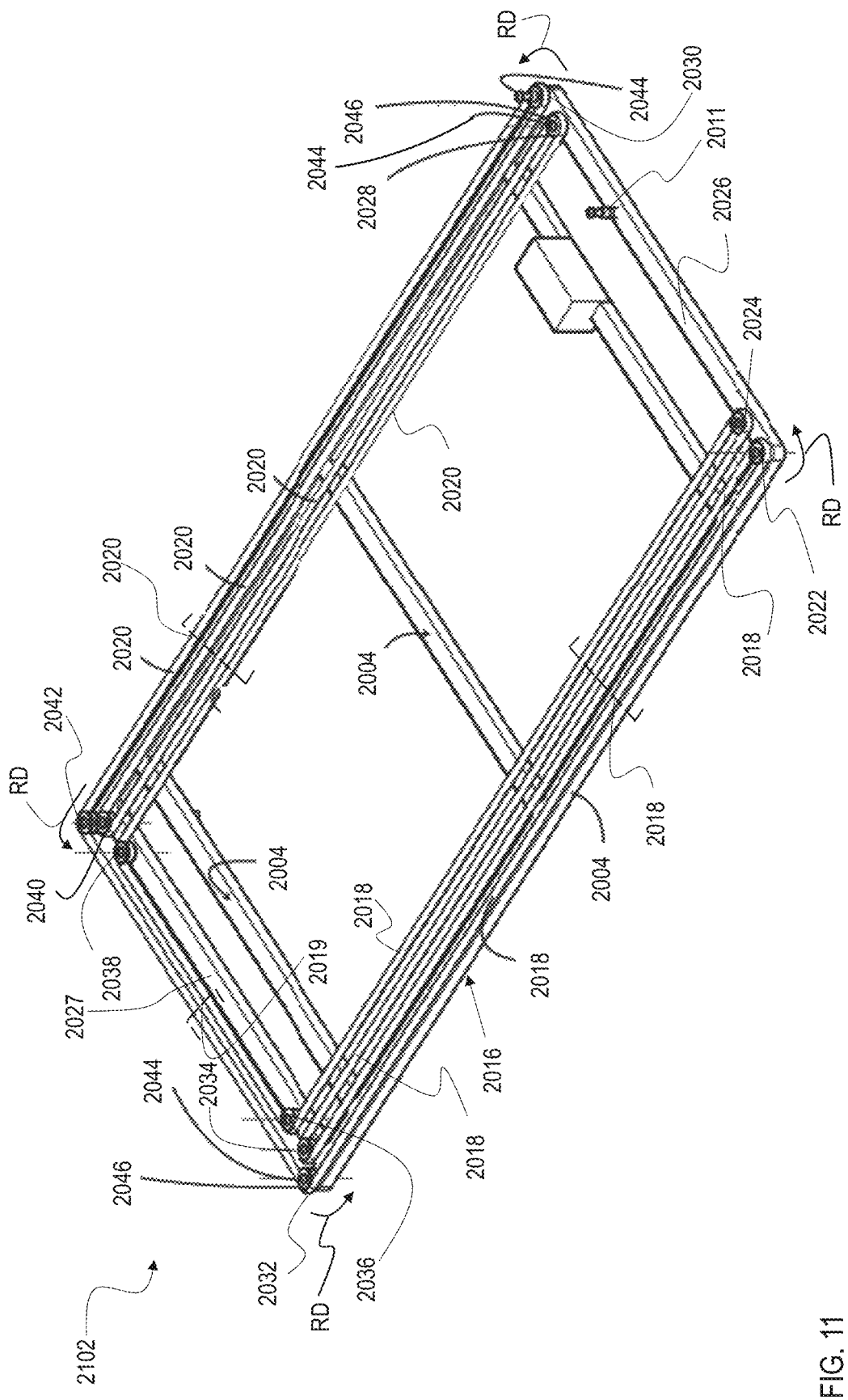
Figure 12:
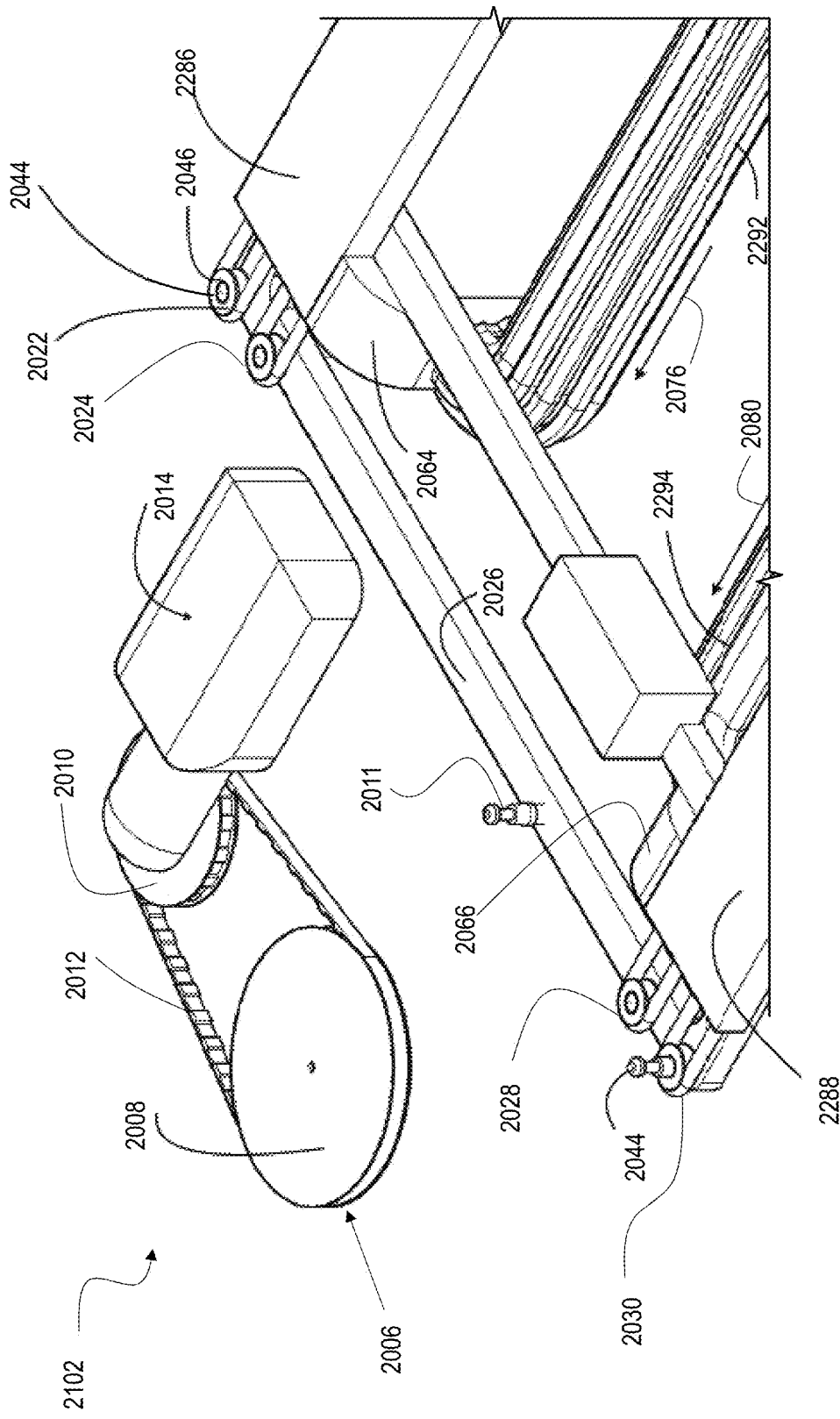
Figure 13:
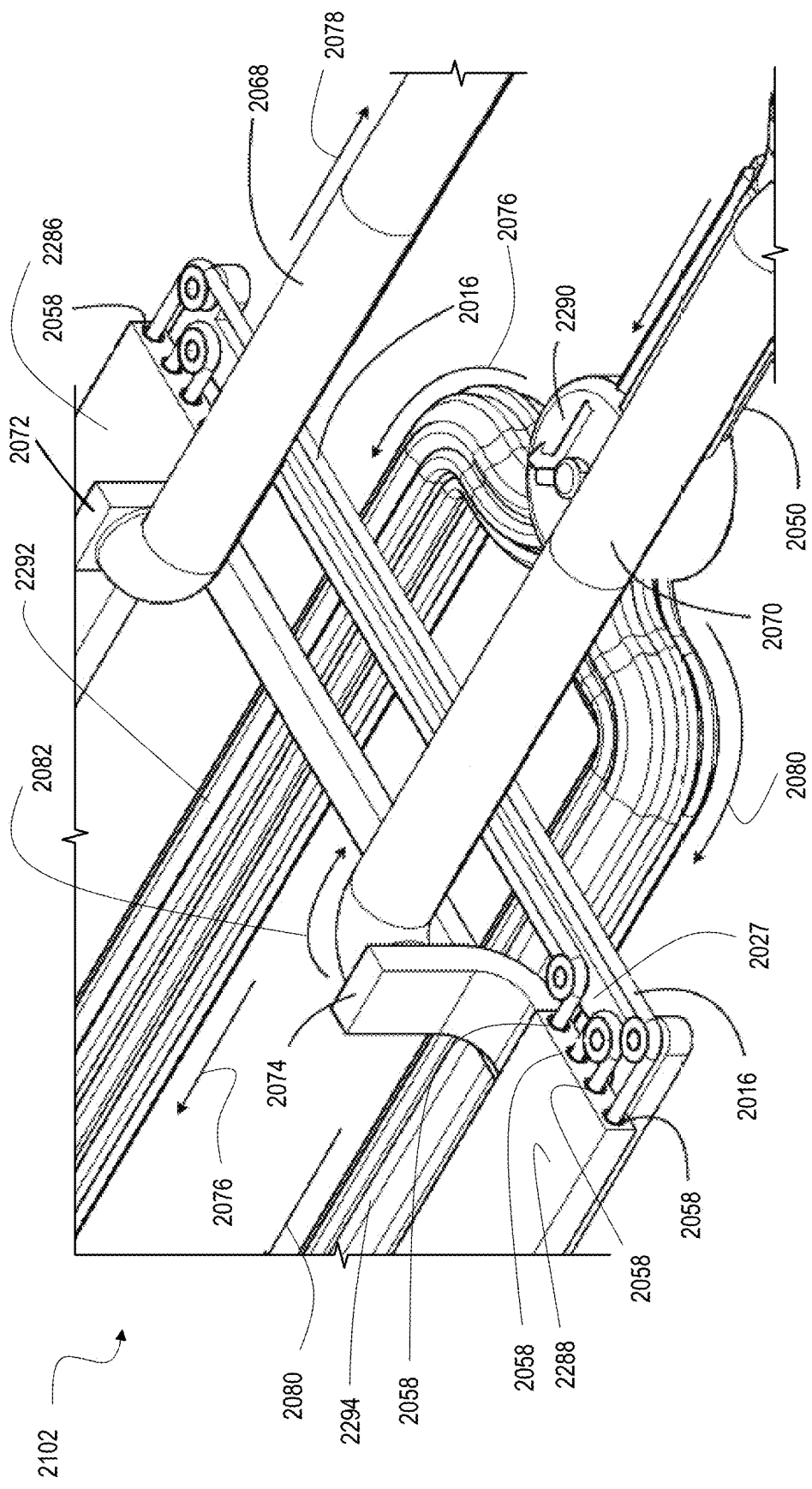
Figure 14:
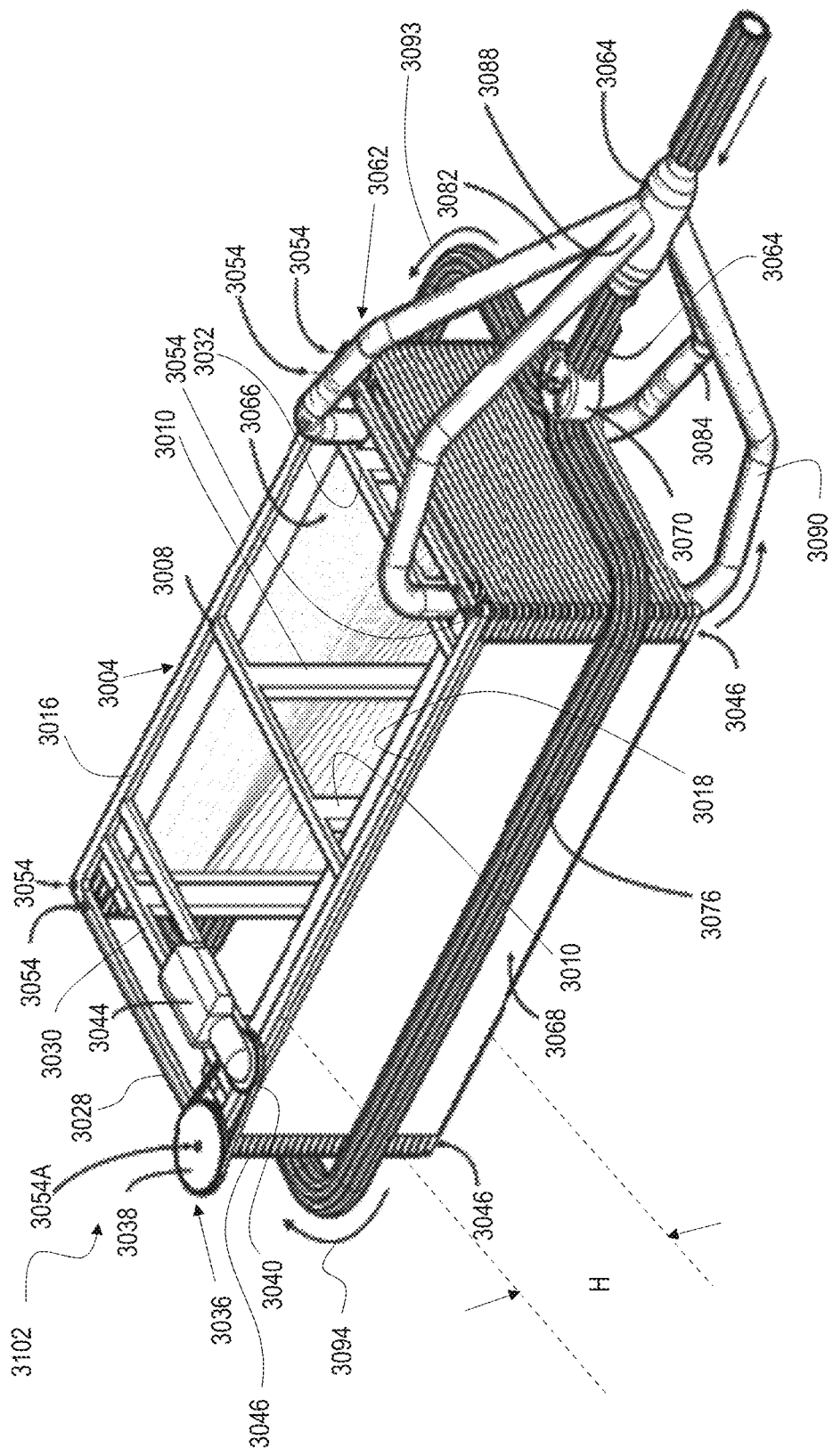
FIGS. 14 through 21 illustrate a heat engine according to a third example implementation.
Figure 15:
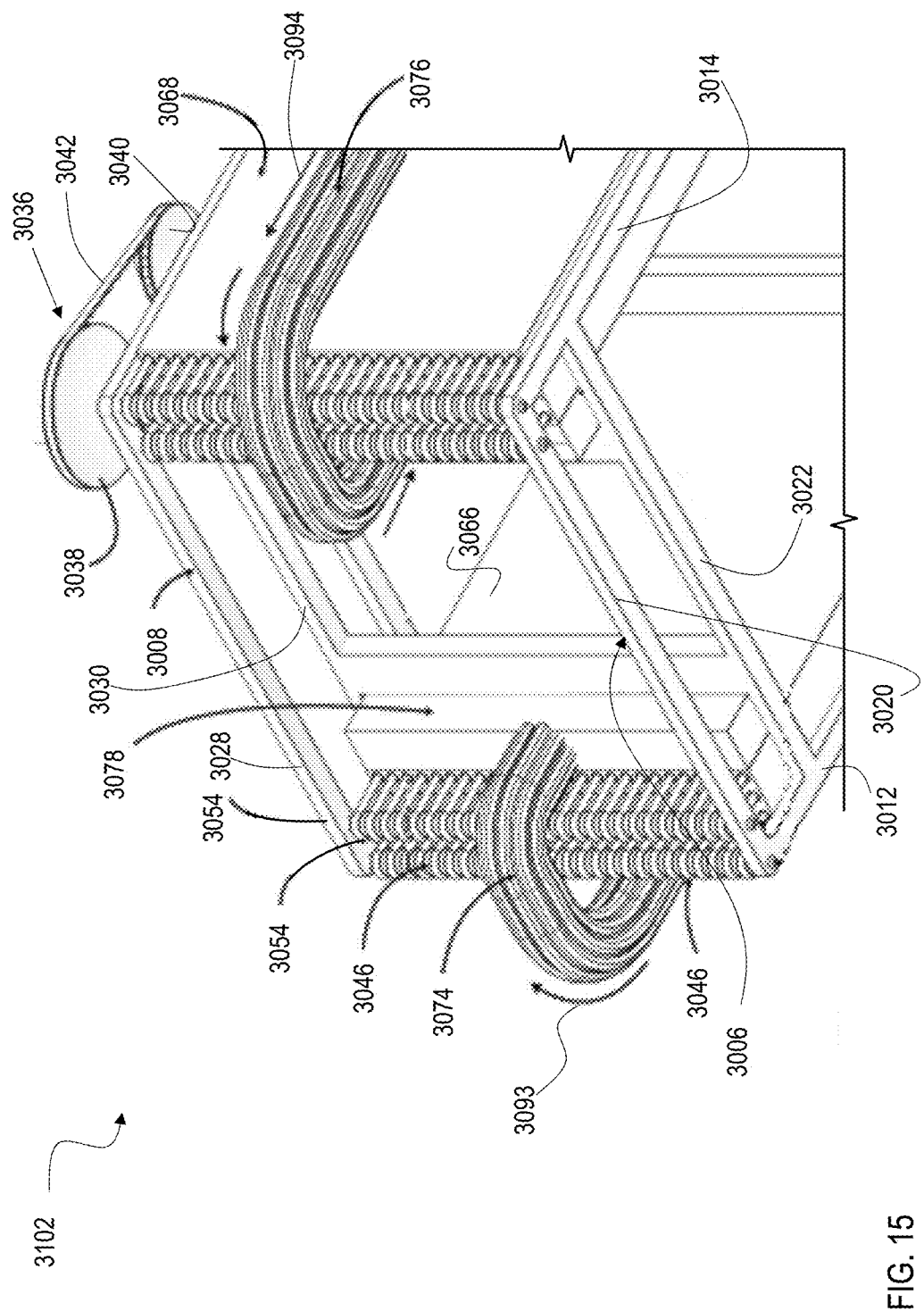
Figure 16:
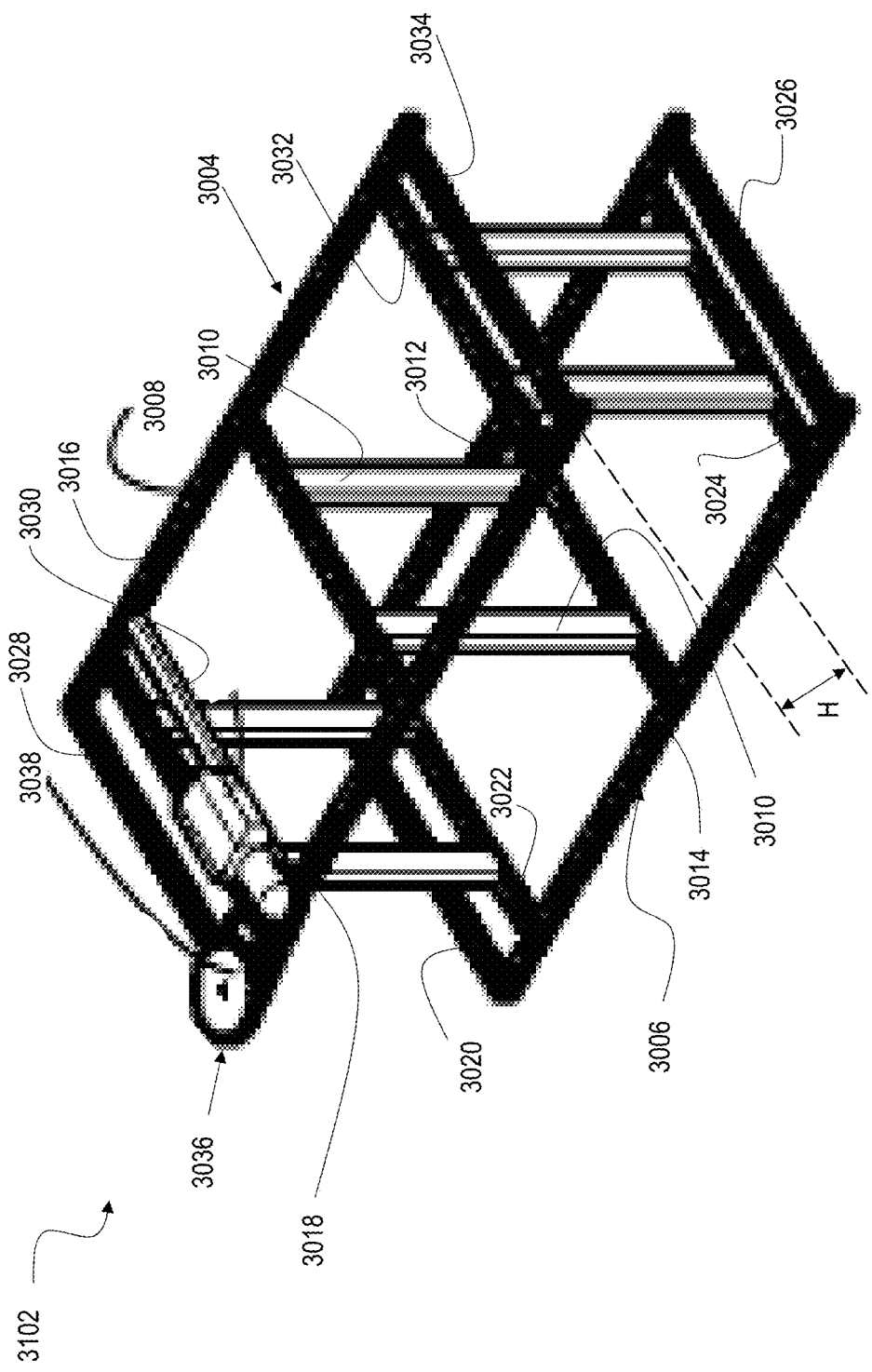

Further, as shown in FIG. 11, in some implementations, the heat engine 2102 may include one continuous actuator band 2016, extending about the chassis 2004, which when exposed to heat displaces the drive arrangement 2006. For example, the actuator band 2016 may have both ends connected together and may be supported as a loop on a number of band contacting assemblies (for example, ten band contacting assemblies in this implementation) mounted on the chassis 2004, such that, a first array portion 2018, having four long sections of the band 2016 extends along a first longitudinal arm and a second array portion 2020 having four long sections of the band 2016 extends along a second longitudinal arm of the chassis 2004. As illustrated, a third array portion 2019 (having two sections) of the band 2016 extend (in loop) along a lateral arm 2027 at the second longitudinal end of the chassis 2004. The band contacting assemblies in this implementation may also include an arrangement of pulleys, bearings, and shafts, and hence, are hereinafter referred to as the pulley arrangements for the sake of simplicity. For example, (shown more clearly in FIG. 11) the heat engine 2102 includes a first set of two pulley arrangements 2022, 2024 mounted on a first lateral arm 2026 (provided at a first longitudinal end of the chassis 2004) adjacent to the first longitudinal arm and a second set of two pulley arrangements 2028, 2030 mounted on the first lateral arm 2026 adjacent the second longitudinal arm. A third set having three pulley arrangements 2032, 2034, 2036 is mounted on a second lateral arm 2027 (provided at the second longitudinal end of the chassis 2004) adjacent to the first longitudinal arm, and a fourth set of three pulley arrangements 2038, 2040, 2042 is mounted on the second lateral arm 2027 adjacent to the second longitudinal arm. Each of the pulley arrangements 2022, 2024, 2028, 2030, 2032, 2034, 2036, 2038, 2040, and 2042 include their respective shafts, such as the shafts 2044 (only some of them shown) and a one-side rotating bearings, such as the bearings 2046 (only some of them shown). In this example implementation, the shaft 2044 of the pulley arrangement 2030 (e.g., the pulley arrangement positioned at the end of the first lateral arm 2026 and adjacent to the second longitudinal arm) may also rotatably support the driving member 2008 of the drive assembly 2006.

The heat engine 2102 further includes a heat exchanger, such as a heat pipe 2282 for providing thermal energy to the actuator band 2016 to drive the drive arrangement 2006 in a similar manner as described previously. For example, the heat pipe 2282 includes an evaporator section 2284 that can be placed in a warm or hot environment or may be connected to a low temperature waste heat source, and two condenser sections 2286, 2288, that are placed in a colder environment as compared to the environment of the evaporator section 2284. The condenser sections 2286, 2288 may be fluidly connected to the evaporator section 2284 via a flow control valve 2290, in a similar manner, as described previously. The condenser sections 2286, 2288 are kept partially insulated or non-insulated from outside and are positioned along the longitudinal arms of the chassis 2004 to provide thermal heat exposure to the first array portion 2018 and the second array portion 2020, respectively, of the actuator band 2016. For example, in this implementation too, each condenser section 2286, 2288 may include a number of thermally conductive tubular receptacles 2058 (shown in FIG. 13) extending therethrough to receive the respective sections of the actuator band 2016 therein. In the illustrated implementation, each condenser section 2286, 2288 includes four tubular receptacles 2058 to receive the four long sections forming each of the first array portion 2018 and the second array portion 2020 of the actuator band 2016.

Further, first and second adiabatic sections 2292, 2294 may also be connected between the evaporator section 2284 and the respective condenser sections 2286, 2288 via the flow control valve 2290. The adiabatic sections 2292, 2294 are connected to the respective condenser sections 2286, 2288 via respective fluid connecting members 2064, 2066. Further, fluid return sections 2068, 2070 connect the condenser sections 2286, 2288 back to the evaporator section 2284 via the respective fluid connecting members 2072, 2074, in a similar manner as described previously.

In operation, the working fluid absorbs heat in the evaporator section 2284 and moves to the flow control valve 2290. When the flow control valve 2290 is operated (such as by a valve operating system described above) to be in the first valve position, the heated working fluid is directed to follow a first fluid path (shown by arrows 2076 in FIGS. 12 and 13), i.e., to the first condenser section 2286 via the first adiabatic section 2292 and the first flow connecting member 2064. As the vaporized working fluid flows through the first condenser section 2286, the heat is transferred to the first array portion 2018 of the actuator band 2016. The working fluid, as it moves along the condenser section 2286, condenses back to liquid, which, along with any remaining non-condensed quantity, is returned to the evaporator section 2284 via the fluid return section 2068 and the flow connecting member 2072, as shown by arrow 2078 (shown in FIG. 13).

In some implementations, the total length of each of the array portions 2018, 2020, of the actuator band 2016 that are exposed to heat in the respective condenser sections 2286, 2288 may be less than half of the total length of the actuator band 2016. Accordingly, as the first array portion 2018 of the band 2016 is exposed to heat, it is contracted bi-laterally due to its confinement by the two pulley assemblies 2022 and 2032 on either ends. This contraction generates a force that rotates all the pulley assemblies (e.g., assemblies 2022, 2024, 2032, 2034, and 2036) connected to the array portion 2018 in one direction (shown by arrows RD) because of the respective one-side rotating bearings 2046. The contracted portions are added to one another, which in turn pull the second array portion 2020 towards the first condenser section 2286 (i.e., the warmer section), thereby rotating the driving member 2010 in that direction.

Similarly, when the flow control valve 2290 is switched to a second valve position, the heated working fluid is directed to follow a second fluid path (shown by arrows 2080 in FIGS. 12 and 13), i.e., to the second condenser section 2288 via the second adiabatic section 2294 and the flow connecting member 2066. As the vaporized working fluid flows through the second condenser section 2288, the heat is transferred to the second array portion 2020 of the actuator band 2016. The working fluid, as it moves along the condenser section 2288, condenses back to liquid, which, along with any remaining non-condensed quantity, is returned to the evaporator section 2284 via the fluid return section 2070 and the flow connecting member 2074, as shown by arrow 2082 (shown in FIG. 13).

As the second array portion 2020 is exposed to heat, it is contracted to again displace the driving member 2008 in the same direction, because of the one-side rotating bearings 2046 on the pulley assemblies 2030 and 2042 at the ends, in a similar manner as described above. Thus, due to the one-side rotating bearings 2046 on all the pulley assemblies, in this example implementation, by cyclically switching the position of the flow control valve 2290 and cyclically exposing the array portions 2018, 2020 of the actuator band 2016, a continual unilateral rotation of the driving member 2008 is achieved, which in turn unilaterally drives the driven member 2010 to provide input rotations to the generator assembly for generating electric power.

Referring now to FIGS. 14 through 21, a heat engine 3102 according to a third example implementation is provided. The heat engine 3102 may be a scaled-up version of the heat engine 2102 for implementing in large scale power generation applications. As illustrated, the heat engine 3102 includes a chassis 3004 having two opposite longitudinal ends and configured to support various components of the engine 3102. As will be appreciated, the chassis 3004 in this implementation may be built larger than the previously described chassis to suit and accommodate for the larger applications. For example, as shown more clearly in FIG. 16, the chassis 3004 may include a base frame portion 3006, a top frame portion 3008 and a number of support members 3010 connected between the top frame portion 3008 and the base frame portion 3006, to form a hollow box-like structure for the chassis 3004 having a height H. The base frame portion 3006 has a frame structure with two longitudinal arms 3012, 3014, two lateral arms 3020, 3022 on a first longitudinal end of the chassis 3004 and two lateral arms 3024, 3026 on a second longitudinal end of the chassis 3004. Similarly, the top frame portion 3008 also includes two longitudinal arms 3016, 3018, two lateral arms 3028, 3030 on the first longitudinal end and two lateral arms 3032, 3034 on the second longitudinal end of the chassis 3004.

Further, the heat engine 3102 includes a work output member 3036 mounted on one longitudinal end of the chassis 3004. In this implementation, the work output member 3036 may also be embodied as a belt drive arrangement (hereinafter referred to as the drive arrangement 3036) including a driving member 3038 and a driven member 3040 connected to the driving member 3038 by a drive belt 3042. The rotation of the driving member 3038 in turn drives the driven member 3040, and the output rotations of the driven member 3040 is transferred to a generator assembly by a gear box 3044 via an exit shaft (not shown), in a similar manner as described above. The belt drive arrangement is only one example, and it may be appreciated that in various alternative implementations, other types of work output members may also be used to achieve similar results.

Further, in the illustrated implementation, the heat engine 3102 may include multiple continuous actuator bands 3046, each stretched around the chassis 3004 multiple times as a loop (similar to the actuator band 2016 described above) and arranged in layers or in a stacked manner to cover the entire height H of the chassis 3004, along the length of the longitudinal arms 3012 and 3016, 3014 and 3018, and one of the lateral arms disposed on the second longitudinal end of the chassis 3004 to form a U-shaped configuration. Each of the actuator bands 3046, like the other actuator bands described previously, may be embodied as a band having tubular cross-section that is adapted to expand or contract when exposed to heat and displace the drive arrangement 3036. For example, such as that shown in FIG. 17, the bands may be arranged such that a first array portion 3048 of the bands 3046 extends through the height H between the first longitudinal arms 3012 and 3016 of the base frame portion 3006 and the top frame portion 3008, respectively. Similarly, a second array portion 3050 of the bands 3046 may extend through the height H between the second longitudinal arms 3014 and 3018 and a third array portion 3052 may extend through the height H between the lateral arms and 3034. In one example, the heat engine 3102 may include twenty-six actuator bands 3046 forming a hundred and four long sections extending in each of the array portions 3048 and 3050 in a stacked or layered manner. However, the number of actuator bands 3046 and the long sections in each array 3048, 3050 is merely an example and may be varied to achieve similar results. For instance, instead of multiple actuator bands, the heat engine 3102 may include a single long actuator band extending multiple times in U-shaped configuration in a stacked manner to achieve similar results.

Figures 17, 18:
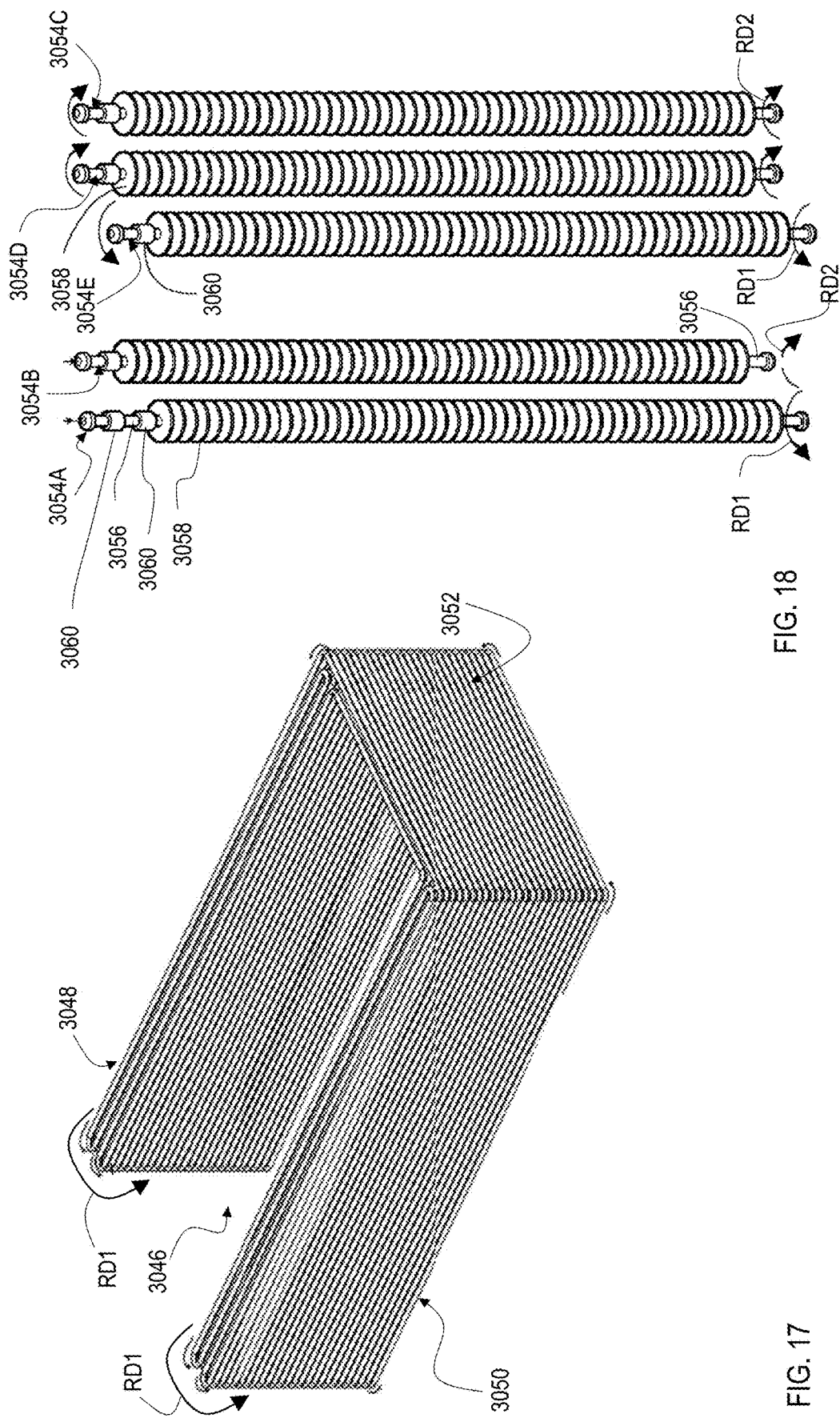
Figure 19:
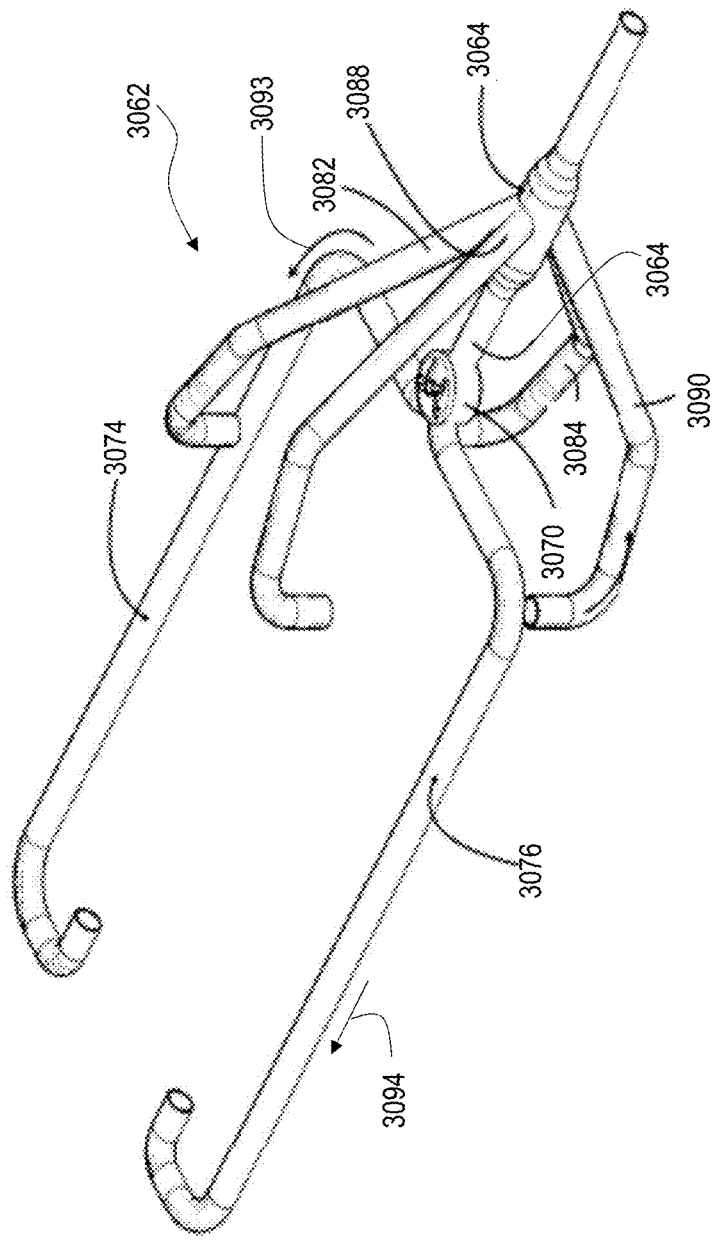
Figure 21:
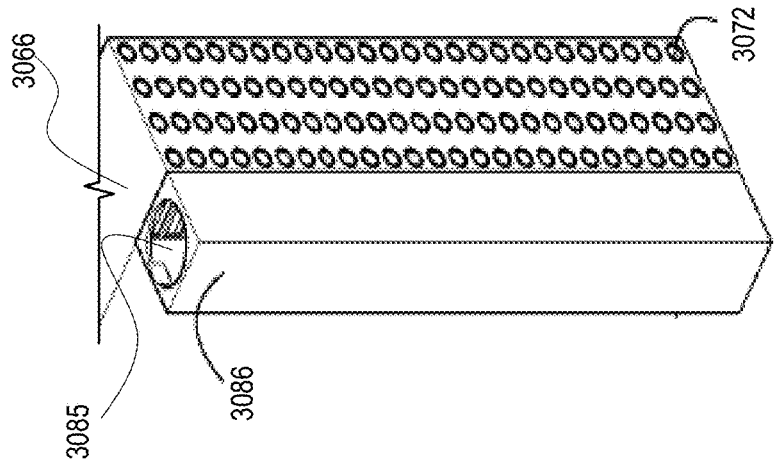

Each of the actuator bands 3046 may have both ends connected together to make a loop supported on a number of band contacting assemblies 3054 (for example, ten band contacting assemblies in this implementation with five assemblies along each of the longitudinal arms) that are mounted around the chassis 3004 in a similar manner, as shown and described previously with reference to FIG. 11. As illustrated, one of the band contacting assemblies 3054 (such as the band contacting assembly 3054A) may be configured to support the driving member 3038 in addition to supporting actuator band 3046. Each of the band contacting assemblies 3054 may be adapted to extend through the height H of the chassis 3004. Further, as shown in FIG. 18, each band contacting assembly 3054 includes a shaft 3056 supporting a number of pulleys 3058, where the two ends of the shaft 3056 are each installed on-a one-side rotating bearing 3060, and where the assembly 3054A includes two pairs of one-side rotating bearings 3060 on which the corresponding shaft 3056 is supported. As will be appreciated, in this implementation, the bearings 3060 may be installed in a manner that their corresponding direction of rotation allows the movement of the actuator band 3046 in only one direction. For example, the bearings 3060 on the outer band contacting assemblies provided on either side of the chassis 3004, for example, the assemblies 3054A, 3054E may be adapted to rotate in a first rotating direction RD1 while the bearings 3060 on the other assemblies, i.e., assemblies 3054C, 3054D and 3054E may be adapted to rotate in an opposite second rotating direction RD2. The rotating directions RD1 and RD2 may be configured such that they cooperate to move the actuator band 3046 only in the first rotating direction RD1, as shown in FIG. 17.

Figure 20:
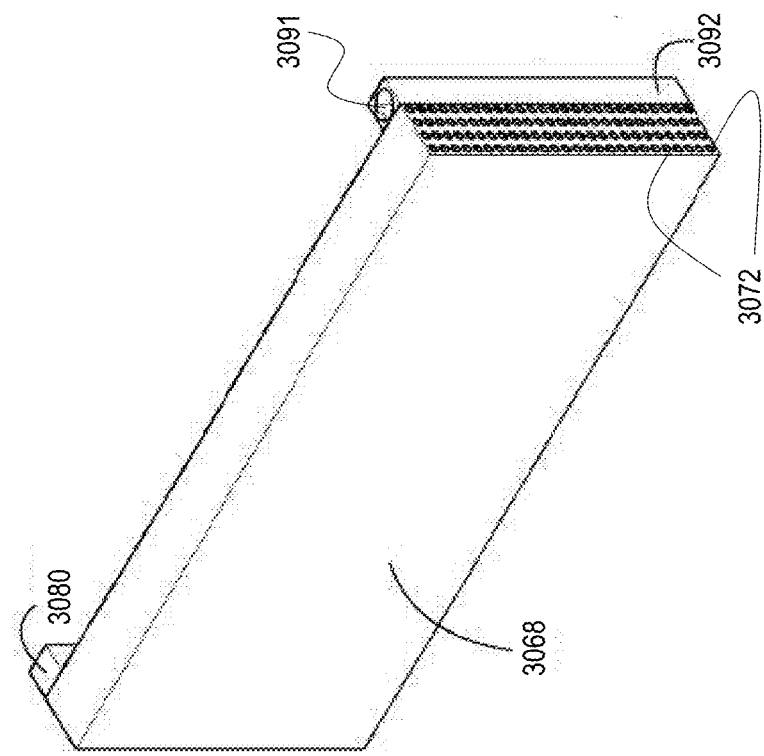
Figure 22:
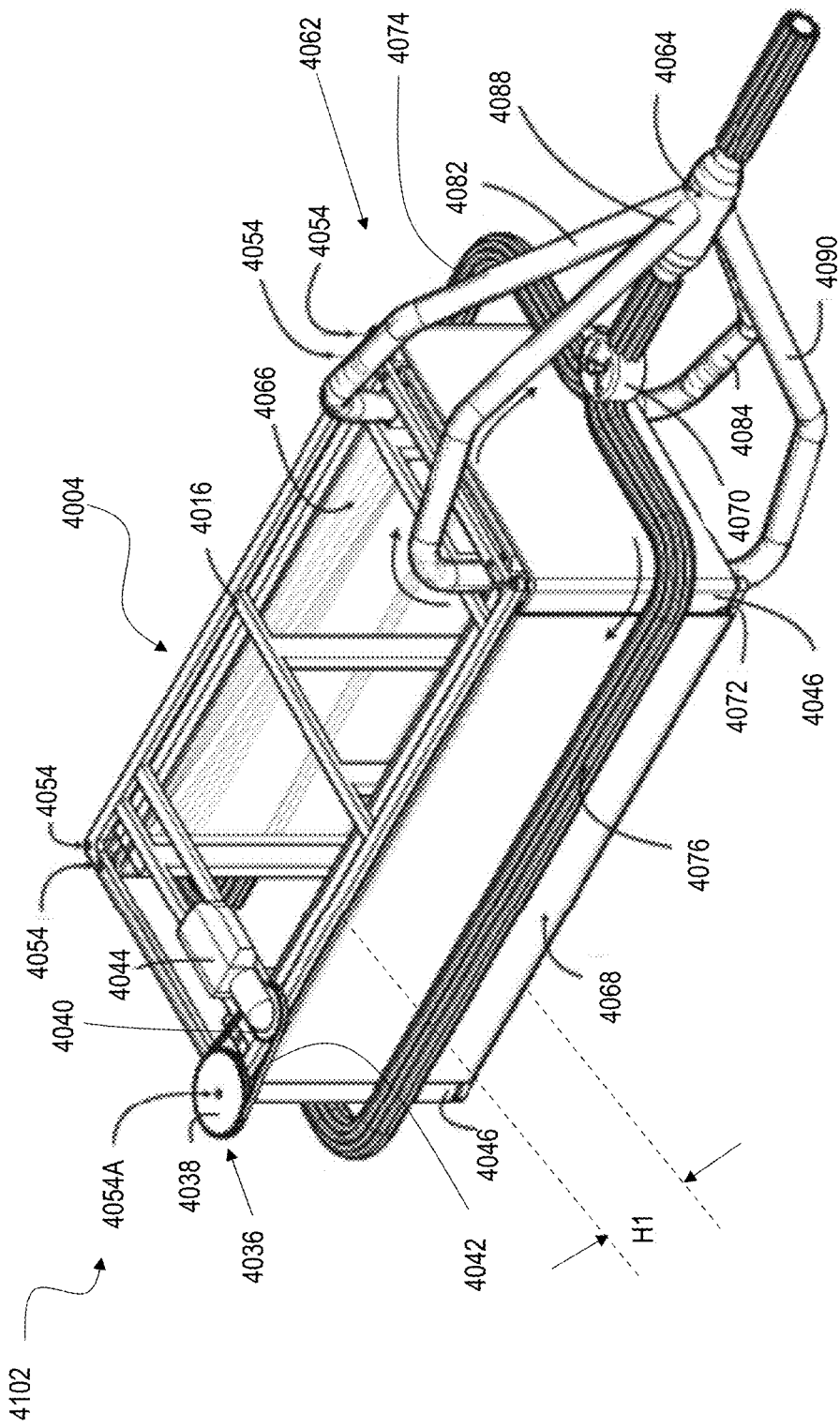
FIGS. 22 through 26 illustrate a heat engine according to a fourth example implementation.
Figure 23:
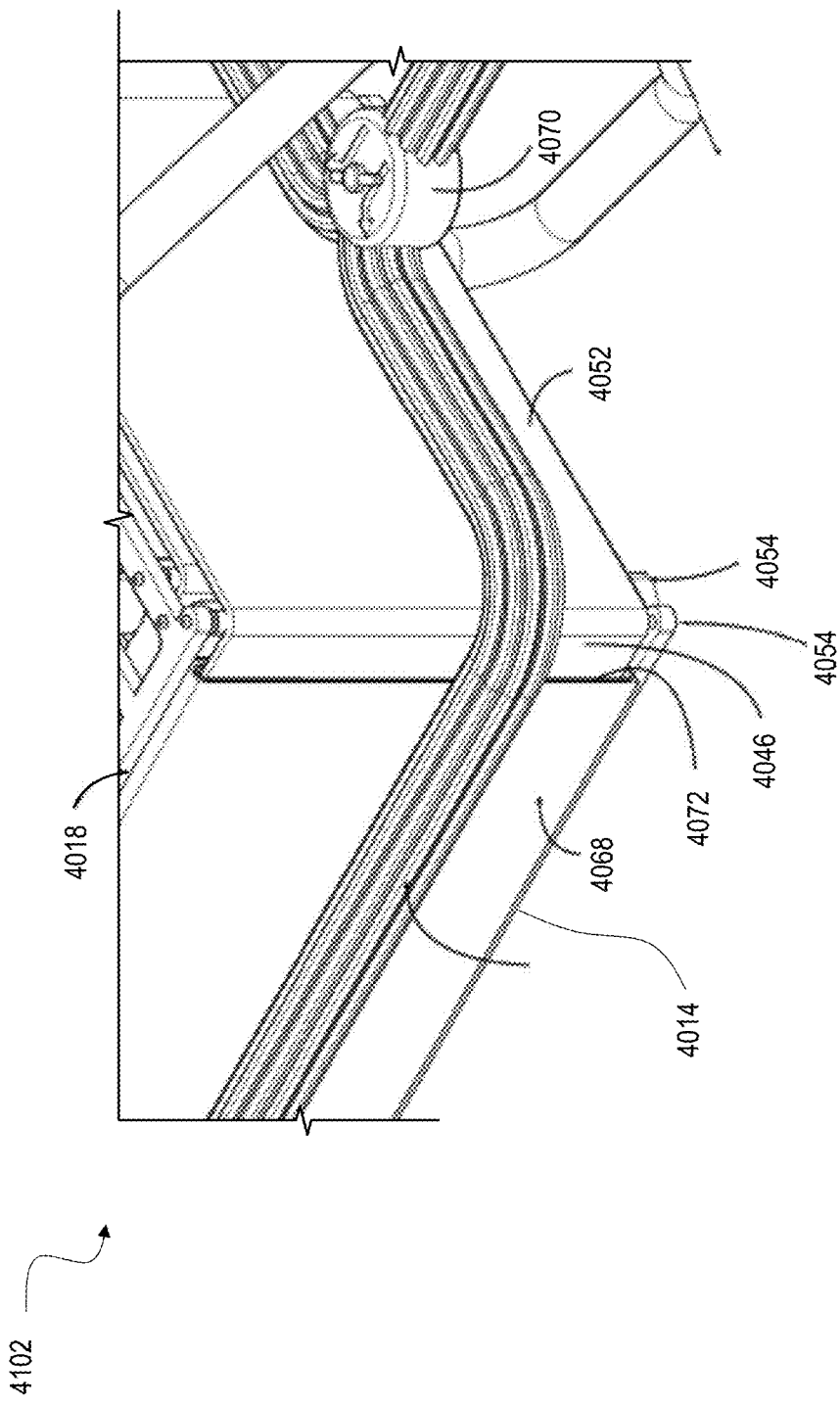
Figure 24:
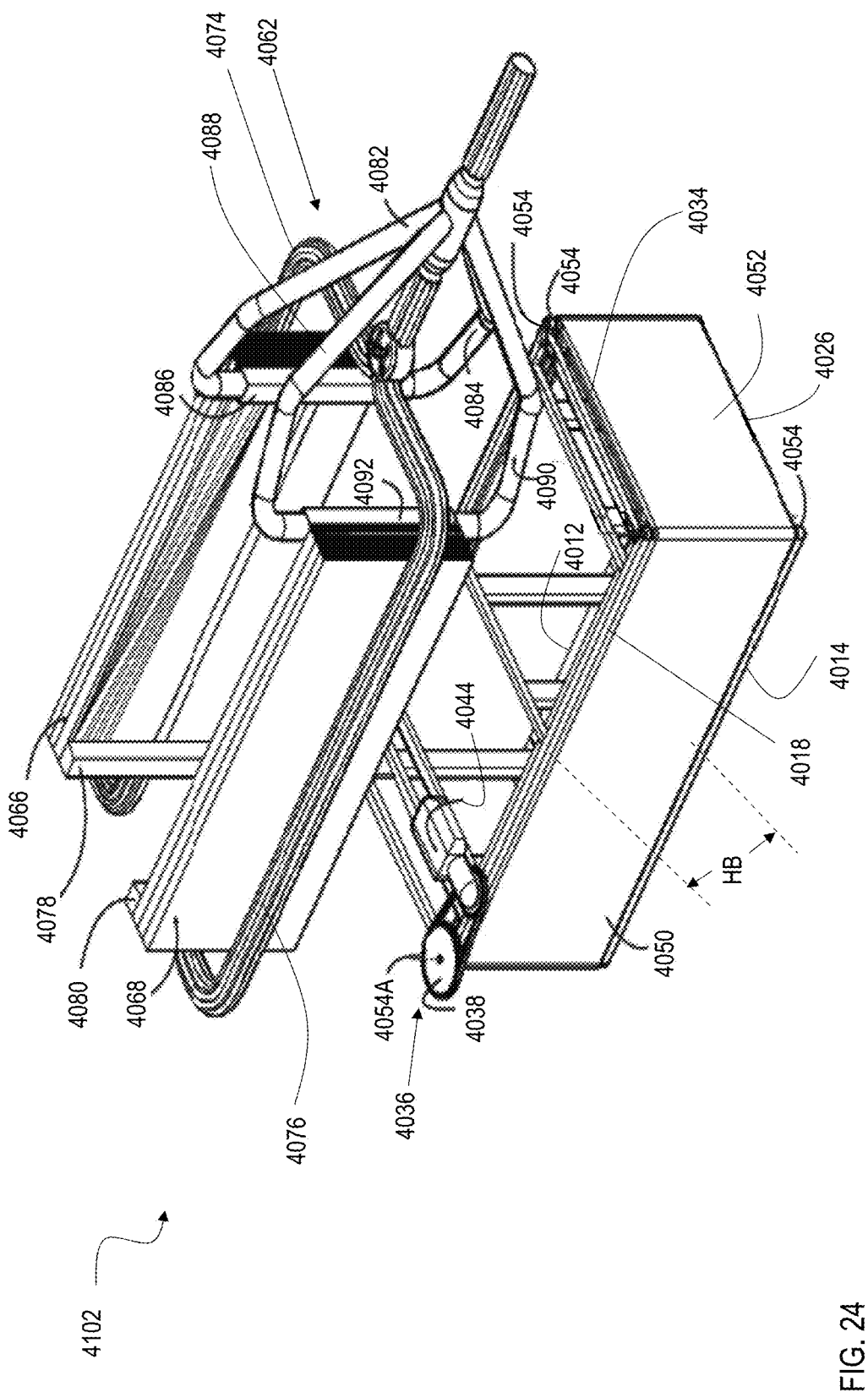
Figure 26:
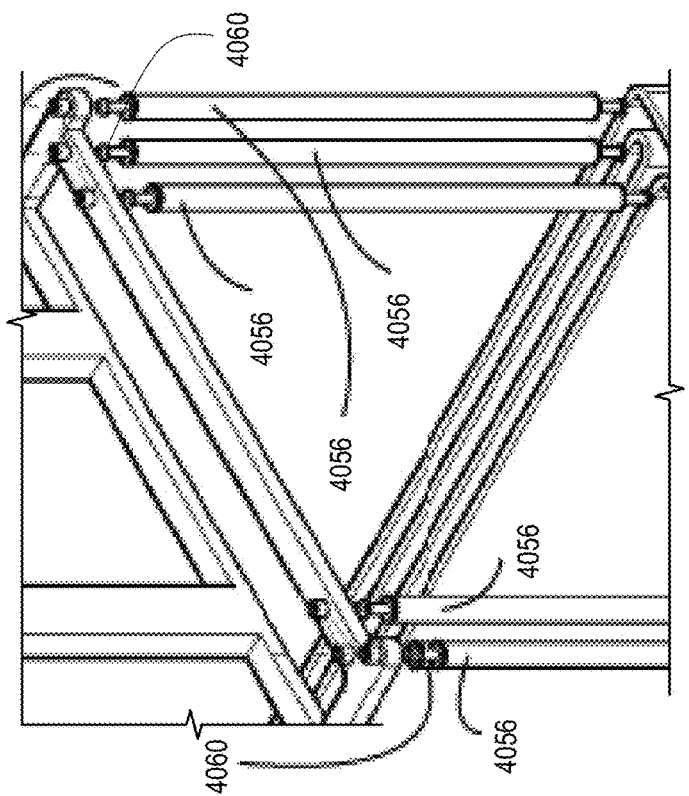
Figure 25:
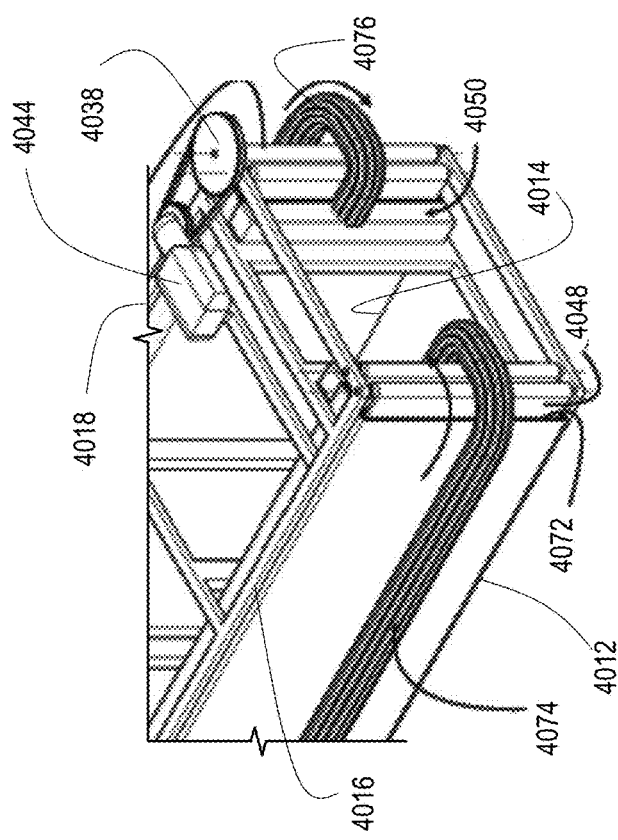
Figure 27:
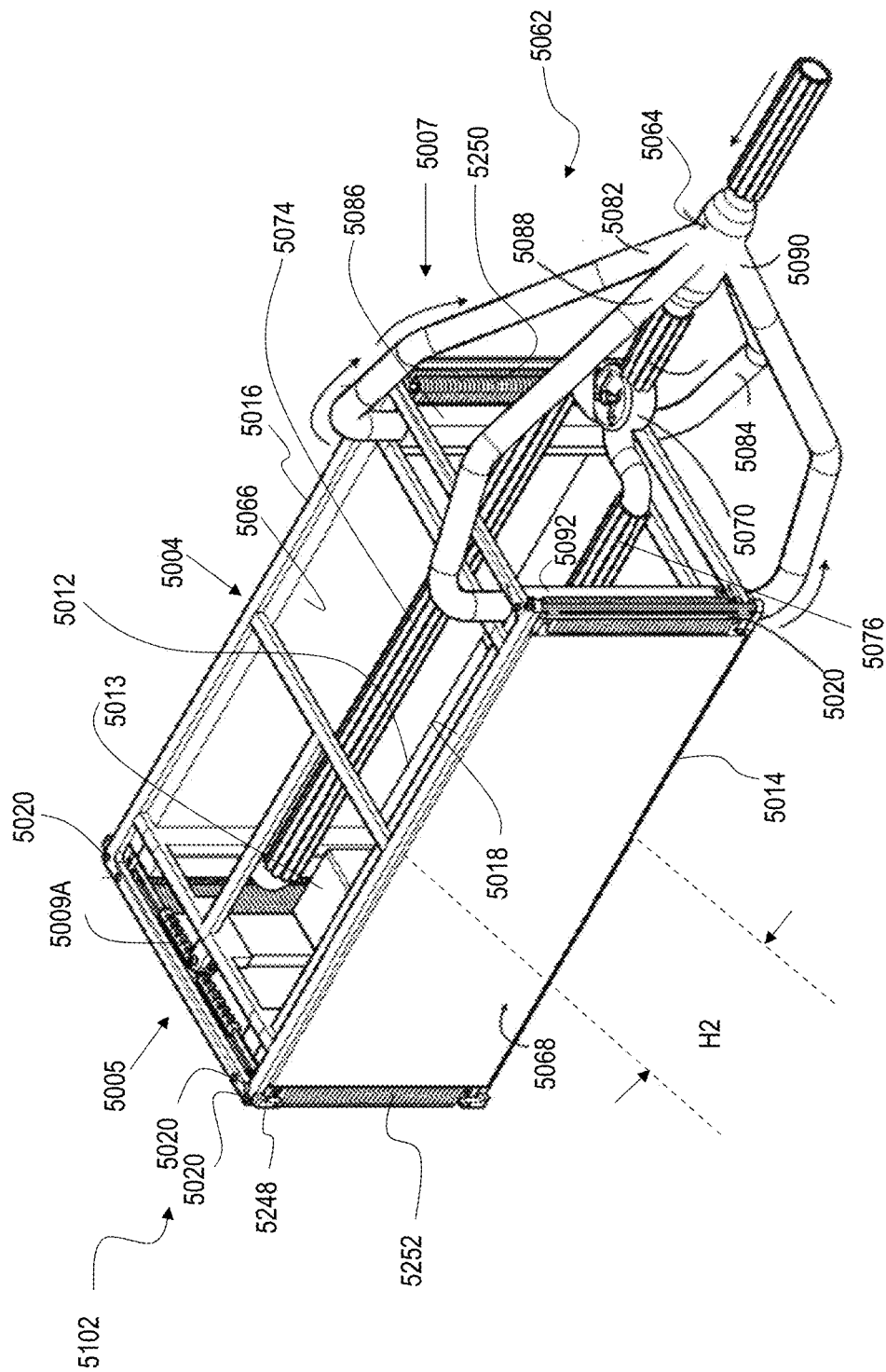
FIGS. 27 through 31 illustrate a heat engine according to a fifth example implementation.
Figure 28:
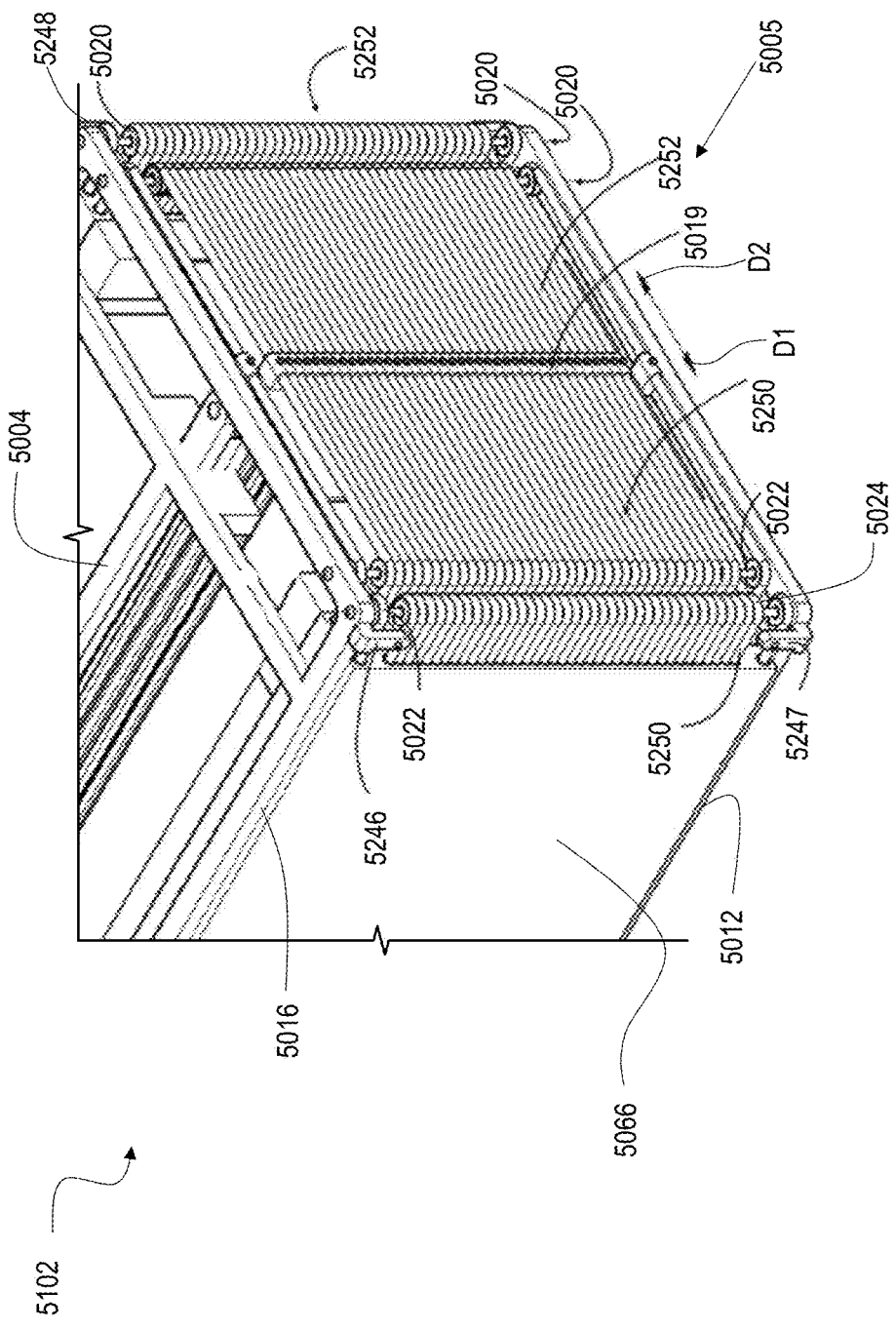
Figure 29:
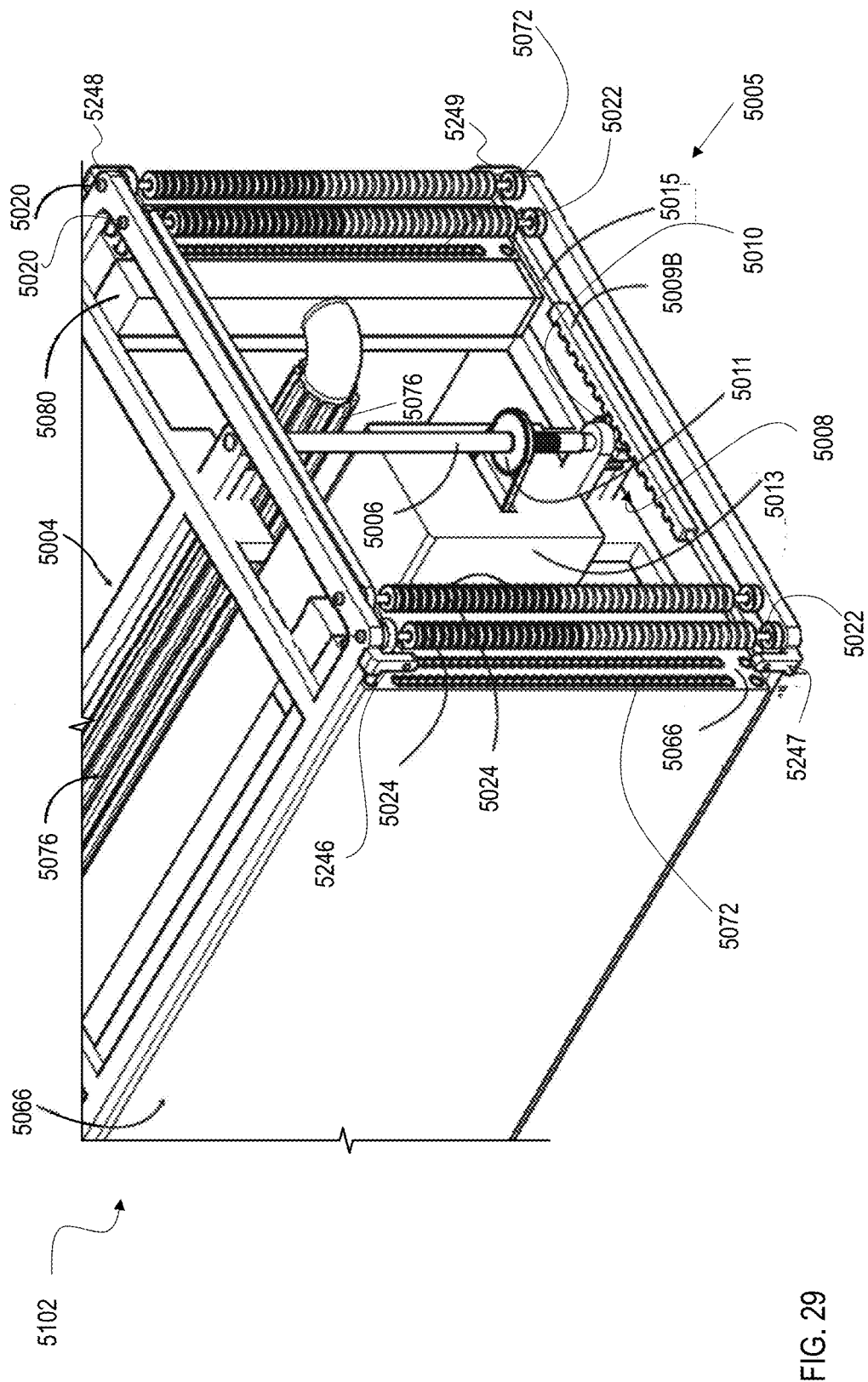
Figure 30:
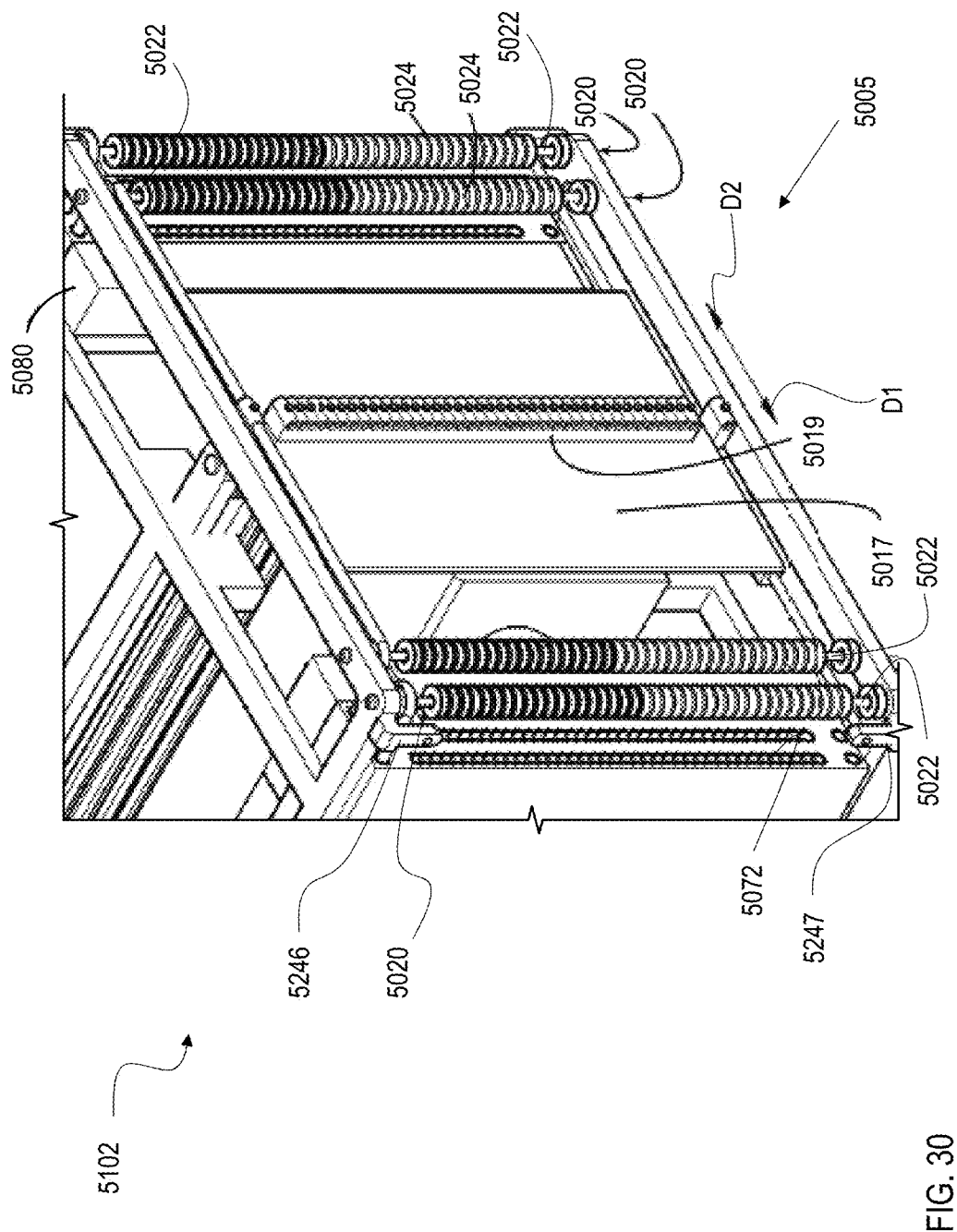
Figure 31:
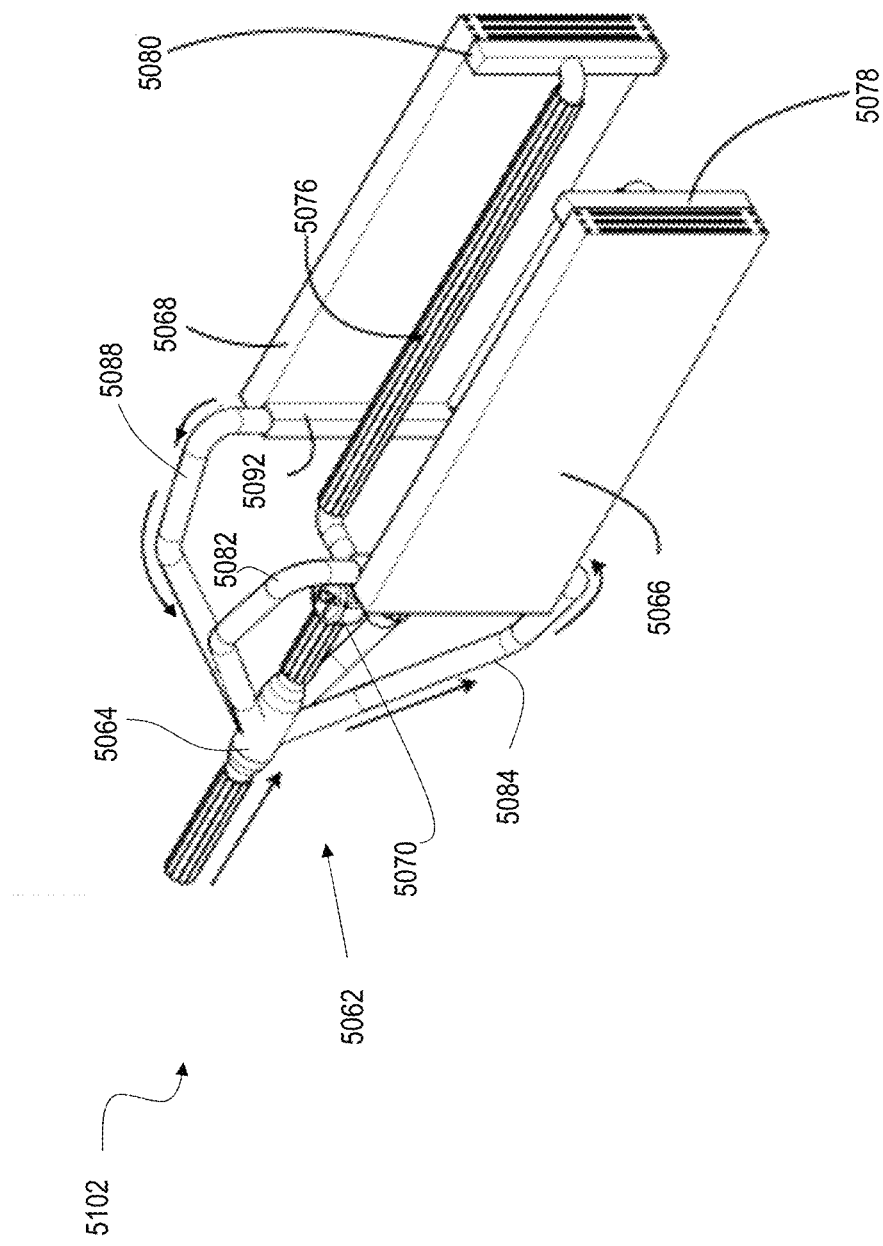
Figure 32:
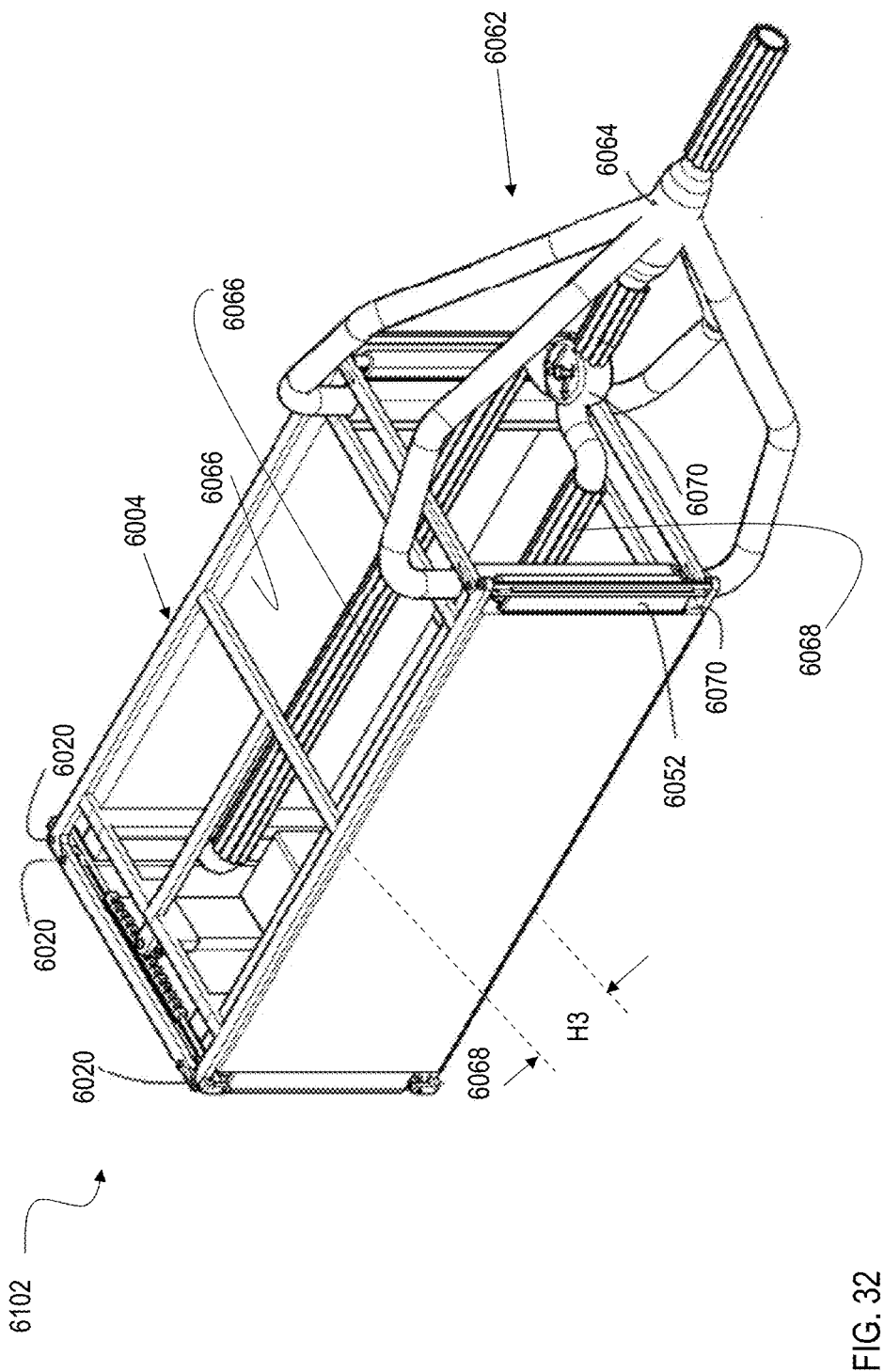
FIGS. 32 through 36 illustrate a heat engine according to a sixth example implementation.
Figure 33:
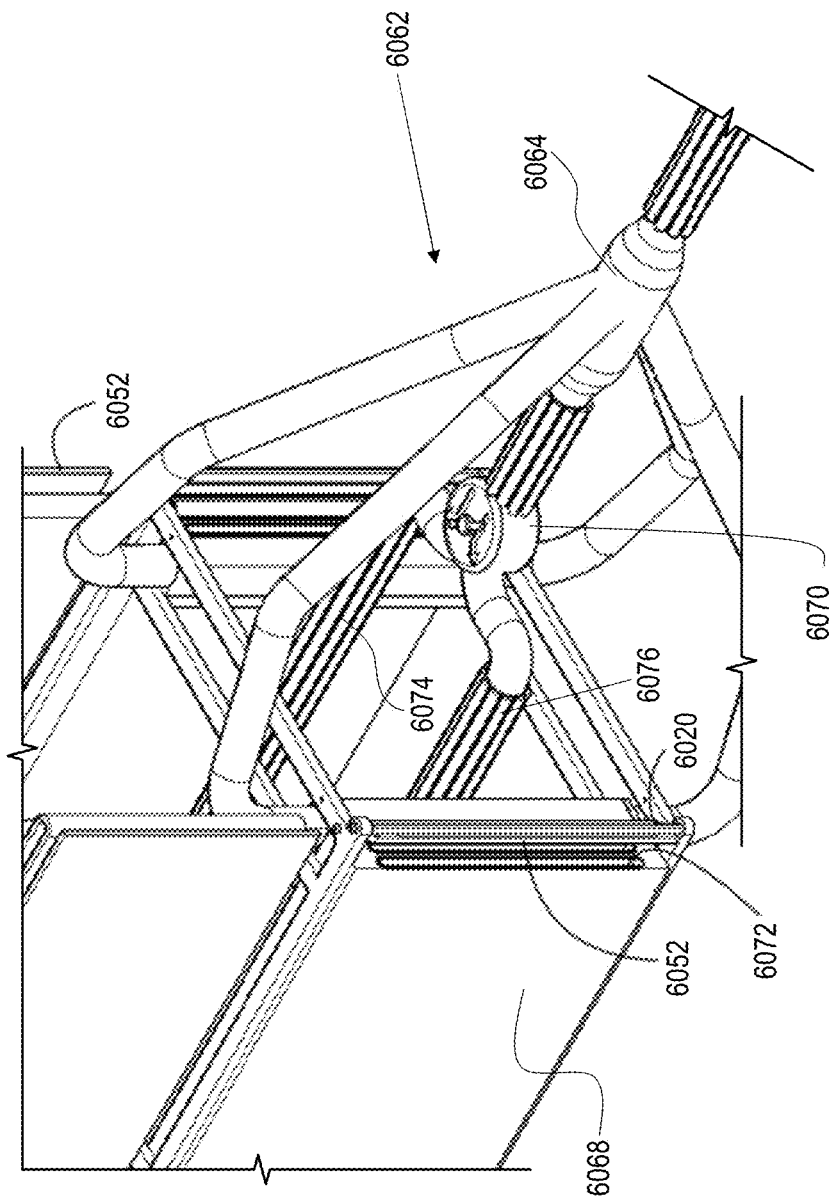
Figure 34:
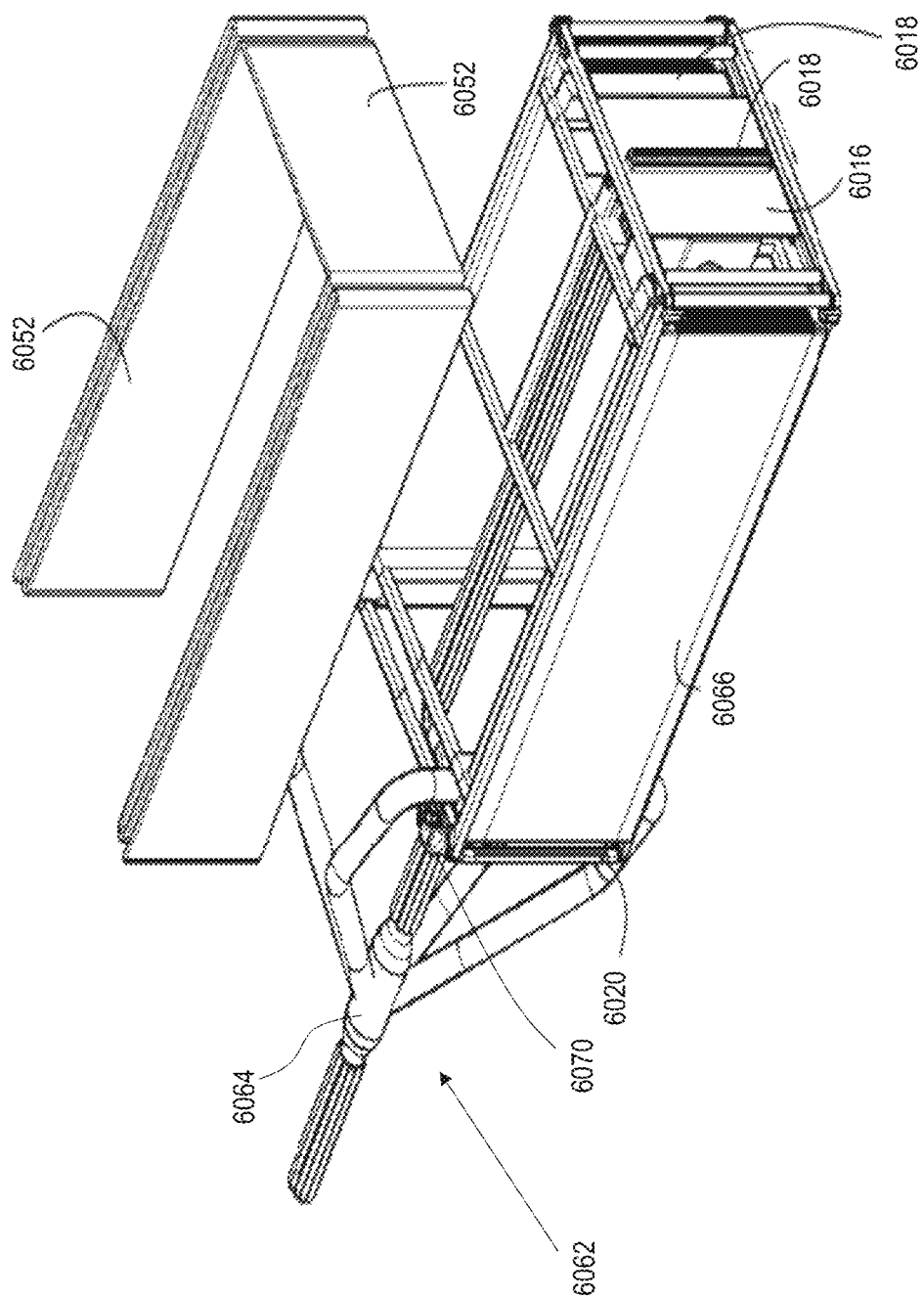
Figure 36:
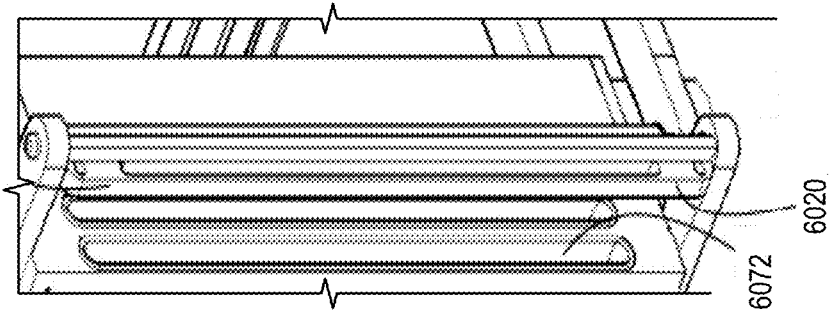
Figure 35:
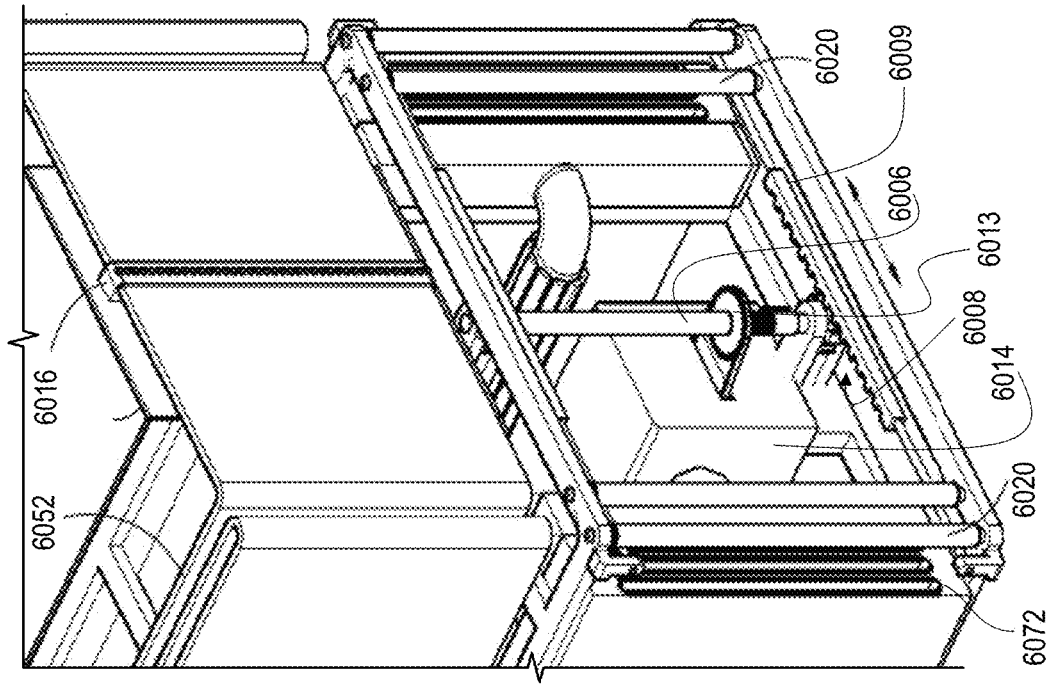

The heat engine 3102 further includes a heat exchanger, such as a heat pipe 3062 for providing thermal energy to the actuator bands 3046 for driving the drive arrangement 3036. For example, the heat pipe 3062 includes an evaporator section 3064 that can be placed in a warm or hot environment or may be connected to a low temperature waste heat source, and two condenser sections 3066, 3068, that are placed in a colder environment as compared to the environment of the evaporator section 3064. The condenser sections 3066, 3068, in this implementation, may be configured as hollow blocks (as shown in FIG. 20) extending along the height H and between the longitudinal ends of the chassis 3004. Further, the condenser sections 3066, 3068 may be fluidly connected to the evaporator section 3064 via a flow control valve 3070, in a similar manner, as described previously. The condenser sections 3066, 3068 are kept partially or non-insulated from outside and are adapted to provide heat exposure to the first array portion 3048 and the second array portion 3050, respectively, of the actuator bands 3046. To this end, each condenser section 3066, 3068, may include a number of thermally conductive receptacles 3072, e.g., tubular receptacles, (shown in FIGS. 20 and 21) to receive the respective long sections of the actuator bands 3046 therein and transfer the heat from the working fluid flowing around them to the respective sections of the actuator bands 3046. In the illustrated example, each condenser section 3066, 3068 includes a hundred and four tubular receptacles 3072, such that each tubular receptacle 3072 receives a corresponding long section of the bands within the respective first array portion 3048 and the second array portion 3050.

Further, first and second adiabatic sections 3074, 3076 may also be connected between the evaporator section 3064 and the respective condenser sections 3066, 3068 via the flow control valve 3070. In some implementations, such as in the illustrated example, the adiabatic sections 3074, 3076 may be connected to the respective condenser sections 3066, 3068 from outside the chassis 3004 via respective fluid connecting conduits 3078, 3080 (shown in FIG. 15). The fluid connecting conduits 3078, 3080 may be adapted to extend along the height H of the chassis 3004. In some implementations, the first and second adiabatic sections 3074, 3076 may be fluidly connected to a center of the respective flow connecting conduits 3078, 3080 such that the conduits facilitate a flow of the heated working fluid from the adiabatic sections 3074, 3076 into the respective condenser sections 3066, 3068. Furthermore, the heat pipe 3062 may include two fluid return members 3082, 3084 connected to the first condenser section 3066 via openings 3085 (only one shown in FIG. 21) provided in a first return connecting conduit 3086 and two fluid return members 3088, 3090 connected to the second condenser section 3068 via openings 3091 (only one shown in FIG. 20) provided in a second return connecting conduit 3092. The fluid return members 3082, 3084, 3088, and 3090 facilitate the condensed and non-condensed working fluid to return back to the evaporator section 3064.

In operation, the working fluid absorbs heat in the evaporator section 3064 and moves to the flow control valve 3070. When the flow control valve 3070 is operated (such as by a valve operating system) to be in the first valve position, the heated working fluid is directed to follow a first fluid path (shown by arrows 3093), i.e., to the first condenser section 3066 via the first adiabatic section 3074 and the first flow connecting conduit 3078. As the heated working fluid flows through the first condenser section 3066, the heat is transferred to the first array portion 3048 of the actuator bands 3046. The heated working fluid, as it moves along the condenser section 3066, cools down or condenses back to liquid, which, along with any remaining non-condensed quantity, is returned back to the evaporator section 3064 via the two fluid return members 3082, 3084 and the first return connecting conduit 3086. As the first array portion 3048 of the bands 3046 is exposed to heat, it contracts to exert a bi-lateral force to rotate the band contacting assemblies 3054 (i.e., the ones on which the array portion 3048 is supported) along their respective direction of rotations (i.e., one of RD1 and RD2). As explained above, the rotation of the assemblies 3054 along their respective rotating directions cooperate to move the actuator bands 3046 in the first direction RD1, thereby rotating the driving member in that direction.

Similarly, when the flow control valve 3070 is switched to a second valve position, the heated working fluid is directed to follow a second fluid path (shown by arrows 3094), i.e., to the second condenser section 3068 via the second adiabatic section 3076 and the second flow connecting conduit 3080. As the heated working fluid flows through the second condenser section 3068, the heat is transferred to the second array portion 3050 of the actuator bands 3046. The heated working fluid, as it moves along the condenser section 3068, cools or condenses back to liquid, which, along with any remaining non-condensed quantity, is returned to the evaporator section 3064 via the two fluid return members 3088, 3090 and the second return connecting conduit 3092. As the second array portion 3050 of the bands 3046 is exposed to heat, it is contracted to exert bi-lateral force to rotate the band contacting assemblies 3054 (i.e., the ones on which the array portions 3050 are supported) along their respective direction of rotations. The rotation of the contacting assemblies 3054 cooperate to move the actuator band 3046 again in the first direction RD1, thereby rotating the driving member 3038 in that direction.

Therefore, by cyclically switching the position of the flow control valve 3070 and cyclically exposing the array portions 3048, 3050 of the actuator bands 3046 to heat, a continual unilateral rotation of the driving member 3038 is achieved, which in turn unilaterally drives the driven member 3040 to provide input rotations to the generator assembly for generating electric power.

Referring now to FIGS. 22 through 26, a heat engine 4102 according to a fourth example implementation is provided. The heat engine 4102 includes similar structural features as that explained with reference to the heat engine 3102, in that, the heat engine 4102 includes a box-like chassis 4004 with a top frame and a base frame, and a drive arrangement 4036 mounted on a first longitudinal end of the chassis 4004 and including a driving member 4038 and a driven member 4040 connected to the driving member 4038 by a drive belt 4042, all implemented in a similar manner. The output rotations of the driven member 4038 are further provided to the generator assembly by a gear box 4044, in a similar manner as described above.

In this implementation, the heat engine 4102 includes an actuator band 4046 that may be embodied as a single flat sheet-like piece of stretched band having a height HB (shown in FIG. 24) extending through the height H1 of the chassis 4004. The actuator band 4046 is folded multiple times along the longitudinal arms of the chassis 4004 and one of the lateral arms disposed on the second longitudinal end (opposite to where the driving arrangement 4036 is provided) of the chassis 4004 to form a U-shaped configuration as shown. A first array portion 4048 (shown in FIG. 25) of the band 4046 extends on one side of the chassis 4004, i.e., between the longitudinal arm 4012 of the base frame and the longitudinal arm 4016 of the top frame of the chassis 4004. Similarly, a second array portion 4050 of the band 4046 extends on the other side of the chassis 4004, i.e., between the longitudinal arm 4014 of the base frame and the longitudinal arm 4018 of the top frame of the chassis 4004. Further, a third array portion 4052 extends laterally at the second longitudinal end and between the lateral arm 4026 of the base frame and lateral arm 4034 of the top frame of the chassis 4004. The band 4046 may be supported on band contacting assemblies 4054 (e.g., ten band assemblies 4054) provided around the chassis 4004 wherein one of the assemblies 4054A supports an end of the band 4046 as well as the driving member 4038. In the illustrated example, shafts 4056 of the band contacting assemblies 4054 may be implemented as long cylindrical shafts extending through the height H1 of the chassis 4004 and suitable for supporting the sheet-like actuator band 4046. Further, the shafts 4056 are adapted to support pulleys and one-direction rotating bearings 4060, that have their respective direction of rotation implemented in a similar manner as described previously with reference to the bearings 3060 of the heat engine 3102.

The heat engine 4102 further includes a heat exchanger, such as a heat pipe 4062 for providing thermal energy to the actuator band 4046 to in turn drive the drive arrangement 4036. For example, the heat pipe 4062 includes an evaporator section 4064 that can be placed in a warm or hot environment or may be connected to a low waste heat source, and two condenser sections 4066, 4068, that are placed in a colder environment as compared to the environment of the evaporator section 4064. Each of the condenser sections 4066, 4068, in this example, may be implemented as hollow blocks extending through the height H1 (i.e., one condenser section 4066 between the longitudinal arms 4012 and 4016 and the other condenser section 4068 being between the longitudinal arms 4014 and 4018) and between the longitudinal ends of the chassis 4004. Further, the condenser sections 4066, 4068 may be fluidly connected to the evaporator section 4064 via a flow control valve 4070, in a similar manner, as described above. The condenser sections 4066, 4068 are kept partially insulated or non-insulated from outside and are adapted to provide thermal heat exposure to the first array portion 4048 and the second array portion 4050, respectively, of the actuator band 4046. To this end, each condenser section 4066, 4068 may include a number of thermally conductive hollow through receptacles 4072 (shown in FIGS. 23 and 25) to receive the sections of the actuator band 4046 therein and transfer the heat from the working fluid flowing around them to the respective sections of the actuator band 4046. As shown in the illustrated example, the hollow through receptacles 4072 are configured to have a rectangular cross-section complementing the rectangular profile of the band 4046.

Further, first and second adiabatic sections 4074, 4076 may also be connected between the evaporator section 4064 and the respective condenser sections 4066, 4068 via the flow control valve 4070. The adiabatic sections 4074, 4076 are further connected to the respective condenser sections 4066, 4068 from outside the chassis 4004 via respective fluid connecting conduits 4078, 4080 that extend along the height H1 of the chassis 4004. Furthermore, the heat pipe 4062 includes two fluid return members 4082, 4084 connected on one end to the first condenser section 4066 via a first return connecting conduit 4086 and to the evaporator section 4062 on the other end. Similarly, two fluid return members 4088, 4090 are connected at one of the second condenser section 4068 via a second return connecting conduit 4092. The fluid return members 4082, 4084, 4088, and 4090 facilitate the condensed and non-condensed working fluid to return back to the evaporator section 4064.

The heat engine 4102 including the heat pipe 4062 and the flow control valve 4070 may be configured to operate in a similar manner as described above for the heat engine 3102 in order to similarly expose the array portions 4048 and 4050 cyclically to heat, thereby moving the actuator band 4046 and producing unilateral rotations of the drive member 4038 and the driven member 4040.

Referring now to FIGS. 27 through 31, a heat engine 5102 according to a fifth example implementation of the present disclosure is provided. The heat engine 5102 may be a scaled-up configuration of the heat engine 102 illustrated in FIGS. 2 through 9 above. The heat engine 5102 may include a large box-like chassis 5004 having a height H2, structured similar to the chassis 3004, 4004 described above. The chassis 5004 includes two longitudinal ends 5005, 5007. The heat engine 5102 may include a work output member 5006 (shown in FIG. 29) that is embodied as an output shaft (hereinafter referred to as the output shaft 5006), similar to the output shaft 228 described above. The output shaft 5006 may be mounted on a mounting assembly 5008 provided on the chassis 5004 at the first longitudinal end 5005. For example, the output shaft 5006 is supported on and driven by a top gear arrangement having a top linear rack gear 5009A (shown in FIG. 27) and a top pinion gear (not shown) and a bottom gear arrangement having a bottom linear rack gear 5009B and a bottom pinion gear 5010 (shown in FIG. 29). In some implementations, the gear arrangement may also include a driven gear member 5011 coupled to a gear box 5013 that converts the bi-lateral rotations of the output shaft 5006 into unilateral rotations for providing input to the electric power generation system in a similar manner as described previously for gear box 230.

Further, the heat engine 5102 includes a first array of actuator bands 5250 and a second array of actuator bands 5252, which when exposed to heat are configured to drive the linear rack gear 5009 in a first direction (shown by arrowhead D1) and the opposite second direction (shown by arrowhead D2), respectively. In some implementations, such as that shown in FIG. 28, multiple actuator bands (similar to the actuator bands 250, 252 described above) may be arranged in a layered or stacked manner to extend through the height H2 and form the respective arrays 5250, 5252. In the illustrated example, the heat engine 5102 includes twenty-six bands in each of the first array 5250 and the second array 5252. Alternatively, the first and second arrays of actuator bands 5250, 5252 may each be implemented as single long tubular bands that are folded and extended in multiple layers (twenty-six layers in this example) to cover the height H2 and form the respective arrays 5250, 5252. The number of layers illustrated herein is merely an example and may be varied to suit the scale of applications without deviating from the scope of claimed subject matter.

Further, in the illustrated example, each actuator band in the corresponding layer of the first array of actuator bands 5250 may have one end secured to the chassis 5004, such as at the second longitudinal end 5007 along a vertical axis (not shown) extending between fastening mechanisms 5246 and 5247. A second end of each actuator band in the first array 5250 may be secured to a band mounting member 5019 on the first longitudinal end 5005. In some examples, the band mounting member 5019 may be a part of the mounting assembly 5008, whereas in some alternative examples, may be configured as a separate component to achieve similar results. Further, each actuator band in the corresponding layer of the second array of actuator band 5252 may have one end secured to the chassis 5004, i.e., on the second longitudinal end 5007 along a vertical axis (not shown) extending between fastening mechanisms 5248 and 5249. Further, a second end of the actuator bands in the second array 5252 may be secured to the band mounting member 5019 on the first longitudinal end 5005. Further, as shown more clearly in FIG. 30, the mounting assembly 5008 includes a mounting plate 5017 coupled to the top and bottom linear rack gears 5009, wherein the mounting plate 5017 includes the number of band mounting members 5019 for receiving and securing the various respective layers on each of the first and the second array of actuator bands 5250 and 5252 thereto. For example, each layer in the band mounting member 5019 may be implemented in a similar manner as described previously for the band mounting member 254, in that, each layer of the band mounting member 5019 includes a respective first end for receiving and securing the second end of a respective layer of actuator band in the first array of 5250 and a respective second end for receiving and securing thereto the second end of a respective layer of actuator band in the second array 5252. Further, the mounting plate 5017 is configured to be supported on a top guiding bar (not shown) and a bottom guiding bar 5015 to move in directions D1 and D2 in response to force exerted by the first and second array of actuator bands 5250, 5252, respectively. The top guiding bar may be secured at the ends to the top longitudinal arms 5016 and 5018 by the fastening mechanisms 5246 and 5248, respectively. Similarly, the bottom guiding bar 5015 may be secured at the ends to the bottom longitudinal arms 5012 and 5014 by the fastening mechanisms 5247 and 5249, respectively.

Furthermore, a number of band contacting assemblies 5020, each including shafts 5022, pulleys 5024 and free-rotating bearings (not shown), are provided around the chassis 5004 for movably supporting the first and second array of actuator bands 5250, 5252. Each of the band contacting assemblies 5020 may be configured to extend along the height H2 of the chassis 5004 and may be positioned in a similar configuration around the chassis 5004 as that provided for the band contacting assemblies 264, 266, 268, 270, 272, 274 described above. Further, in the illustrated example, each band contacting assembly 5020 may include the shaft implemented as a long cylindrical shaft 5022 supporting multiple pulleys (one for every layer of actuator band) and two free rotating bearings fitted at the ends of the shaft 5022. As the arrays of actuator bands 5250, 5252 are exposed to heat, the band contacting assemblies 5020 cooperate to move the actuator bands 5250, 5252 in the directions D1 and D2 in a similar manner as described above for actuator bands 250 and 252 for generating bi-lateral rotations of the output shaft 5006.

Similar to the other heat engines described above, the heat engine 5102 in this implementation also includes a heat exchanger 5062, e.g., a heat pipe, for providing thermal energy to the first and second arrays of actuator bands 5250, 5252 to in turn drive the output shaft 5006. As illustrated, the heat pipe 5062 includes an evaporator section 5064 to be placed in a warm or hot environment or that may be connected to a low waste heat source, and two (or more in some alternative examples) condenser sections 5066, 5068, to be placed in a colder environment as compared to the environment of the evaporator section 5064. Further, the condenser sections 5066, 5068 may be fluidly connected to the evaporator section 5064 via a flow control valve 5070, in a similar manner, as described previously. The condenser sections 5066, 5068, in this implementation, may be configured as hollow blocks extending along the height H2 and between the longitudinal ends 5005, 5007 of the chassis 5004. The condenser sections 5066, 5068 may be kept partially or non-thermally insulated from outside and may be adapted to provide heat exposure to the first and second array of actuator bands 5250, 5252, respectively. Each condenser section 5066, 5068 may include a number of thermally conductive receptacles 5072 (shown in FIG. 29) to receive the various layers of the arrays 5250, 5252 therein and transfer the heat from heated working fluid flowing around them to the actuator bands. In the illustrated example, each condenser section 5066, 5068 includes a hundred and four tubular receptacles 5072, such that each tubular receptacle 5072 receives a corresponding long section of the actuator band of the respective first array portion 5250 and the second array portion 5252.

Further, first and second adiabatic sections 5074, 5076 may also be connected between the evaporator section 5064 and the respective condenser sections 5066, 5068 via the flow control valve 5070. In the illustrated implementation, the adiabatic sections 5074, 5076 are connected to the respective condenser sections 5066, 5068 from inside the chassis 5004 (for example, to achieve a compact design) via respective fluid connecting conduits 5078, 5080. The fluid connecting conduits 5078, 5080 may be adapted to extend along the height H2 of the chassis 5004. Furthermore, the heat pipe 5062 may include two fluid return members 5082, 5084 connected to the first condenser section 5066 via a first return connecting conduit 5086 and two fluid return members 5088, 5090 connected to the second condenser section 5068 via a second return connecting conduit 5092. The fluid return members 5082, 5084, 5088, and 5090 may facilitate the condensed and non-condensed working fluid to return back to the evaporator section 5064.

In operation, the working fluid absorbs heat in the evaporator section 5064 and moves to the flow control valve 5070. When the flow control valve 5070 is in the first valve position, the heated working fluid may be directed to follow a first fluid path, i.e., to the first condenser section 5066 via the first adiabatic section 5074 and the first flow connecting conduit 5078. As the heated working fluid flows through the first condenser section 5066, the heat is transferred to the first array portion 5250. The working fluid, as it moves along the condenser section 5066, cools down or condenses back to liquid, which, along with any remaining non-condensed quantity, is returned to the evaporator section 5064 via the two fluid return members 5082, 5084 and the first return connecting conduit 5086. As the first array portion 5250 is exposed to heat, it is contracted to displace the top and bottom linear rack gears 5009 in the first direction D1, thereby rotating the output shaft 5006 in direction D1 as well.

Similarly, when the flow control valve 5070 is switched to a second valve position, the heated working fluid is directed to follow a second fluid path, i.e., to the second condenser section 5068 via the second adiabatic section 5076 and the second flow connecting conduit 5080. As the vaporized working fluid flows through the second condenser section 5068, the heat is transferred to the second array portion 5252. The working fluid, as it moves along the condenser section 5068, condenses back to liquid, which, along with any remaining non-condensed quantity, is returned to the evaporator section 5064 via the two fluid return members 5088, 5090 and the second return connecting conduit 5092. As the second array portion 5252 is exposed to heat, it is contracted to displace the top and bottom linear rack gears 5009 in the second direction D2, thereby rotating the output shaft 5006 in direction D2 as well.

Therefore, by cyclically switching the position of the flow control valve 5070 and cyclically exposing the array portions 5250, 5252 of the actuator band, continual bilateral rotations of the output shaft 5006 are achieved, which in turn are converted by the driven gear member 5011 and the gear box 5013 into unilateral rotations for providing input to the electric power generation system.

Referring now to FIGS. 32 through 36, a heat engine 6102 according to a sixth example implementation is provided. The heat engine 6102 includes a chassis 6004 and an output shaft 6006 (shown in FIG. 35) supported on a gear arrangement 6009, wherein these components are implemented in a similar manner as described above for chassis 5004 and output shaft 5006. The gear arrangement may also include a driven gear member 6013 coupled to a gear box 6014 that converts the bi-lateral rotations of the output shaft 6006 into unilateral rotations for providing input to the generator assembly. It may be appreciated that the conversion of bi-lateral rotations to unilateral rotations may be utilized in the implementations that do not utilize one-side-confined rotating bearings and that various mechanisms are well known to provide the required conversions.

In this example, the heat engine 6102 includes a single piece of sheet-like actuator band 6052 extending through the height H3 of the chassis 6004. The actuator band 6052 defines a first array of actuator band 6053 and a second array of actuator band 6054 each connected to drive the gear arrangement 6009 in directions D1 and D2 in a similar manner as described for heat engine 5102 above. For example, each of the first array of actuator band 6253 and second array of actuator band 6254 may have one end secured to the chassis 6004, and a second end secured to a mounting plate 6016, and a linear rack gear 6009 (both at the top and the bottom) of a mounting assembly 6008. Coupling of the actuator band 6052 to the mounting plate 6016 drives the output shaft 6006 in directions D1 and D2 in a similar manner, as described earlier. Further, the actuator band 6052 is supported on a number of band contacting assemblies 6020 provided around the chassis 6004 in a similar manner as described above.

Further, the heat engine 6102 includes a heat exchanger 6062, for providing thermal energy to the actuator bands 6052 to in turn drive the output shaft 6006. The heat exchanger 6062 is also implemented in a similar manner, except that condenser sections 6066, 6068 may include a hollow receptacle 6070 having profile complimentary to the cross-sectional profile of the actuator band 6052. Further, the heat pipe 6062 includes an evaporator section 6064 that heats a working fluid, for example from a low temperature source or low temperature gradient environment. A flow control valve 6070 directs the flow of heated working fluid to one of the condenser sections 6066, 6068 via first and second adiabatic sections 6074, 6076, thereby exposing one of the arrays 6053, 6054 to heat.

As the first array portion 6053 is exposed to heat, it is contracted to displace the top and bottom linear rack gears 6009 in the first direction D1, thereby rotating the output shaft 6006 in direction D1. As the position of the valve 6070 is switched and the second array portion 6054 is exposed to heat, it is contracted to displace the top and bottom linear rack gears 6009 in the second direction D2, thereby rotating the output shaft 6006 in the opposite direction D2. Therefore, by cyclically switching the position of the flow control valve 6070 and cyclically exposing the array portions 6053, 6054 of the actuator band 6052, continual bilateral rotations of the output shaft 6006 are achieved, which in turn are converted by the driven gear member 6013 and the gear box 6014 into unilateral rotations for providing input to the generator assembly.

Referring now to FIGS. 37 through 43, a heat engine 7102 according to a seventh example implementation is provided. The heat engine 7102 includes a chassis 7004 and a rotating cylinder 7006 rotatably supported on the chassis 7004. As illustrated, the chassis 7004 includes a mounting frame 7008 supported on a pair of legs 7010 that may facilitate installation of the engine 7102 at a facility. The mounting frame 7008 includes a first arm 7012 and a second arm 7014 spaced apart to define a length L of the chassis 7004. The cylinder 7006 is rotatably supported on a main shaft 7016 (the work output member in this example) that is connected to the first arm 7012 and the second arm 7014 at its ends. Further, the mounting frame 7008 and the main shaft 7016 divide the cylinder 7006 into two longitudinal half sections 7006-1, 7006-2 along the length L2 of the cylinder 7006, one on each side of the mounting frame 7008.

Figure 37:
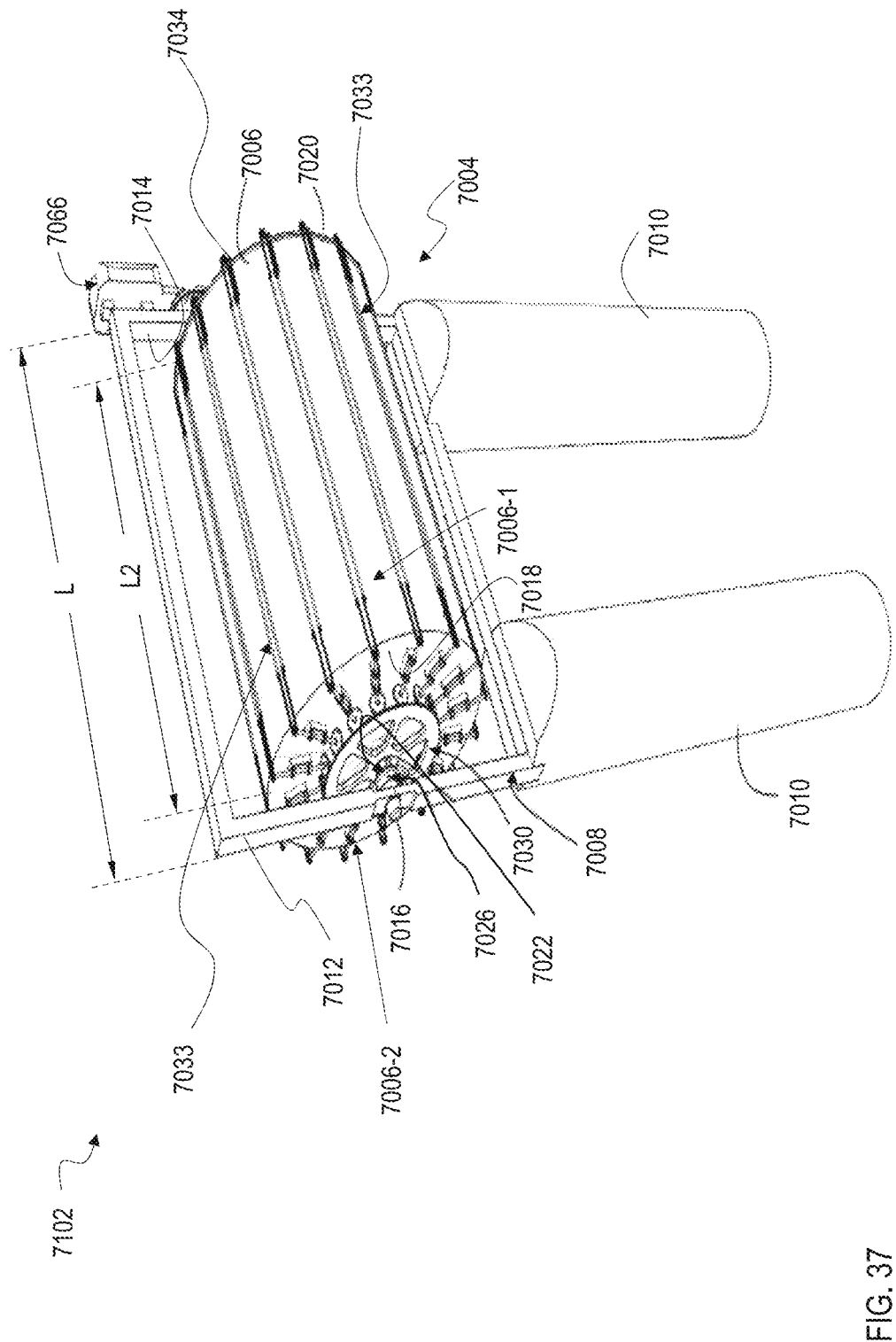
FIGS. 37 through 43 illustrate a heat engine according to a seventh example implementation.
Figure 41:
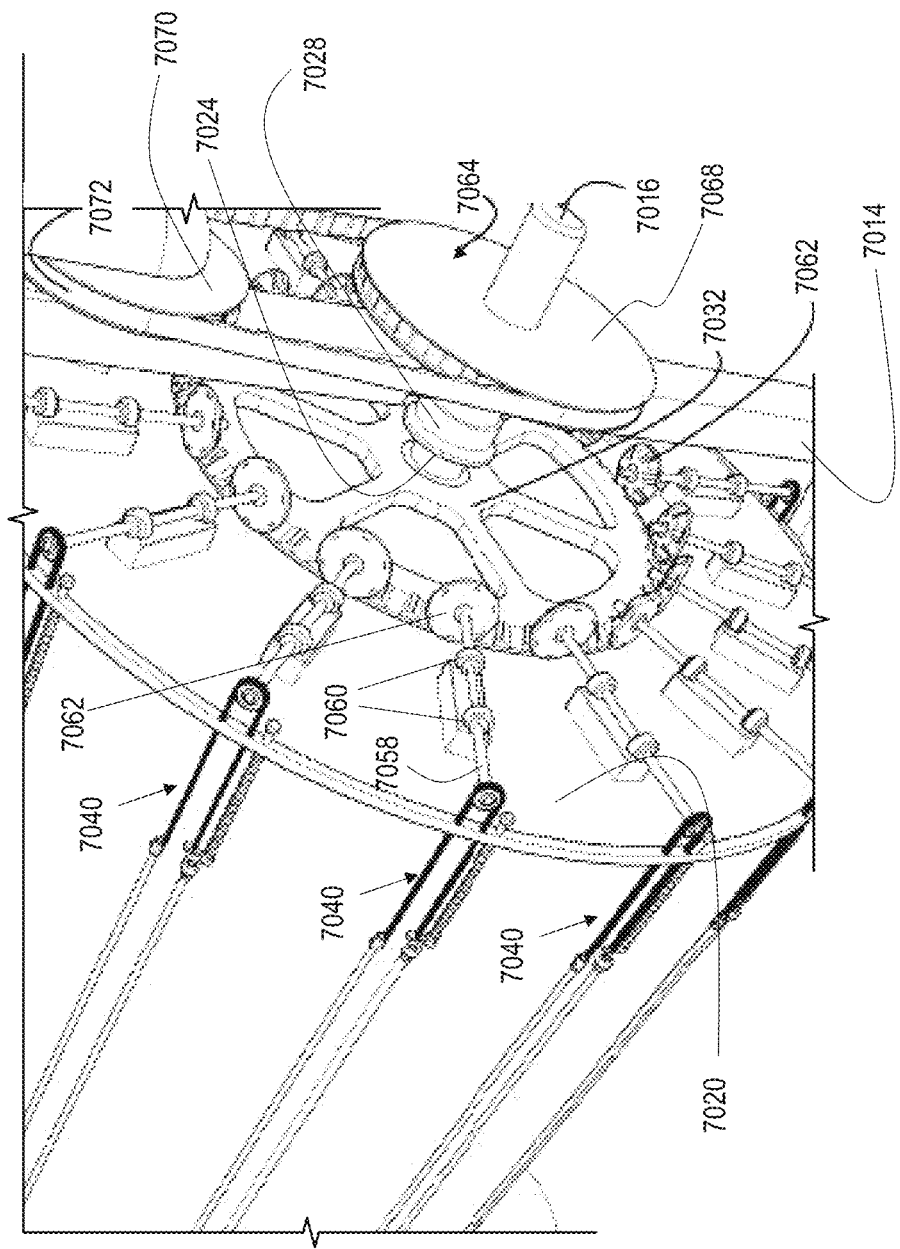
Figure 42:
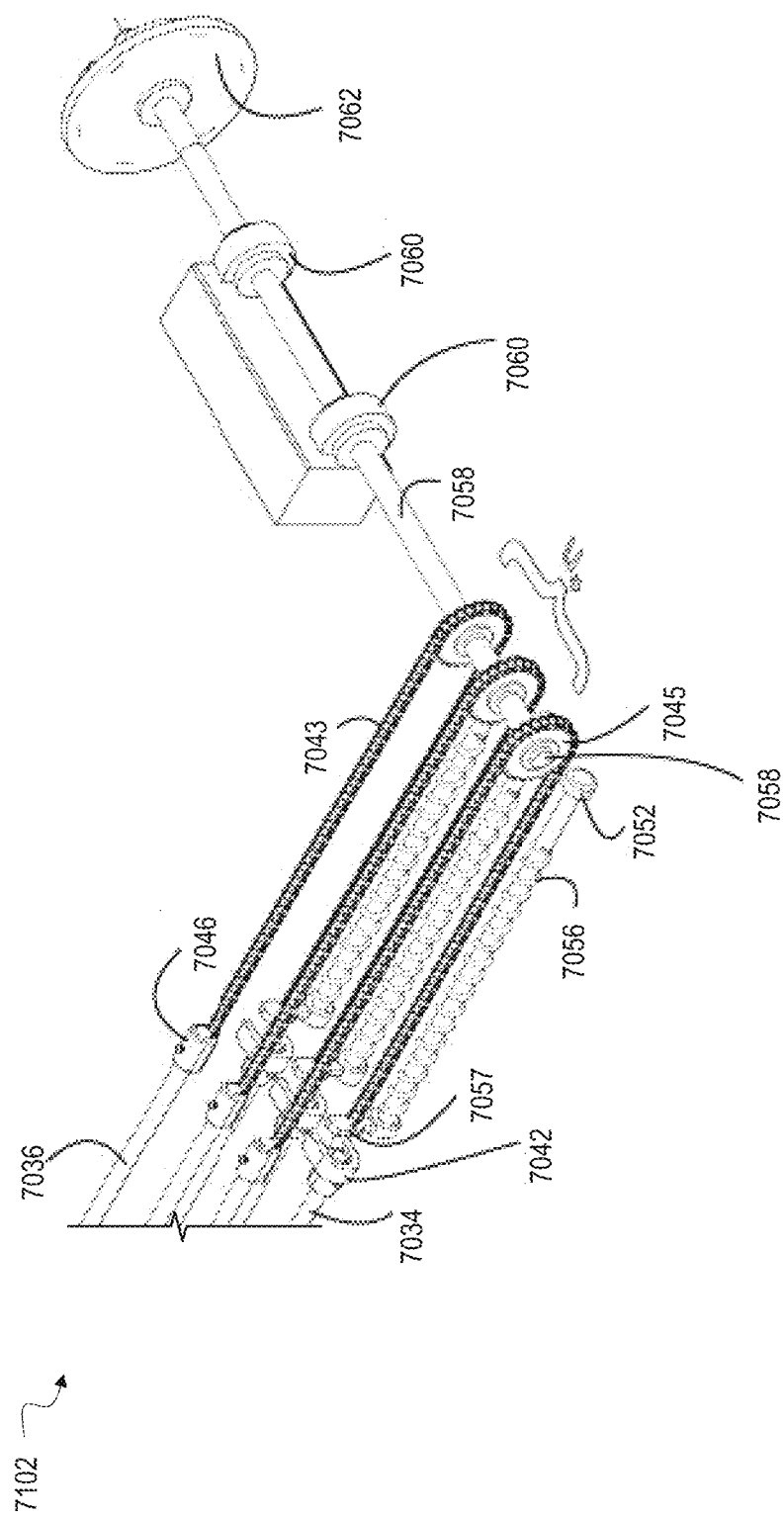
Figure 43:
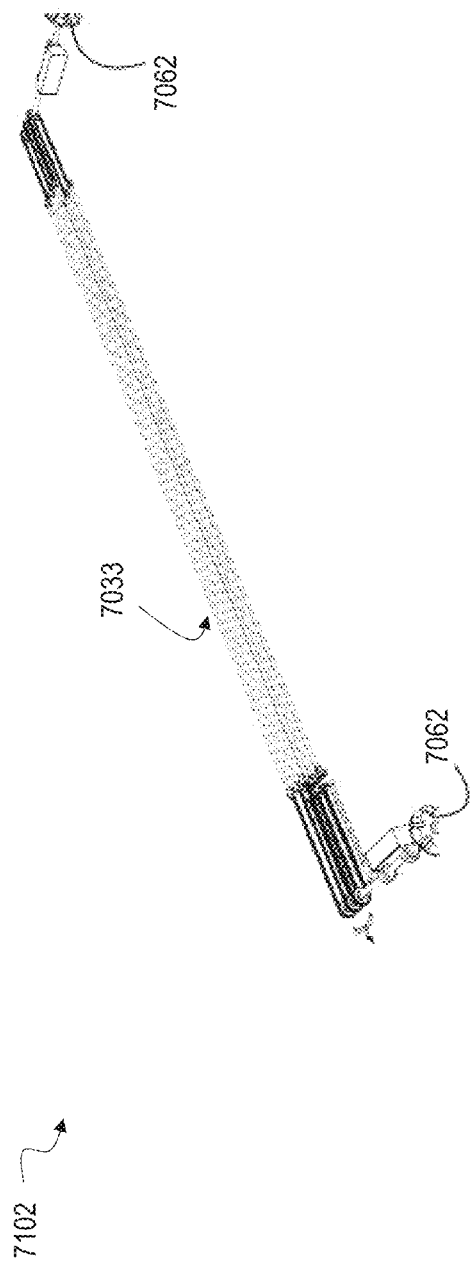
Figure 44:
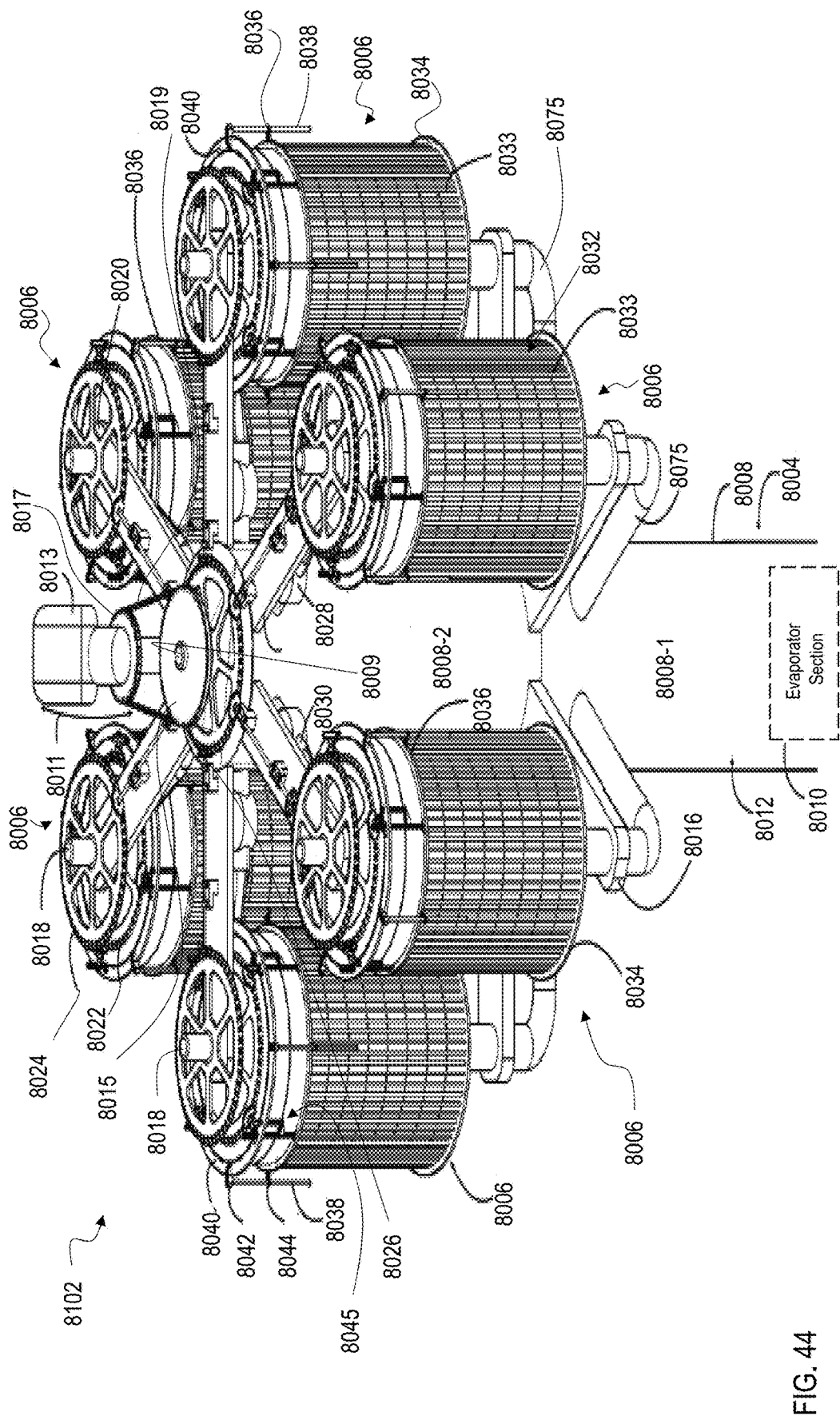
FIGS. 44 through 51 illustrate a heat engine according to a first version of an eighth example implementation.

The cylinder 7006 includes a first face 7018 facing and coupled to the first arm 7012 and a second face 7020 facing and coupled to the second arm 7014. Further, as shown in FIGS. 37 and 41, the main shaft 7016 is connected to the first and the second arms 7012, 7014 by bearings 7022 and 7024, respectively, which are in turn connected to bearing housings 7026, 7028 fixedly attached to the first arm 7012 and the second arm 7014, respectively. The bearings 7022 and 7024 may be configured to facilitate rotating of the main shaft 7016 during operation, as will be described in the following description. Further, a first fixed bevel gear 7030 and a second fixed bevel gear 7032 are fixedly mounted on the first arm 7012 and the second arm 7014, respectively. In one implementation, the fixed bevel gears 7030, 7032 and the bearing housings 7026, 7028 may be fixed to the mounting frame 7008, and thus may not be rotatable with respect to the frame 7008.

Further, the heat engine 7102 includes a number of actuator band sets or arrays 7033 spaced apart and disposed along the circumference of the cylinder 7006, such that a first array of actuator band sets 7033-1 is provided on the first section 7006-1 and a second array of actuator band sets 7033-2 is provided on the second section 7006-2 of the cylinder 7006. In an example implementation, each array of actuator band set 7033 includes a first actuator band 7034 and a second actuator band 7036 (shown more clearly in FIG. 39) extending longitudinally between the first face 7018 and the second face 7020 of the cylinder 7006. The engine 7102 further includes a number of driving mechanisms 7037 (shown in FIG. 40) that are connected to the respective actuator band sets 7033 and are adapted to generate rotational power to be provided to an electric power generation system and to utilize a part of the generated rotational power for rotating the cylinder 7006. For example, each driving mechanism 7037 includes a first chain and sprocket arrangement 7038 disposed on the first face 7018 and including a chain 7041 (having sections 7041-1, 7041-2) moving on a sprocket 7039 and a second chain and sprocket arrangement 7040 disposed on the second face 7020 and including a chain 7043 (having sections 7043-1, 7043-2) moving on a sprocket 7045. Each of the first and second chain and sprocket arrangements 7038, 7040 is configured to secure the respective actuator bands sets 7033 to the cylinder 7006 and to the mounting frame 7008. A first end of the first actuator band 7034 is fixedly secured to the body of the cylinder 7006 towards the second face 7020, by a fastening mechanism, such as a bolted fastener 7042 (shown more clearly in FIG. 40). A second end of the first actuator band 7034 is movably secured to a first chain section 7041-1 of the first chain and sprocket arrangement 7038 at the first face 7018 by a movable fastening mechanism 7044. Further, the first end of the second actuator band 7036 is movably secured to a first chain section 7043-1 of the second chain and sprocket arrangement 7040 at the second face 7020 by a movable fastening mechanism 7046 (shown more clearly in FIG. 40). The second end of the second actuator band 7036 is also movably secured to a second chain section 7041-2 of the first chain and sprocket arrangement 7038 by a movable fastening mechanism 7048.

In some implementations, the heat engine 7102 may include a mounting flange extending circumferentially on the second face 7020 of the cylinder 7006. The mounting flange 7050 is configured to support the second chain and sprocket arrangement 7040 and a guiding bar 7052. For example, the mounting flange 7050 may include a number of apertures 7054 disposed thereon to allow the chain sections 7043-1 and 7043-2 and the guiding bar 7052 to pass therethrough and be secured to the components of the engine 7102, as described herein. In some implementations, the mounting flange 7050 may be a separate component coupled to the cylinder 7006 by some fastening mechanisms. However, in some other implementations, the mounting flange 7050 may be formed integral to the cylinder 7006. The guiding bar 7054 may include a spring member 7056 and may be coupled to the second chain section 7043-2 of the second chain and sprocket arrangement 7040 by a movable fastener 7057 to allow linear movement of the actuator bands when they expand or contract in response to heat exposure. The spring member 7056 may be biased in a stretched position and may be configured to be compressed by the action of chain 7043 to accommodate for the change in dimensions of the actuator band set 7033 when exposed to heat.

Figure 38:
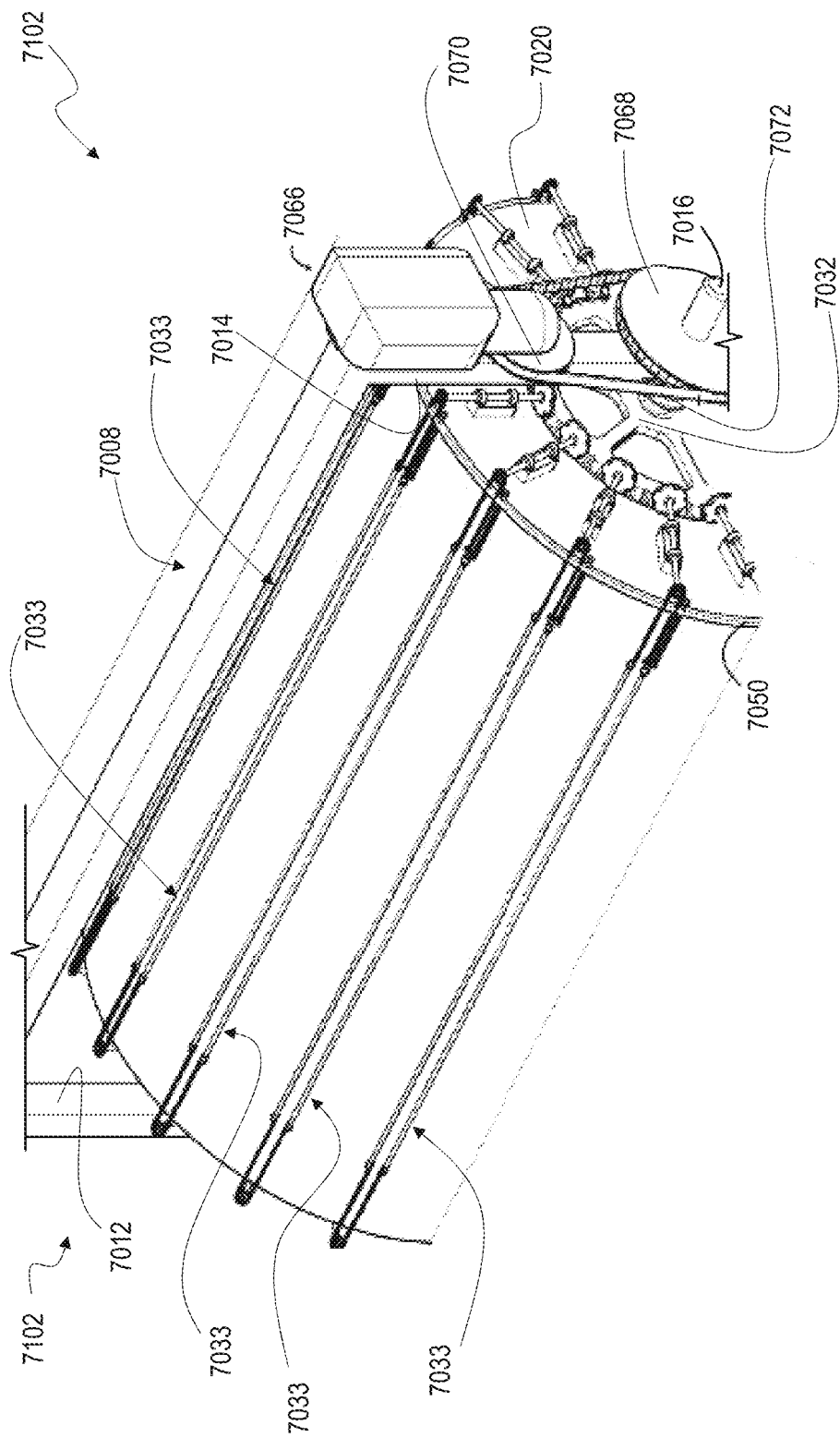
Figure 39:
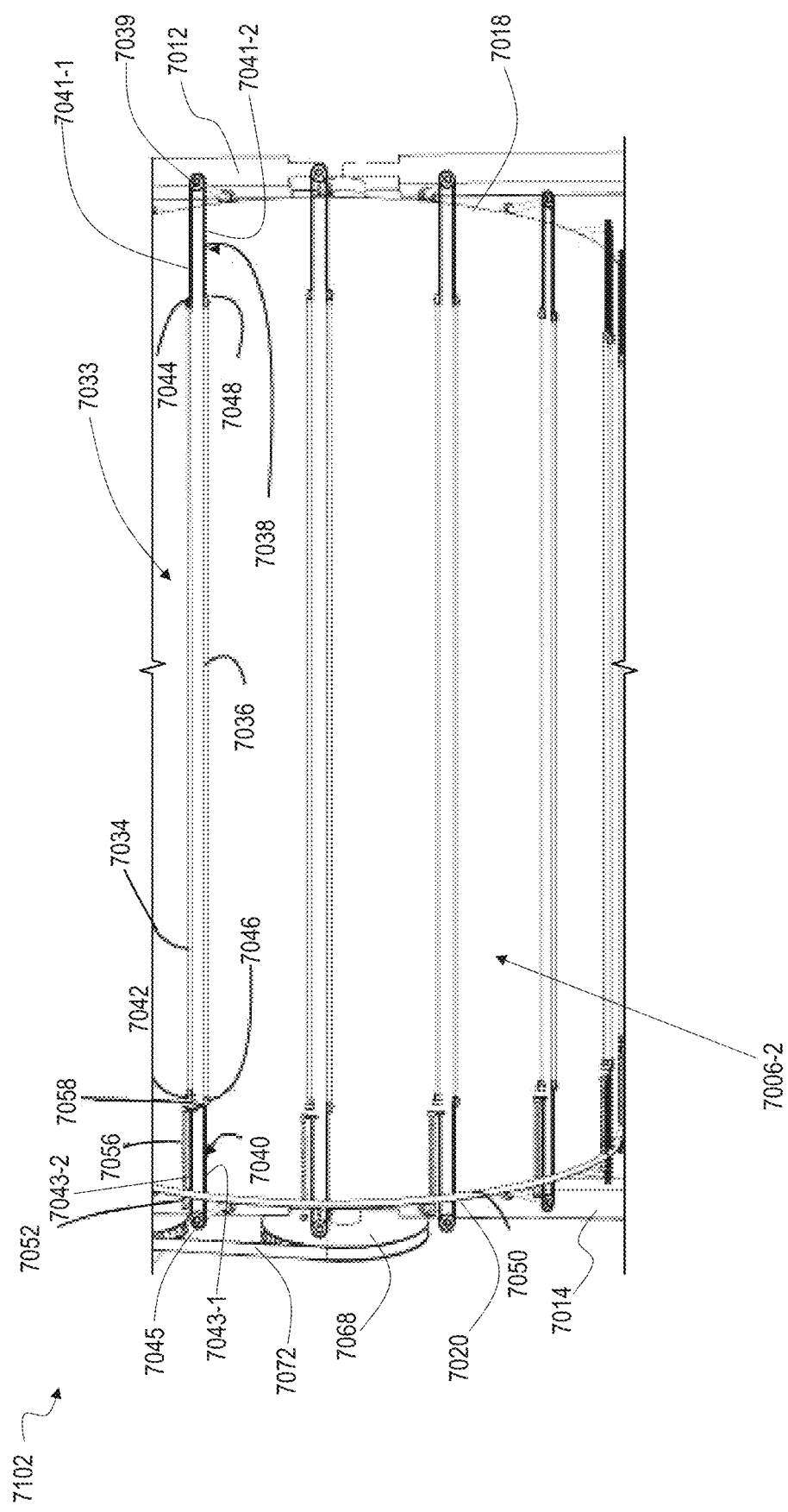
Figure 40:
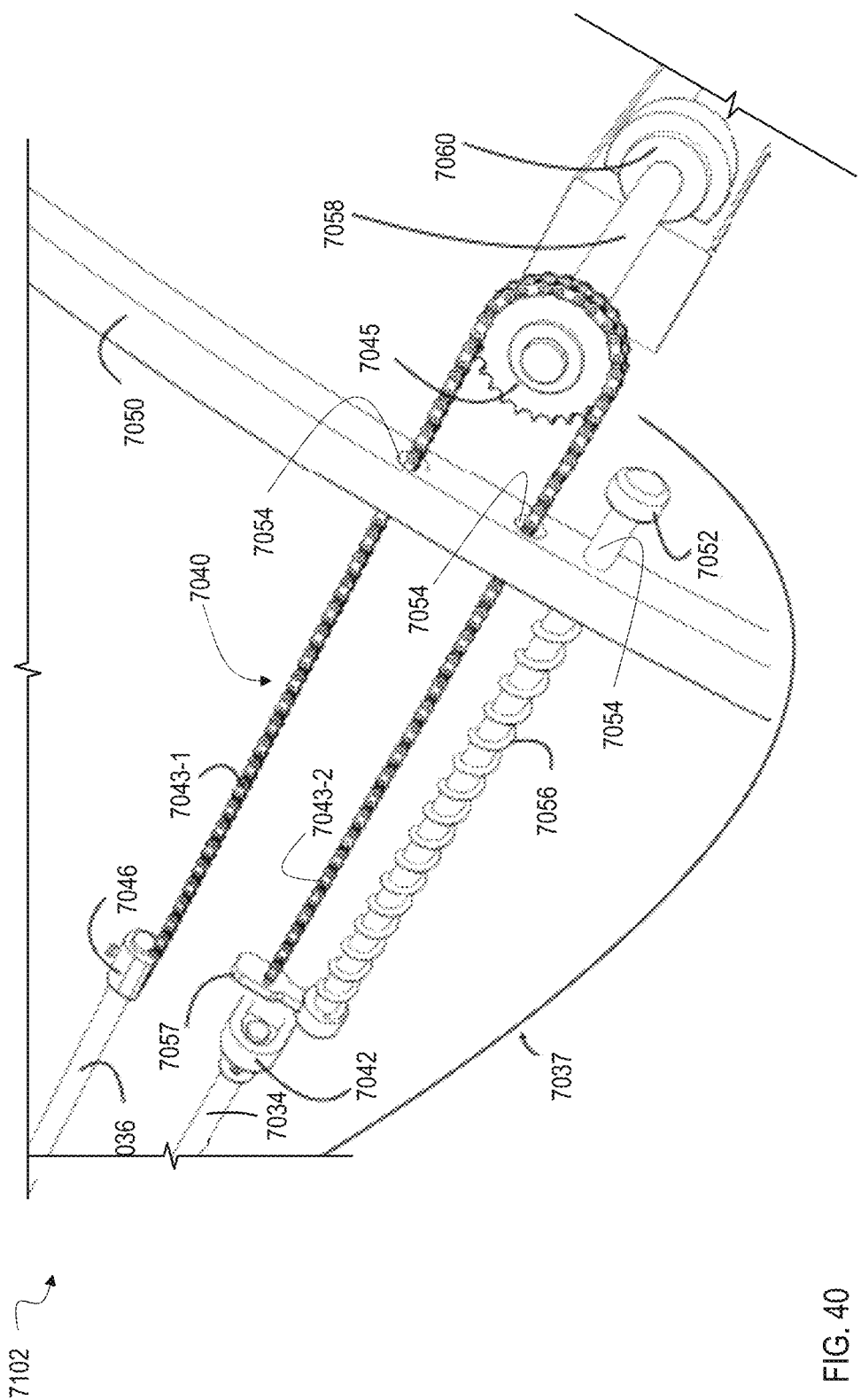

Further, as shown in FIG. 40, each of the chain and sprocket arrangement 7038 and 7040 is connected to the respective fixed bevel gears 7030, 7032 by a respective drive shaft 7058 (only one side shown), a pair of bearings 7060 and a rotating gear, such as a bevel gear 7062. In an example implementation, the bearings 7060 may be one-direction rotating bearings, that are configured to rotate the shaft 7058 and in turn the bevel gear 7062 in only one direction. Furthermore, in some implementations, the heat engine 7102 includes a drive arrangement 7064 provided on one of the faces, such as the second face 7020 of the cylinder and mounted on the second arm 7014, as shown in FIGS. 38 and 41. The drive arrangement 7064 may be configured to transfer the rotations generated by the main shaft 7016 to a power generation assembly 7066, which may include a gear box having mechanisms for increasing the rotations, coupled electric power generation including a generator, the control elements, and output conditioning elements that are required for controlling and adopting the power plant for a given application. In an example implementation, the drive arrangement 7064 may be embodied as a timing pulley arrangement (hereinafter referred to as the timing pulley arrangement 7064) including driving and driven pulleys 7068, 7070, respectively, and a timing belt 7072 connecting the driving pulley 7068 to the driven pulley 7070. The driving pulley 7068 is driven by the rotations of the main shaft 7016 and is configured to drive the driven pulley 7070 that in turn transfers the rotation to the power generation assembly 7066. The timing pulley arrangement 7064 includes teeth and pockets on the outside diameter of the pulley's bodies and complimenting teeth and pockets on the inner surface of the timing belt 7072. The timing pulley arrangement 7064 may be configured to provide an additional functionality of preventing slipping when the heat engine 7102 is operating. It may be appreciated that other types of gear arrangements may be used to achieve similar results.

The heat engine 7102, described in this example implementation, may be placed in a location that has two adjacent different temperature environments, such that one environment temperature is greater or warmer than the other. For example, the bottom of the lakes contains a significant amount of water, for example, at 4 degrees centigrade and can provide a significant thermal energy extraction potential when the outside of the lake temperature can be below or about 0 degrees centigrade in winters and +30 degrees centigrade or above in summers. The heat engine 7102 according to this implementation can be used in such locations in most of the summers, springs, and fall where the top layer remains unfrozen. Further, the heat engine 7102 may also be operable in hot and very hot locations where the underwater location is much colder than outside. To this end, the heat engine 7102 may be placed and the size of the cylinder 7006 may be selected such that one of the sections 7006-1, 7006-2 of the cylinder 7006 remains exposed to the first environment having temperature T1 and the other one of the sections 7006-1, 7006-2 is in the second environment having a temperature T2 lower than the temperature T1. Therefore, the section of the cylinder 7006 having the respective array of actuator band sets 7033 exposed to heat provides the torque that is transferred to rotate the main shaft 7016 and also the cylinder 7006, thereby cyclically exposing the other section of the cylinder 7006 with the other array of actuator band sets 7033 to the warmer environment by itself.

In operation, as one of the sections, such as section 7006-1 is exposed to the warm temperature T1, the actuator bands 7034, 7036 in the first array of actuator band sets 7033-1 are exposed to heat resulting in their contraction. As the bands 7034, 7036 contract, their shortened lengths are added up together by the driving mechanism 7037. For example, the contraction of the bands 7034, 7036 may exert a pulling force on the moving fastener 7046, thereby pulling the chain 7043 towards the opposing face, i.e., the first face 7018 and rotating the sprocket 7045 in a counterclockwise direction. Consequentially, the shaft 7058 is rotated in the counterclockwise direction, which in turn is transferred to the respective bevel gear 7062 and the fixed bevel gear 7032. Thus, the rotation of the shaft 7058 and the bevel gear 7062 for each of the actuator band sets 7033-1 in the section 7006-1 contribute to rotating the main shaft 7016 in the same direction to generate the rotational power that is transferred to the power generating assembly 7066 by the timing pulley arrangement 7064. Additionally, since the fixed bevel gear 7032 does not rotate with respect to the mounting frame 7008, the rotation of the shaft 7058 and the bevel gear 7062 result in rotating the cylinder 7006 itself.

As the cylinder 7006 is rotated, the other section, i.e., section 7006-2 is exposed to the warmer environment, and the corresponding array of actuator band sets 7033-2 contracts and rotate the respective shafts and bevel gear in the similar manner to generate rotations in the main shaft 7016 and again rotate the cylinder 7006 by itself in the same direction. The example arrangement of the fixed bevel gear 7032, the shaft 7058 and the bevel gear 7062 serves as the heat switching mechanism for this implementation by cyclically rotating the cylinder 7006 to cyclically expose the actuator band arrays 7033-1 and 7033-2 to heat. Thus, by rotating the cylinder 7006, the sections 7006-1, 7006-2 are cyclically exposed to heat of the warmer environment to generate the rotational power to be provided to the power generating assembly 7066. However, when the actuator band sets 7033 that were contracted by the heat of warmer environment are moved to the colder environment, they are relaxed which in turn may tend to cause the sprockets 7045 to rotate in the opposite direction, i.e., clockwise direction and may thus prevent the unilateral rotation of the main shaft 7016. To this end, since the shaft 7058 is supported on two bearings 7060 that only permit rotation in one-direction, the shaft 7058 is only permitted to rotate in one direction (i.e., counterclockwise direction) and restricts the rotation in the opposite direction, thereby generating unidirectional rotation of the main shaft 7016.

Furthermore, in some implementations, such as for larger applications, the heat engine 7102 may be scaled up to include multiple cylinders 7006, each having a larger number of actuator bands (such as those shown in FIGS. 42 and 43) mounted on every shaft 7058 and working to rotate the respective cylinders and generating output rotational power in the similar manner as described above. Furthermore, in some yet other implementations, for instance, where the location with different temperatures are too far, a modified configuration having two cylinders may be used, where one cylinder is inserted in each environment and connected to the other by a mechanical connecting arrangement, such as chain and belt in order to transfer the generated displacements between the two. For instance, in such implementations, the actuator bands 7034, 7036 may not be connected to the cylinder body and are instead movable on the circumference of the cylinder by its rotation. By inserting each of the two cylinders 7006 in one of the two environments, the generated displacements is made for the respective array of actuator band sets being moved from one environment to another one cyclically. A connecting mechanical arrangement may be configured to connect the two sections and the generated force by the actuator band sets in the warmer environment drives this connecting mechanical arrangement to displace the other array of actuator band sets from the colder environment to the warmer environment and vice-versa.

Referring now to FIGS. 44 through 51, a heat engine 8102 according to an eighth example implementation is provided. The heat engine 8102 includes a chassis 8004 and a number of cylinders 8006 supported on the chassis 8004. In the illustrated example, the heat engine 8102 includes six cylinders spaced apart and arranged in a circular configuration around the chassis 8004. However, it will be appreciated that the number and arrangement of cylinders illustrated and described herein are merely an example and that the heat engine 8102 may include additional or fewer number of cylinders depending on the desired application.

The chassis 8004 may be implemented as a long base steel cylinder 8008 having a work output member, for example, a main shaft 8009 rotatable therein to generate rotational power for an electric power generation system. A drive arrangement 8011 may be configured to transfer the rotations generated by the main shaft 8009 to a power generation assembly 8013, which may include a gear box having mechanisms for increasing the rotations, coupled electric power generation including a generator, the control elements, and output conditioning elements that are required for controlling and adopting the power plant for a given application. In some examples, the drive arrangement 8011 may be embodied as a timing pulley arrangement including driving and driven pulleys 8015, 8017, respectively, and a belt 8019 connecting the driving pulley 8015 to the driven pulley 8017 (shown more clearly in FIG. 48). The driving pulley 8015 is driven by the rotations of the main shaft 8009 and is configured to drive the driven pulley 8017 that in turn feeds the rotations to the power generation assembly 8013.

The base cylinder 8008 may be divided into a lower portion 8008-1 containing an evaporator section 8010 of a heat pipe 8012 and an upper portion 8008-2 that supports the cylinders 8006 functioning as condenser sections (hereinafter referred to as condenser cylinders 8006) in this implementation. Thus, the lower portion 8008-1 of the base cylinder 8008 containing the evaporator section 8010 may be positioned in a warmer environment whereas the upper portion 8008-2 and the condenser cylinders 8006 may be positioned in a colder environment. In some implementations, the heat pipe 8012 may be embodied as a thermosyphon, to allow the upper portion 8008-2 and the lower portion 8008-1 to be positioned at a large distance from one another, even up to a hundred meters or more, in some cases. Further, due to the vertical configuration of the heat engine 8102, as explained previously, the condensed working fluid can return to the evaporator section by gravity. Further, the heat engine 8102 can be implemented in any location or facility having two environments with environmental temperatures that are different from one another. For example, the bottom of the lakes contain a significant amount of water, for example, at 4 degrees centigrade and provide a significant thermal energy extraction potential when the outside of the lake temperature can be as low as −40 degrees centigrade or below in winters and as high as +40 degrees centigrade or above in summers.

Figure 45:
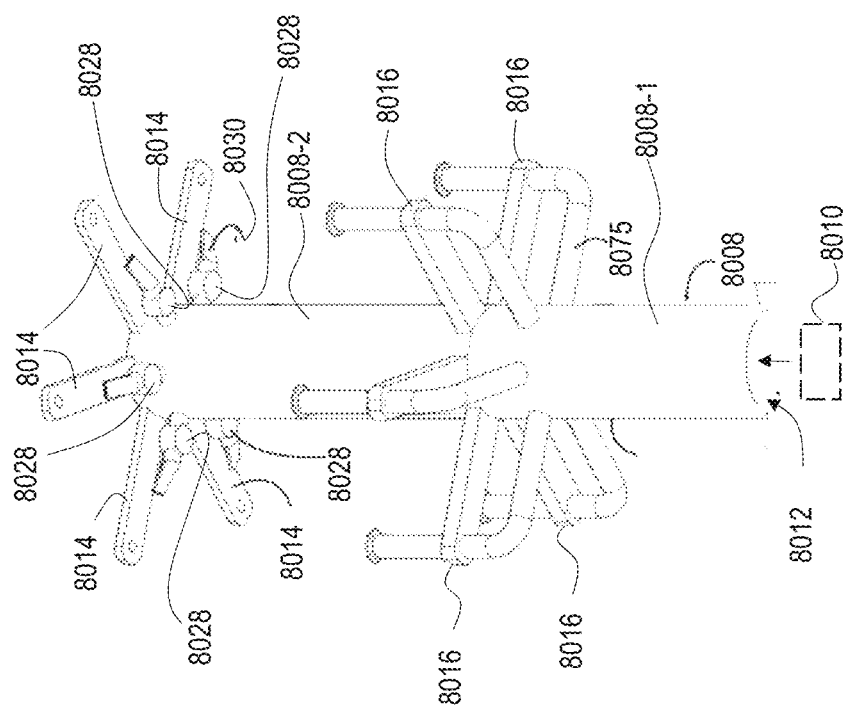

Further, as shown in FIG. 45, the upper portion 8008-2 of base cylinder 8008 includes a first set of support arms 8014 (hereinafter referred to as the top support arms 8014) extending radially outwardly at top of the upper portion 8008-2 and a second set of support arms 8016 (hereinafter referred to as the bottom support arms 8016) extending radially outwardly at the bottom of the upper portion 8008-2. The top and bottom support arms 8014, 8016 are configured for mounting the condenser cylinders 8006 therebetween. As will be appreciated, the base cylinder 8008 and the top and bottom support arms 8014, 8016 may be configured to function as the adiabatic sections that fluidly connect and extend between the evaporator section 8010 with the condenser cylinders 8006.

Further, each condenser cylinder 8006 may be supported on a respective cylinder shaft 8018 having a respective axis of rotation. For example, the cylinders 8006 may be supported on the respective shafts 8018 by a pair of bearings 8020, wherein the outer portions of the bearings 8020 may be attached and held by a first bevel gear 8022 on the support arms 8014, 8016. Further, a second bevel gear 8024 is supported on the outer portion of the bearings 8020 and is connected to the first bevel gear 8022 to transfer the rotational torque from the cylinder shaft 8018 of the condenser cylinders 8006 to a main bevel gear 8026 that in turn rotates the main shaft 8009. As will be appreciated, the mounting arrangement described herein for mounting each of these condenser cylinders 8006 to the upper portion 8008-2 of the base cylinder 8008 enables the axis of rotation (corresponding to the cylinder shafts 8018) for each of these condenser cylinders 8006 to be parallel to the axis of rotation (corresponding to the main shaft 8009) of the base cylinder 8008 and that the rotation of each of these cylinder shafts 8018 contributes to the rotation of the main shaft 8009 through suitable connecting mechanical elements.

In an example, the heat engine 8102 further includes one or more flow control valves 8028 (shown in FIG. 45), serving as the heat switching mechanism in this implementation) associated with each of the condenser cylinders 8006, which when switched to a corresponding valve position, may be configured to direct the heated working fluid into a top portion of one of the condenser cylinders 8006 via a flow connecting member 8030. In some implementations, the flow control valve 8028 may be implemented as a simple unidirectional valve that permits one way fluid flow based on its position. In some implementations, every condenser cylinder 8006 may have its own flow control valve 8028 that may be actuated selectively during operation to allow the heated working fluid to flow into the respective one of the respective cylinder 8006. In some other implementations, the heat engine 8102 may include a single flow control valve 8028 that may be switched to different positions to direct the heated working fluid into one of the cylinders 8006 at a time. As explained previously, the flow control valve 8028 may be mechanically or electrically operated to switch between the different valve positions during operation.

Figure 46:
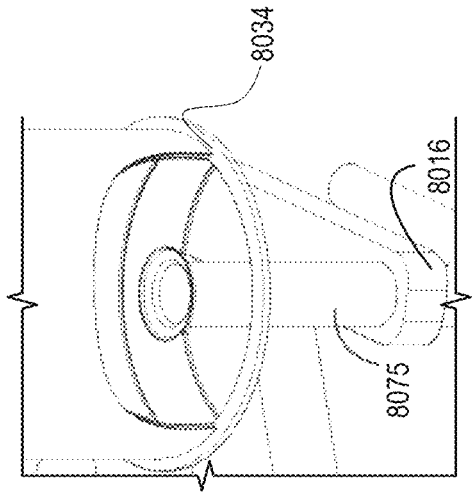
Figure 47:
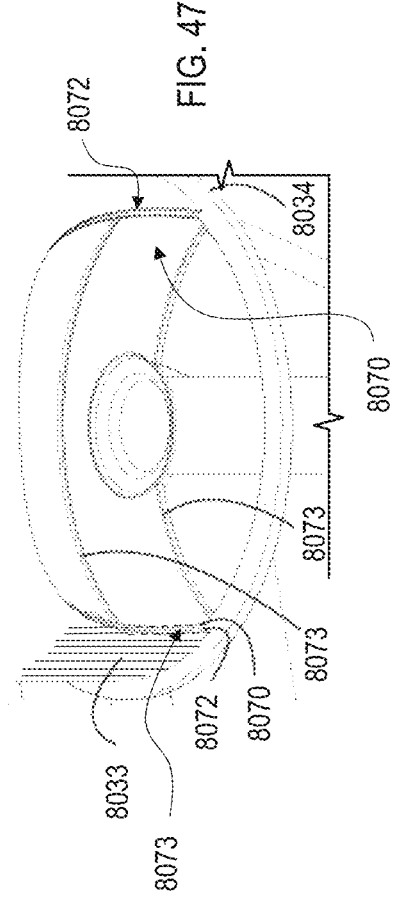

In an example implementation, each of the condenser cylinders 8006 includes a respective array of actuator bands 8032 having one or more actuator bands 8033 that are disposed circumferentially around on an outer surface of the condenser cylinder 8006. As explained previously, the array of actuator bands 8032 are configured to change their dimension, such as contract or expand, when exposed to warm temperature or heat. As shown in FIGS. 46 and 47, each condenser cylinder 8006 includes an inner cylindrical shell 8070 and an outer metal cylindrical shell 8072 defining a fluid passage space 8073 therebetween. The actuator bands 8033 may be positioned to contact the outer cylindrical shell 8072. Further, the inner surface (not shown) of the inner cylindrical shell 8070 may be covered with a layer of thermal insulator. During operation, based on the position of the flow control valve 8028, the heated working fluid may be directed to enter the top of one of the cylinders 8006 and subsequently the fluid passage space 8073, thereby causing the working fluid to flow from top to bottom of the cylinder 8006. As the inner shell 8070 is thermally insulated, the heat released by the working fluid flowing within the space 8073 is transmitted to the outer shell 8072 and in turn to the array of actuator bands 8032 contacting the outer shell 8072. Furthermore, as the working fluid passes through the space 8073, it is condensed and returned to the evaporator section 8010 via the respective return conduits 8075.

Figure 49:
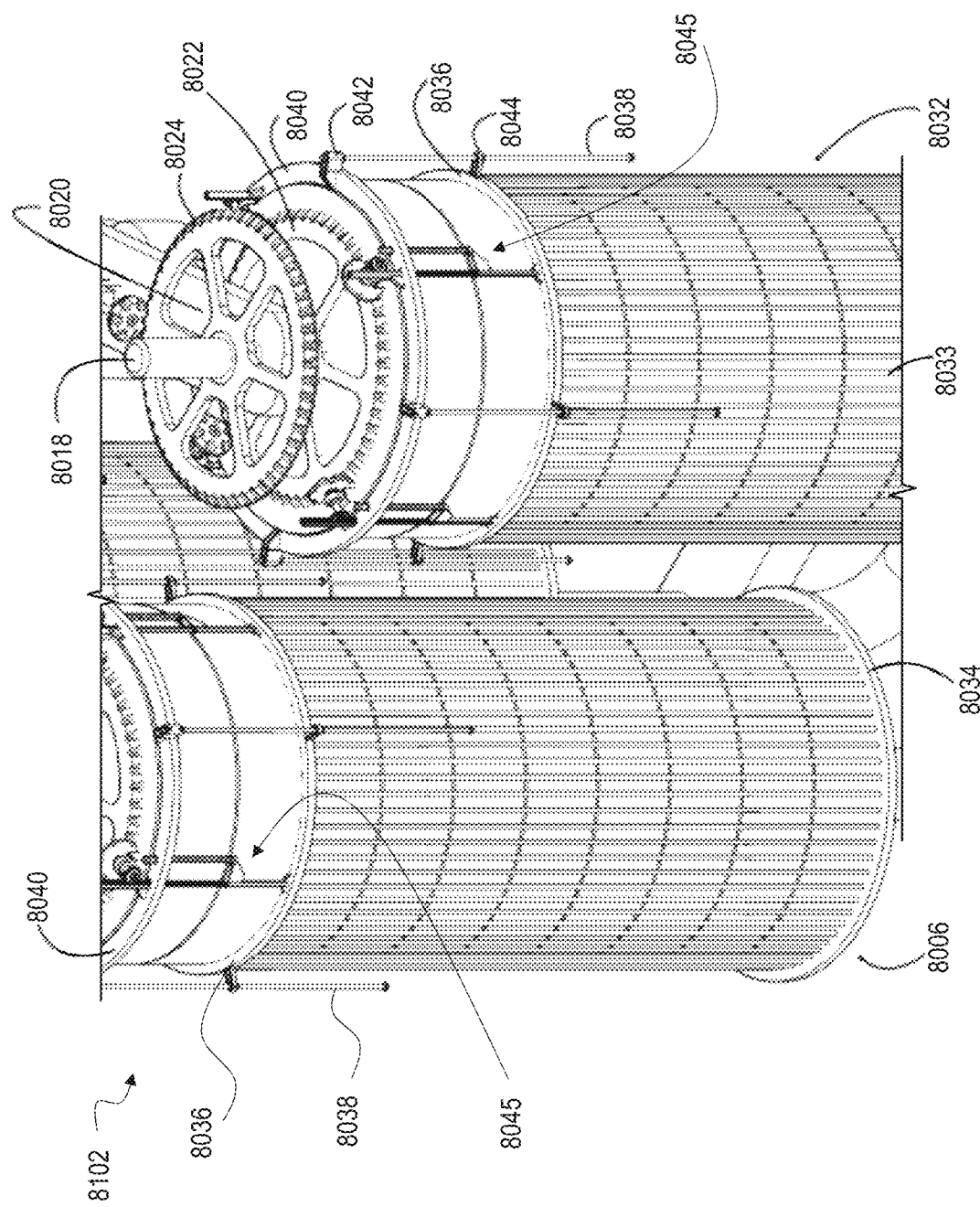

In an example implementation, each array of actuator bands 8032 includes a large number of single bands 8033 that may be connected at one end, in a side-by-side arrangement, to a fixed flange 8034 that is provided at the bottom of the cylinder 8006. A second end of each actuator band 8033 may be connected to a movable flange 8036 that is configured to move linearly up and down along the axis of the cylinder 8006 on one or more guiding rods 8038. The movable flange 8036 is configured to move up and down in response to the change in dimension of the actuator bands 8033 in response to heat. As shown in FIG. 49, the guiding rods 8038 may be fixed at one end to a second fixed flange 8040 by a fastening mechanism 8042 and may be configured to slide through one or more guiding holes 8044 provided on the movable flange 8036. In this example, each condenser cylinder 8006 has four guiding rods 8038 equidistantly positioned around the circumference of the condenser cylinder 8006. However, any other configuration and/or number of guiding rods may be used to achieve similar results.

Figure 51:
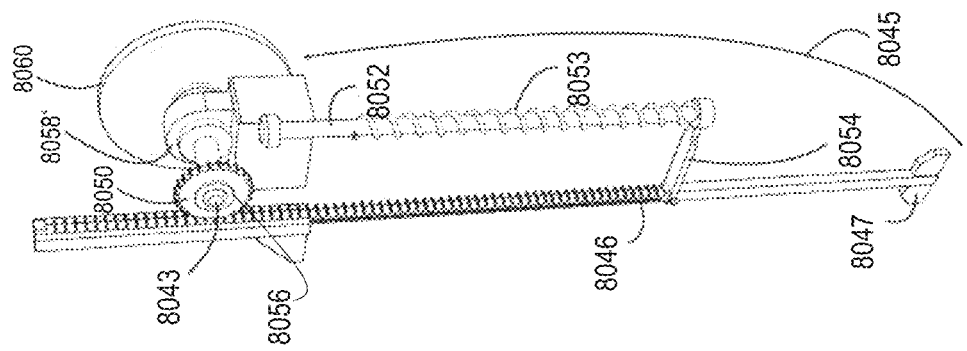
Figure 50:
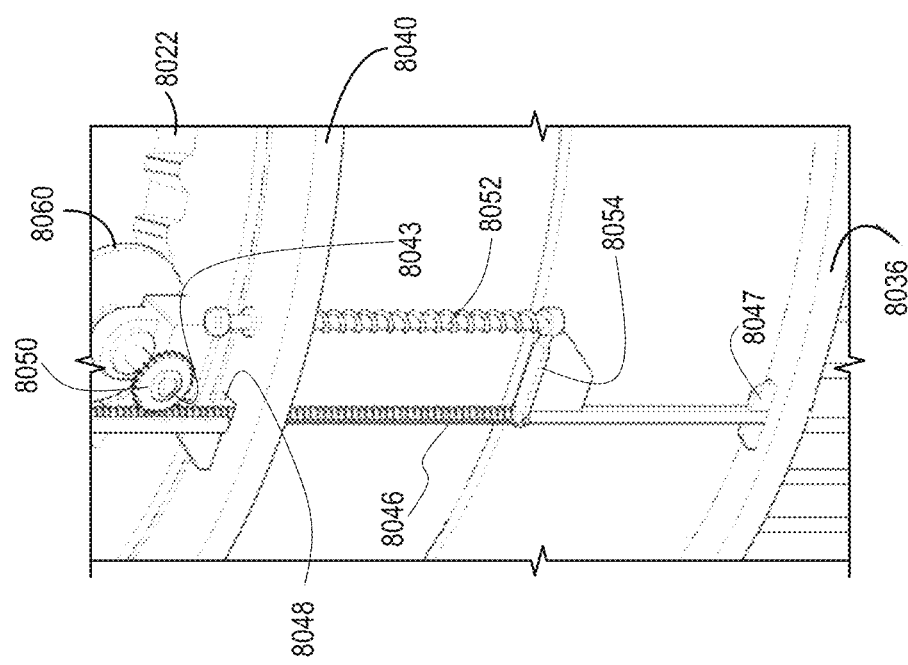
Figure 52:
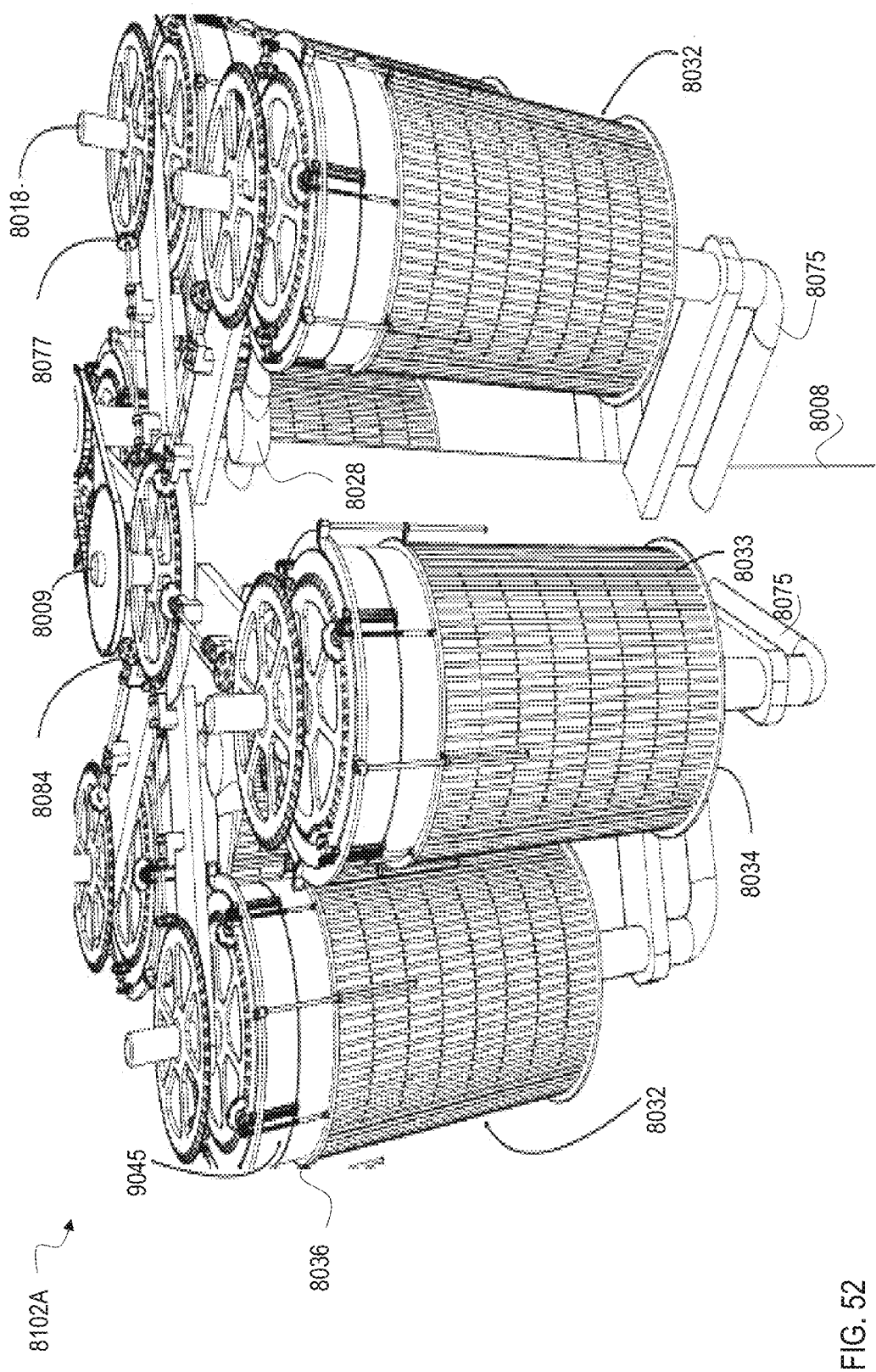
FIGS. 52 through 56 illustrate a heat engine according to a second version of the eighth example implementation.
Figure 53:
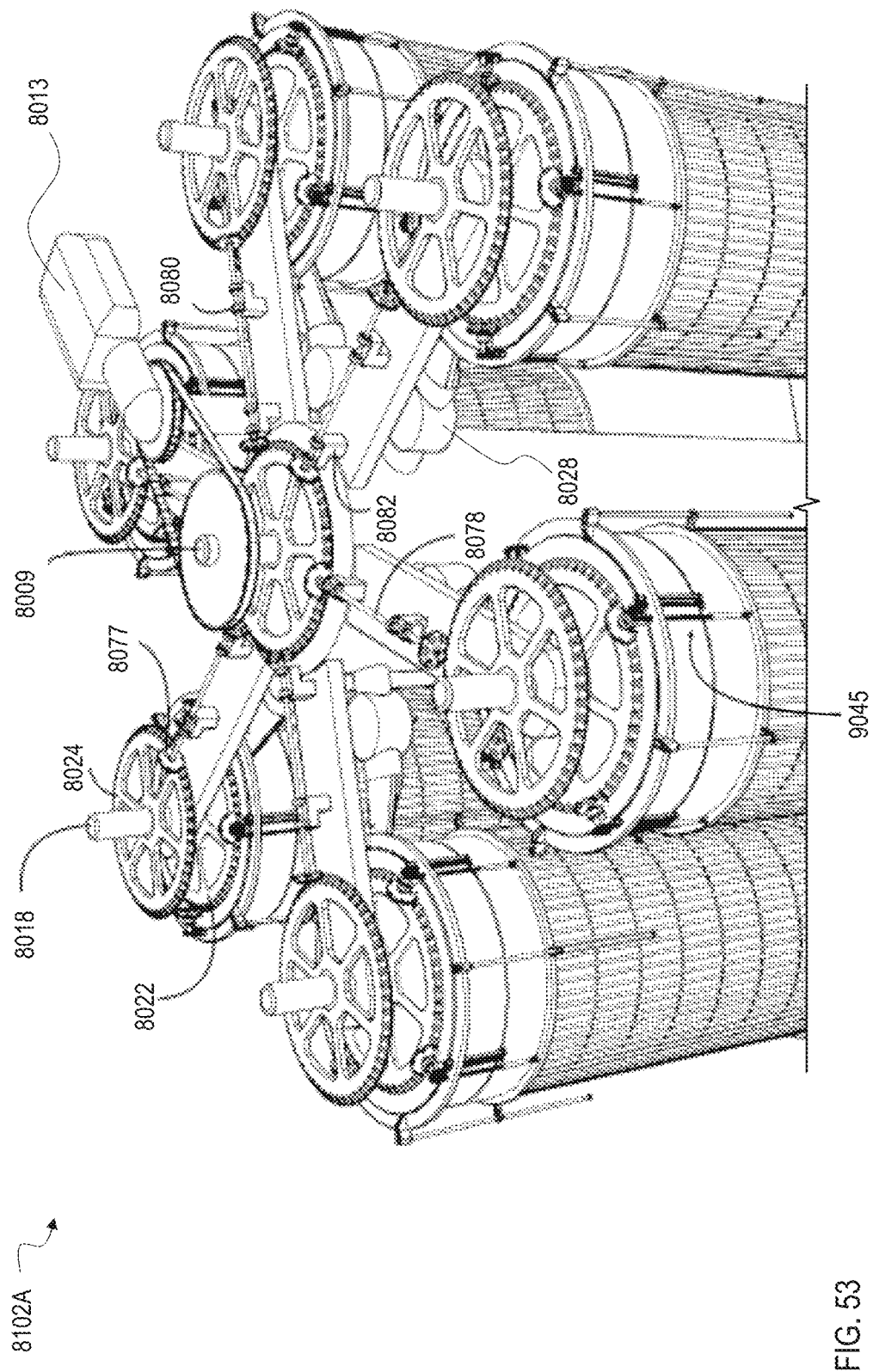
Figure 54:
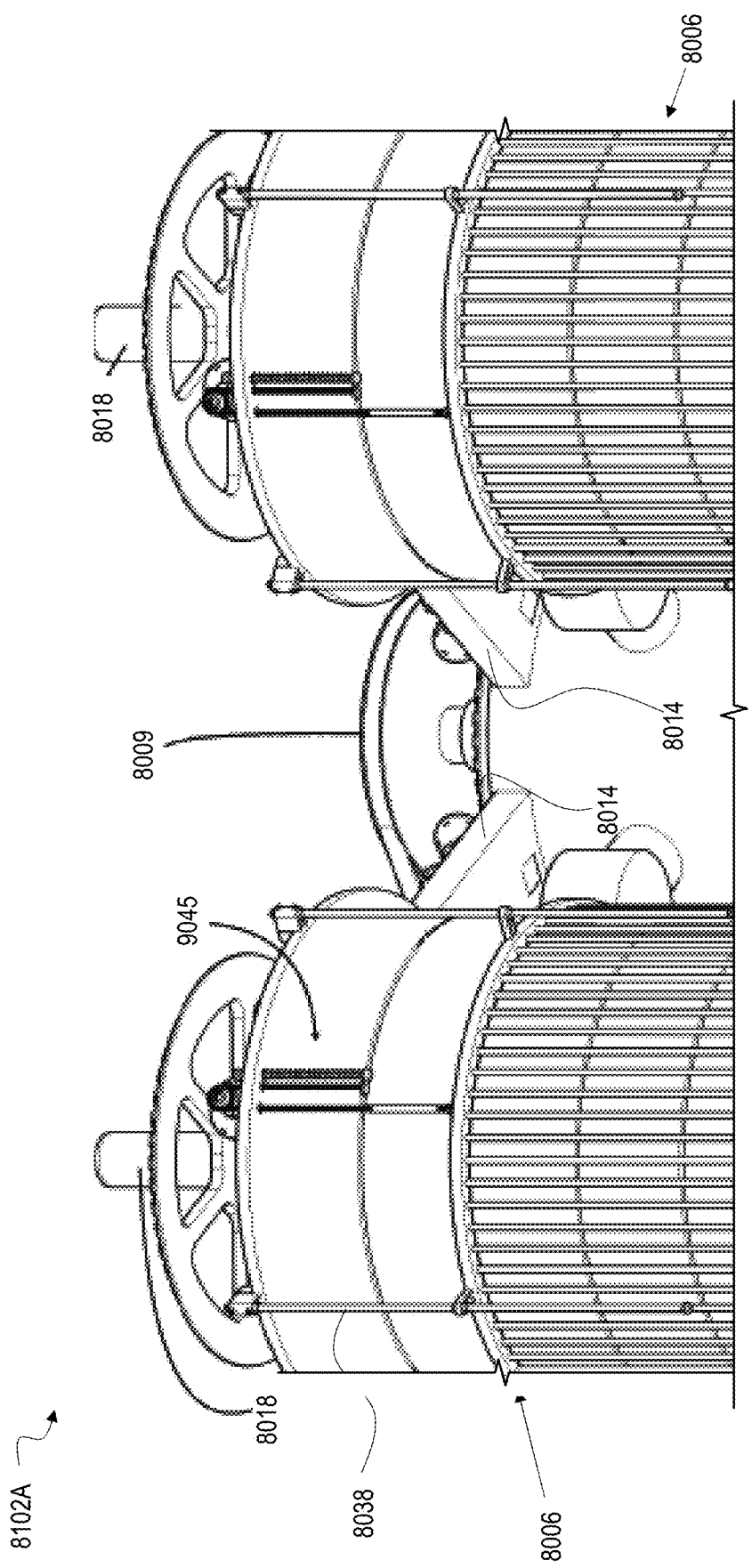
Figure 56:
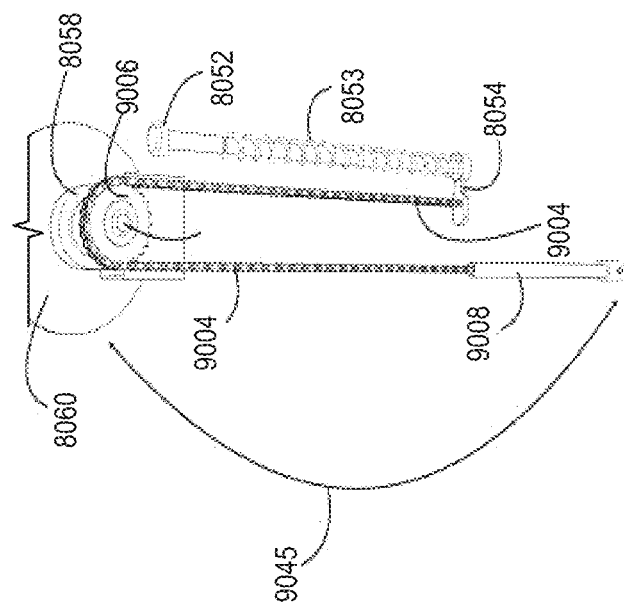
Figure 55:
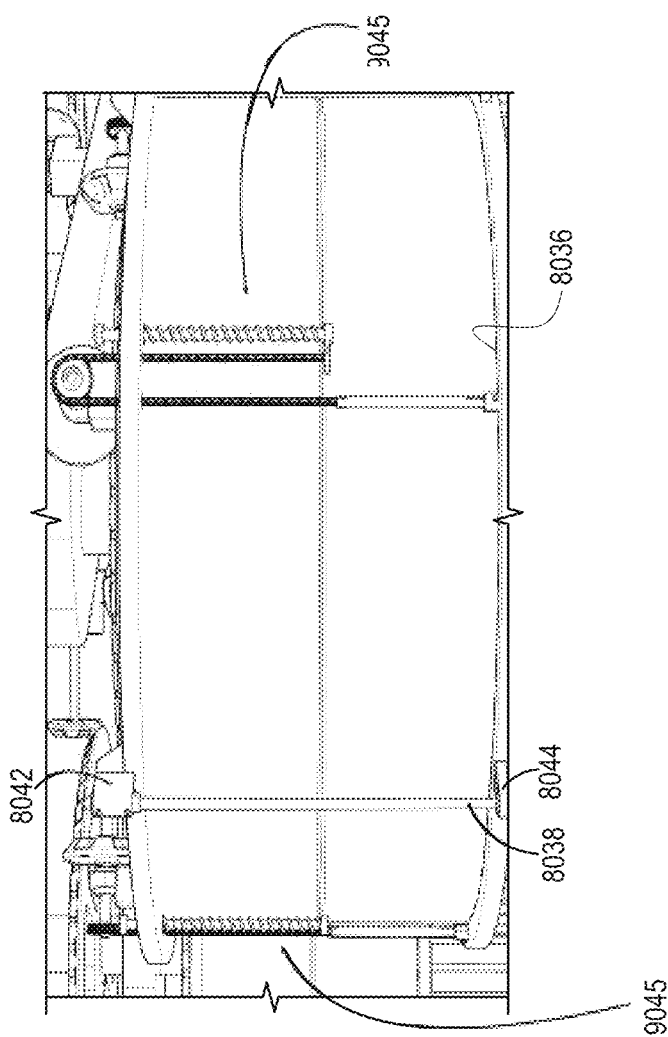

Further, as shown in FIGS. 50 and 51, to convert the linear contraction or expansion of the actuator bands 8033 to bi-lateral rotations of a drive shaft 8043, a number of drive arrangements 8045 may be provided on the condenser cylinders 8006. For example, the condenser cylinders 8006 may each have four drive arrangements 8045 equidistantly positioned around the circumference of the cylinder 8006. In some implementations, the drive arrangement 8045 may include a linear gear member 8046 that may be connected at one end to the movable flange 8036 by a fastening mechanism 8047 and pass through an aperture 8048 provided on the second fixed flange 8040 to engage with a rotating gear member 8050 at the other end. The linear gear member 8046 may be linearly driven (i.e., up and down) by the action of the actuator bands 8033 and the movable flange 8036 and may be configured to consequently rotate the gear member 8050. The linear gear member 8046 is also connected to a spring guiding rod 8052 (hereinafter referred to as the spring rod 8052), by a movable fastening mechanism 8054. The spring rod 8052 includes a spring 8053 supported thereon and is fixedly connected to the second fixed flange 8040 to provide a returning force for the displaced actuator bands 8033 as they undergo relaxation when exposed to colder temperature.

In the illustrated example implementation, the rotating gear member 8050 is installed on a first bearing 8056 that is supported on one end of the shaft 8043. The shaft 8043 is in turn installed on a second bearing 8058 and connected to a bevel gear 8060 at the other end. In some implementations, the first and second bearings 8056, 8058 may be one-side rotating bearings, and the first bearing 8056 may be free moving in an opposite direction with respect to the second bearing 8058. Consequently, bi-lateral rotations of the gear member 8050 are converted to unilateral rotations of the bevel gear 8060. The bevel gear 8060 is further connected to the bevel gear 8022 that is engaged with the outer portion of the bearings 8020 and is hence rotatable. The shaft 8018 passes through the bearings, the outer portions of which are fixed to the top surfaces of the cylinders 8006 above the support arms 8014 and 8016. Therefore, the bevel gear 8022 is installed on the shaft 8018 and free to rotate with respect to the cylinders 8006. The bevel gear 8024 is also installed and fixed to the shaft 8018. Therefore, the bevel gear 8024 rotates with the shaft 8018 that is rotated by 8022.

Figure 48:
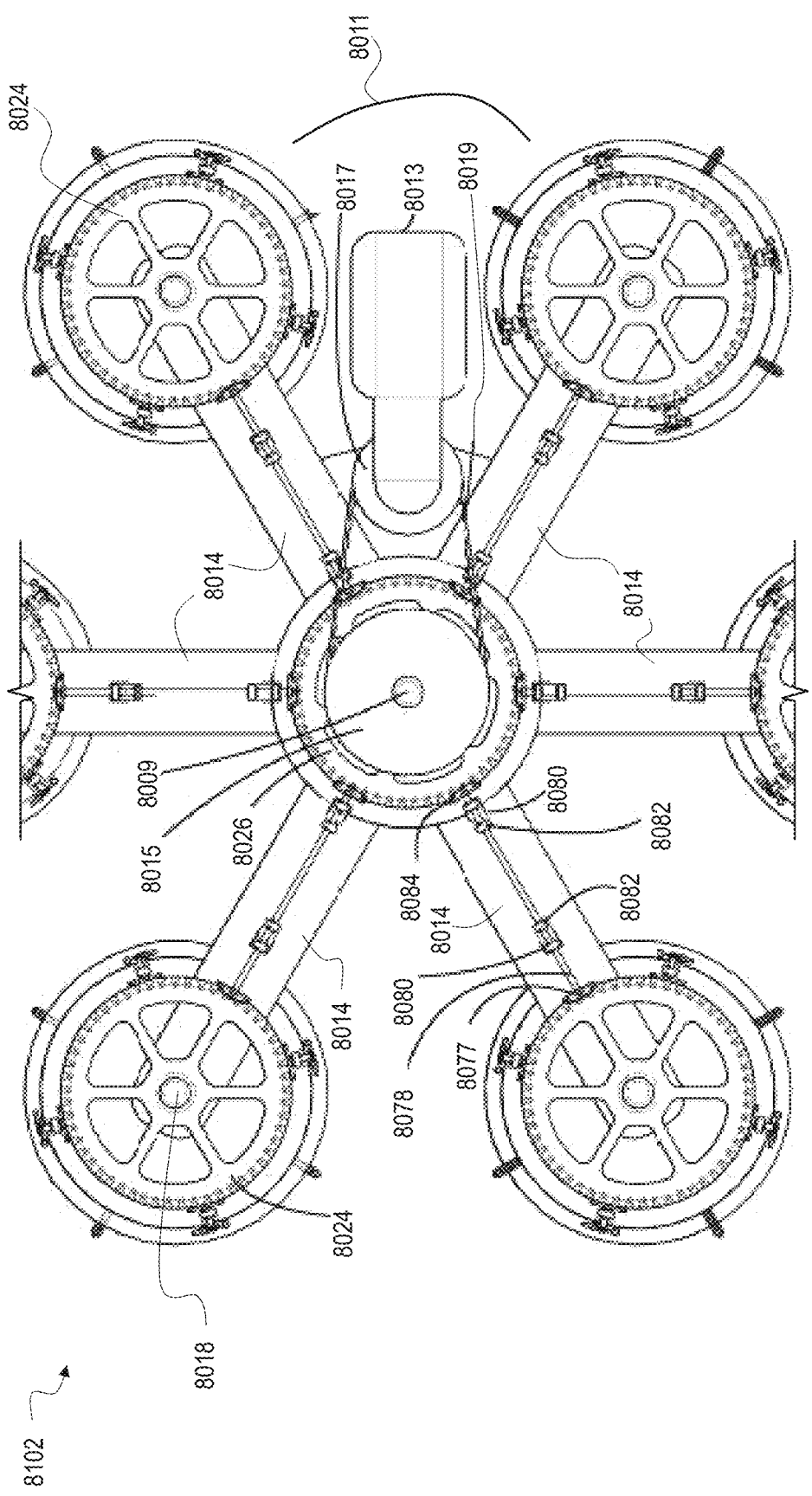

Further, as shown in FIG. 48, the bevel gear 8022 may be operatively connected to the main bevel gear 8015 by a bevel gear 8077, a shaft 8078, a pair of bearings boxes 8080, bearings 8082 and the bevel gear 8084. Therefore, the rotations of the bevel gear 8022 are transferred to the main bevel gear 8015 through the above-mentioned mechanical connections, and the main bevel gear 8015 in turn rotates the main shaft 8009 to provide the output power to the power generation assembly 8013.

Referring now to FIGS. 52 through 56, a second version of the heat engine 8102 (hereinafter referred to as heat engine 8102A) is provided. The heat engine 8102A includes same components as described above for heat engine 8102 and thus the reference numbers representing identical components as those of heat engine 8102 have not been changed in these figures. However, in this version, the drive arrangement 8045 for converting linear movement of the actuator bands 8033 to bi-lateral rotations of the shaft 8043 is replaced with a different drive arrangement 9045. In the illustrated version (as shown more clearly in FIGS. 55 and 56), the drive arrangement 9045 includes a chain member 9004 rotatably supported on a sprocket 9006. The chain member 9004 is connected at one end to the movable flange 8036 by a fastening rod 9008 and to the spring rod 8052 at the other end by a fastening mechanism 8054. The sprocket 9006 is supported on two one-direction rotating bearings 8056 and 8058 and is rotatable to generate unilateral rotations of the bevel gear 8060 in a similar manner as described above. The unilateral rotations of the bevel gear 8060 also generate the rotations of the bevel gear 8022, the shaft 8018, and the main shaft 8009 in a similar manner as described above for heat engine 8102.

Figure 57:
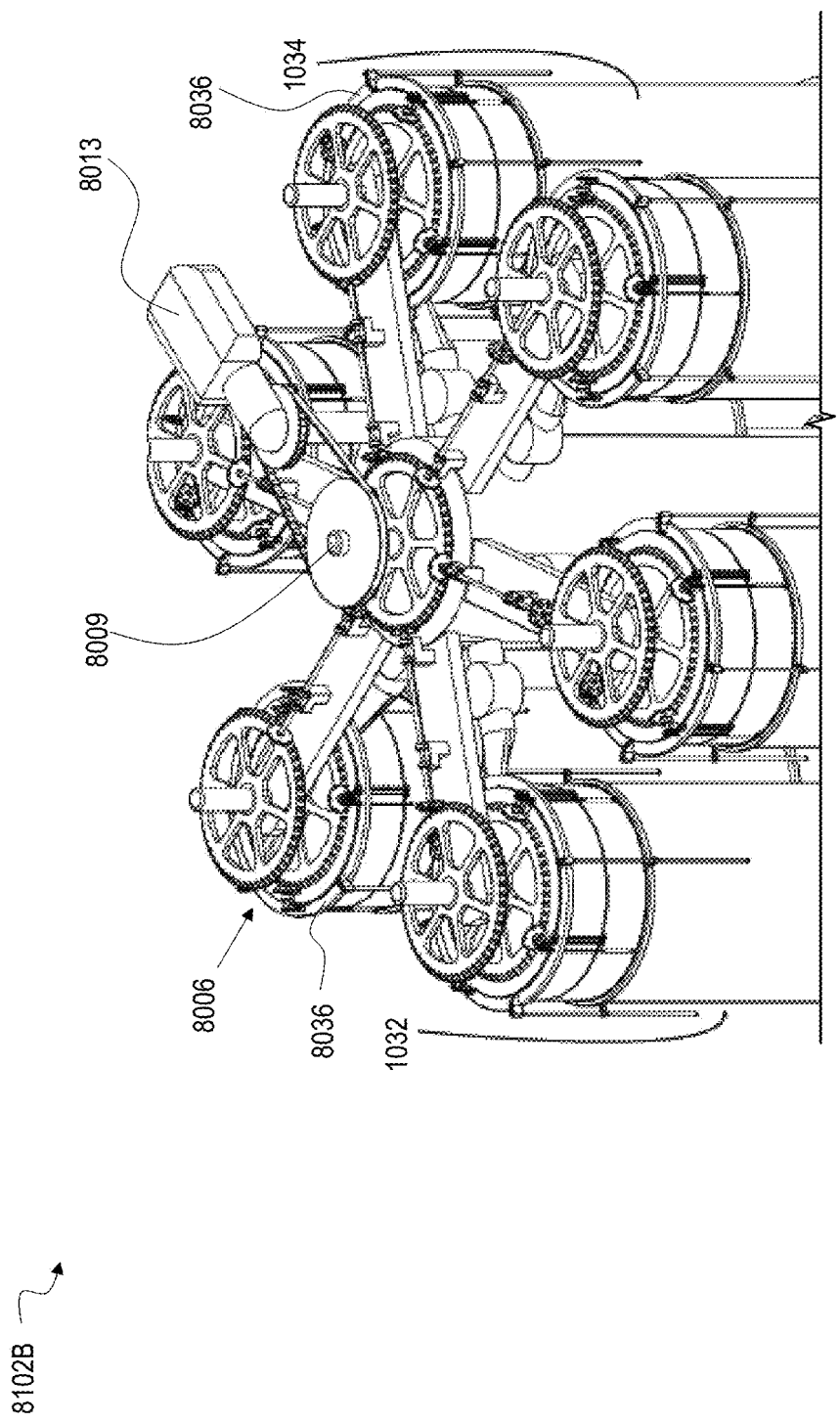
FIGS. 57 through 59 illustrate a heat engine according to a third version of the eighth example implementation.
Figure 58:
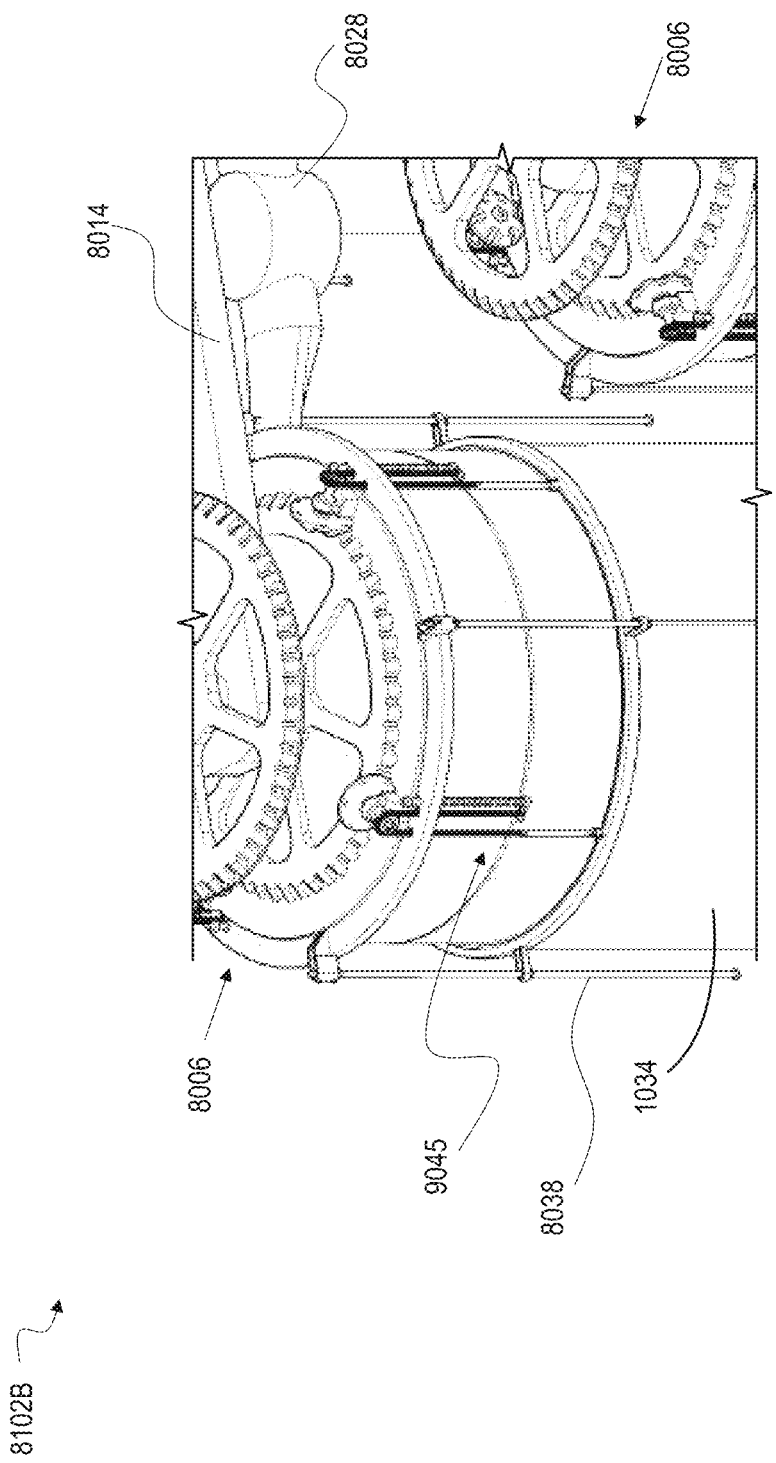
Figure 59:
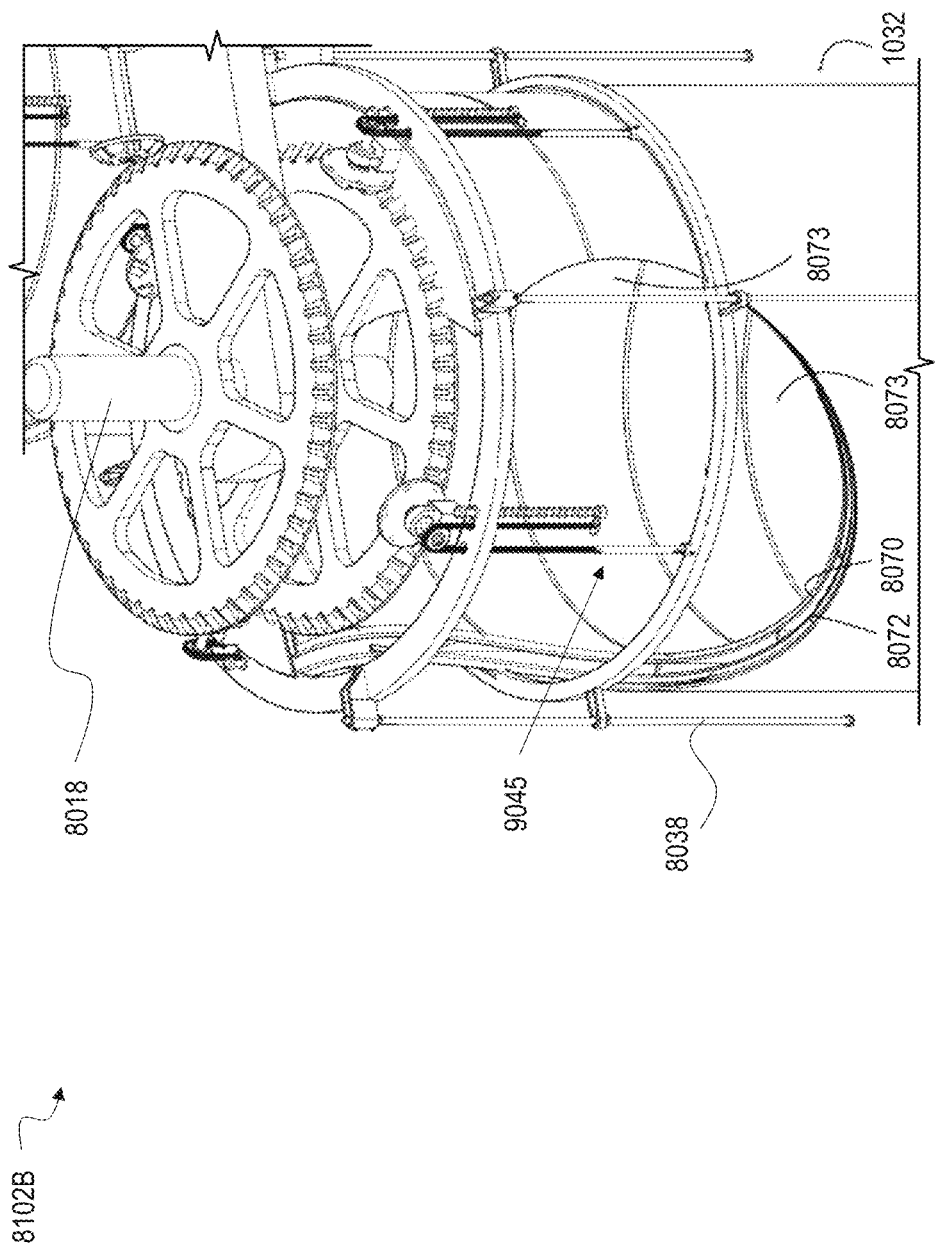

Referring now to FIGS. 57 through 59, another version of the heat engine 8102 (hereinafter referred to as the heat engine 8102B) is provided. In these figures too, the reference numerals have been kept identical for the components that are identical to the respective components of the heat engine 8102. In this version of heat engine 8102, instead of multiple actuator bands, the heat engine 8102B includes an array 1032 having one single piece sheet-like actuator band 1034 formed into a thin hollow cylinder is mounted on the outer shell of each of the condenser cylinders 8006. The actuator band 1034 may be connected to the movable flange 8036 and configured to rotate the main shaft 8009 in a similar manner as described above. Additionally, although FIGS. 58 and 59 illustrate that the gear arrangement 9045 is implemented as a chain and socket arrangement (as described above), it may be appreciated that the drive arrangement 8045 including the linear gear member 8046 and rotating gear member 8050 may also be used without deviating from the scope of the claimed subject matter.

Figure 60:
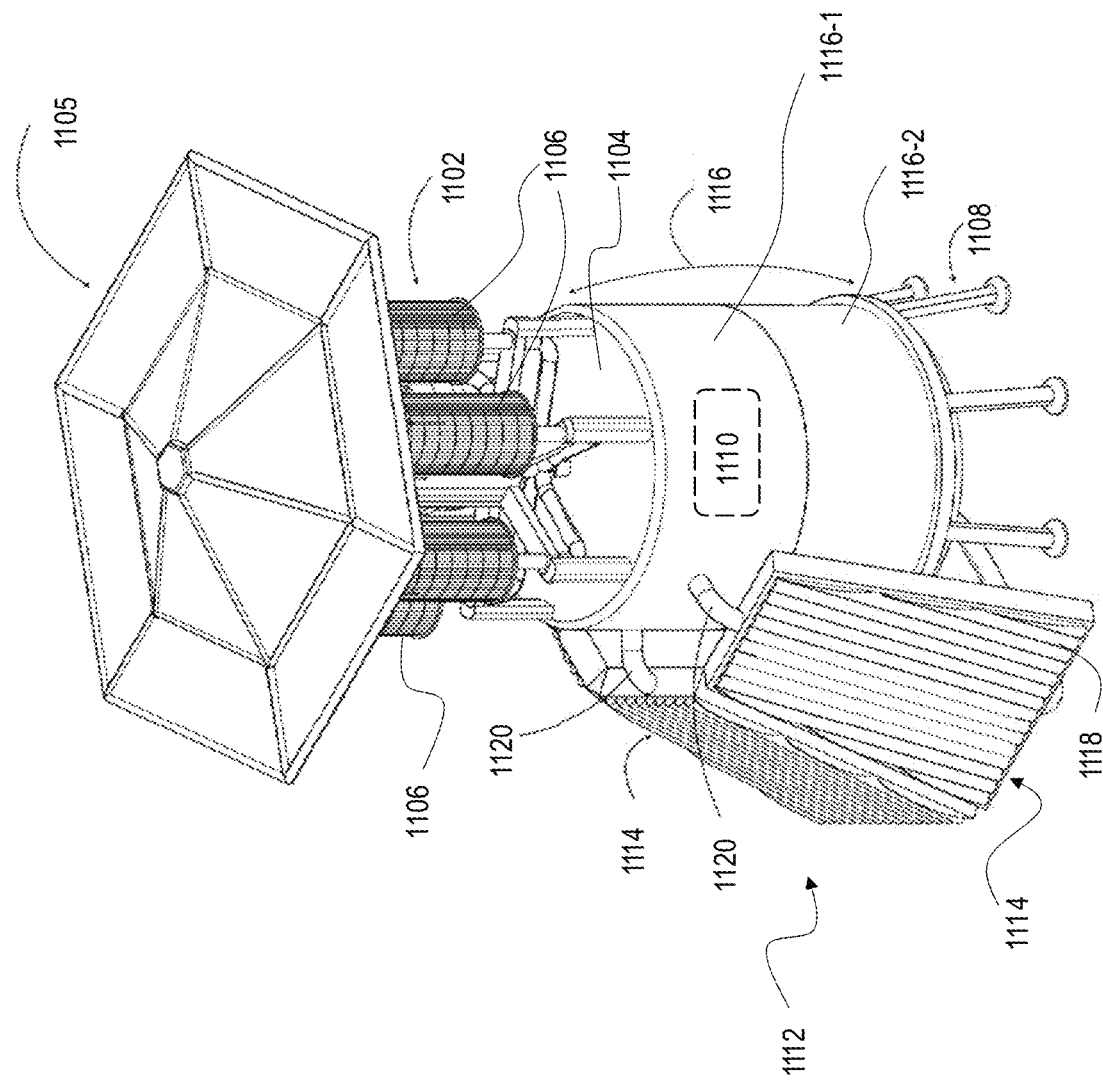
FIGS. 60 through 62 illustrate a heat engine, utilizing solar thermal energy for operation, according to a ninth example implementation.
Figure 61:
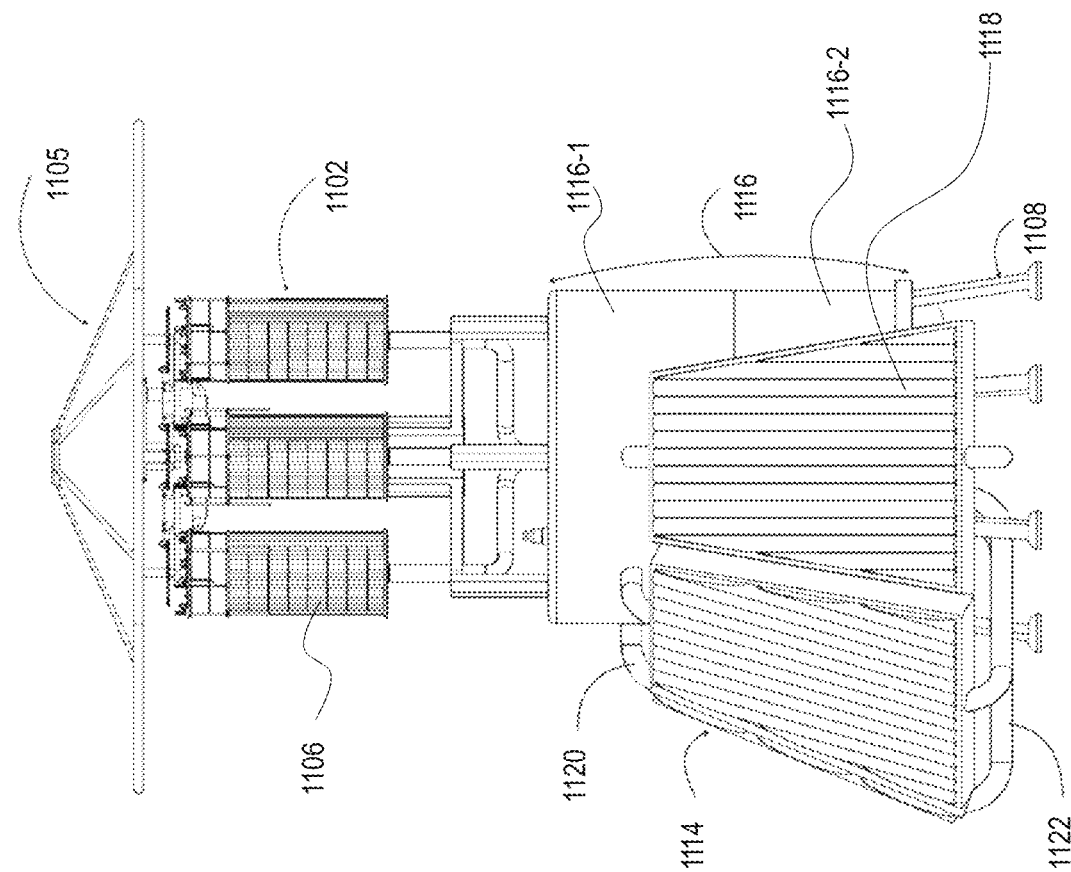

Referring now to FIGS. 60 through 62, a heat engine 1102 according to a ninth example implementation is provided is provided. In some implementations, the heat engine 1102 of this example is configured to utilize solar thermal energy for operation. For the purposes of explanation, the heat engine 1102 is structured and implemented in a similar manner as that described for the heat engine 8102 above. The heat engine 1102 includes a number of condenser cylinders 1106 arranged and supported on a chassis 1104 and adapted to receive heated fluid from an evaporator section 1110 via one or more flow control valve (not shown) in a similar manner as described above for heat engine 8102. In one example, the heat engine 1102 may be positioned at a facility that is well exposed to sunlight, and thus an umbrella 1105 may be positioned on top of the heat engine 1102 to cover each of the condenser cylinders 1106 and prevent them from being exposed to direct sunlight, thereby also creating a relatively colder environment for the cylinders 1106 as compared to that of the evaporator section 1110. As illustrated, in some implementations, the entire heat engine assembly 1102 may be supported on a base 1108, however, in some additional or alternative implementations, the assembly may be supported on the chassis 1104 itself.

The heat engine 1102 may be operably connected to a solar thermal energy capturing system 1112 that absorbs solar energy from sun exposure to provide thermal energy for heating the working fluid within the evaporator section 1110. The heated working fluid is then provided to the condenser sections, i.e., the condenser cylinders 1106 in this example, via the flow control valve(s) in a cyclic manner to rotate a work output member (not shown) and generate electric power, in a similar manner as described above.

The solar thermal energy capturing system 1112 (hereinafter referred to as the system 1112) includes a number of solar thermal energy collector panels 1114 arranged around a water container 1116. In certain example implementations, the solar thermal energy collector panels 1116 may partially surround the water container 1116 while in some other examples, the collector panels 1116 may be arranged so as to completely surround the water container 1116. Further, in some implementations, such as that illustrated herein, the water container 1116 may have an upper portion 1116-1 and a lower portion 1116-2 such that the upper portion 1116-1 is connected to the chassis 1104 and adapted to house the evaporator section 1110 therein. The water container 1116 may be cylindrical or cubic or may be implemented in any other shape and/or design. As will be appreciated, the size and capacity of the water container 1116 may be selected based on the size and scale of the heat engine 1102 and the solar thermal energy collector panels 1114 according to the desired end applications. The water container 1116 and the collector panels 1114 are adapted to provide the thermal energy source for the heat engine to operate.

As shown, the solar thermal energy collector panels 1114 (hereinafter referred to as the collector panels 1114) are angled suitably to face the sun and capture the solar energy. Each collector panel 1114 includes an array of double coaxial long glass tubes 1118 that are positioned in parallel and in proximity to one another and are suitably inclined along their lengths to face and receive the sunlight. Each pair of glass tubes are coaxially sealed together and the space between them is vacuumized to minimize any heat loss. Further, an inner glass tube (not shown) in each pair of glass tubes has a blackened outer surface, i.e., painted with black or other dark color to trap the solar thermal energy therein. The blackened outer surface of the inner glass tubes and the vacuum between the glass tubes allows the water flowing through the inner glass tubes to absorb the solar heat when the collector panels 1114 are exposed to sunlight. Further, the inner glass tubes, within each collector panel 1114 are connected together on one side to a first pipe 1120 that in turn is connected to, for example, the upper portion 1116-1 of the water container 1116. The inner glass tubes are connected together at the other end to a second pipe 1122 (shown in FIG. 61) that in turn is connected, for example, the lower portion 1116-2 of the water container 1116.

In operation, when the working fluid, e.g., water, inside the inner glass tubes is heated up, for example up to 90 degrees centigrade, by absorbing the solar thermal energy, the heated water moves upwards and flows to the upper portion 1116-1 of the water container 1116 via the first pipe 1120. The displaced heated water in the inner glass tubes is replaced by the colder water from the bottom of the water container 1116 via the second pipe 1122. Such circulation of water continues as the collector panels 1114 continue to absorb the solar thermal energy from sun exposure. The evaporator section 1110 (positioned inside the upper portion 1116-1 of the water container 1116) absorbs the heat from the heated water in the upper section 1116-1 to heat the working fluid therein and operate the heat engine 1102 to output rotational power and generate electric power, in the same manner as described above for the heat engine 8102.

Furthermore, although the heat engine 1102 is shown and described to be implemented according to the heat engine 8102, it will be appreciated that the solar thermal energy capturing system 1112 described herein may be implemented with any other type of heat engines described above in a similar manner to enable the respective type of heat engine to operate using the solar thermal energy.

Referring now to FIGS. 63 through 67, a heat engine 1202 according to a tenth example implementation is provided. The heat engine 1202 includes a chassis 1204 defining a first longitudinal end 1206 and a second longitudinal end 1208. The chassis 1204 may be divided into sections 1210, 1212, 1214, and 1216. In some implementations, the sections 1210, 1212, 1214, and 1216 may be separated by flange members 1218, 1220, 1222, 1224, and 1226. An evaporator section 1228 may be provided at the first longitudinal end 1206 and may be mechanically coupled to, for example, the flange member 1218 provided at the first longitudinal end 1206 of the chassis 1204 by any known fastening mechanisms. The chassis 1204 may further support a first condenser section 1230 and a second condenser section 1232 branching out at the second longitudinal end 1208 of the chassis 1204 (as shown more clearly in FIG. 64). The first condenser section 1230 and the second condenser section 1232 may be adapted to support a first actuator band 1256 (i.e., the first actuator band array in this example) and a second actuator band 1258 (i.e., the second actuator band array in this example), respectively, therein.

In this example implementation, the chassis 1204 further supports a first pipe 1234 and a second pipe 1236 (shown in FIG. 65) extending within and along the length L of the chassis 1204 between the evaporator section 1228 and the condenser sections 1230 and 1232. The first pipe 1234 may be configured to direct the heated working fluid (such as the working fluid described in the previous implementation) received from the evaporator section 1228 to one of the condenser sections 1230 and 1232 during operation. The second pipe 1236 may be configured to provide a return fluid path for the cooled down or condensed working fluid from the condenser sections 1230 and 1232 back to the evaporator section 1228 through respective one of connecting portions 1231 and 1233 during operation.

In one implementation, the chassis 1204 further includes a heat exchanger section disposed downstream of the evaporator section 1228. The heat exchanger section 1238 may include a first heat exchanger component 1240 (shown more clearly in FIG. 65) and a second heat exchanger component 1242 (shown more clearly in FIG. 66) cooperating to heat ambient air (pulled in from an air inlet 1246) and cool down the heated working fluid received from the evaporator section 1228 during operation. As illustrated, the heat exchanger section may be implemented in section 1210 of the chassis 1204.

Figure 65:
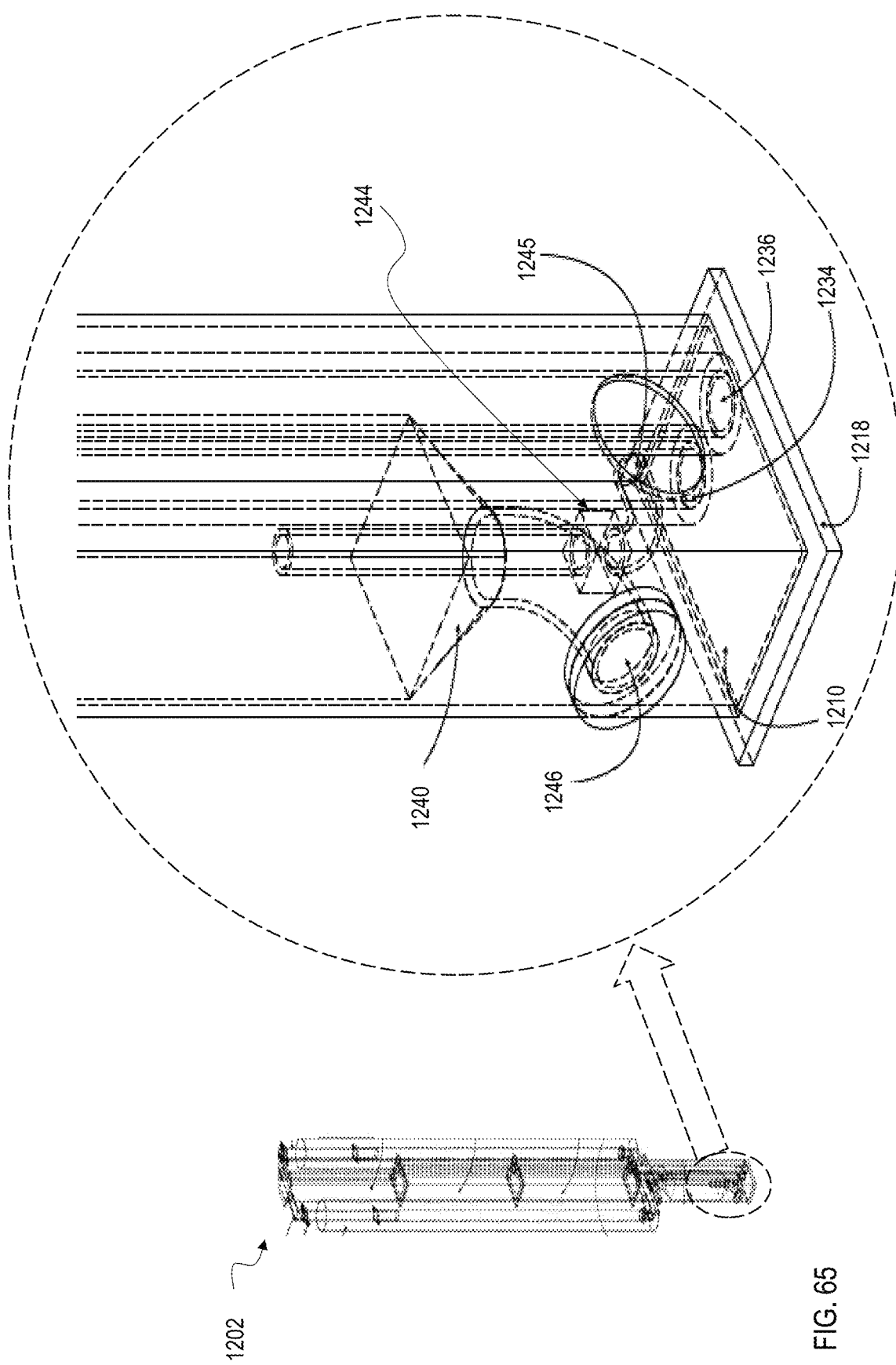

As illustrated in FIG. 65, the heat exchanger section 1238 may be configured to be fluidly connected to the second pipe 1236 and the first pipe 1234 via a first valve element 1244 and a second valve element 1250, respectively. For example, the first pipe 1234 may be connected to the upper or second heat exchanger component 1242 via the second valve element 1250, which when operated, is adapted to direct the heated working fluid in the first pipe 1234 to the heat exchanger section 1238 via a fluid inlet 1247. Similarly, the second pipe 1236 is connected to the lower or first exchanger component 1240 via the first valve element 1244, which when operated is adapted to direct the condensed working fluid collected in the first heat exchanger component 1240 to the second pipe 1236 via an outlet 1245. In some examples, the first valve element 1244 and/or the second valve element 1250 may be manually or electrically operated and may be embodied as a one-way valve to only allow fluid flow into and/or out of the heat exchanger section 1238. However, other configurations of the valve elements 1244, 1250 may also be implemented to achieve similar results. The heat exchanger section 1238 may further be fluidly connected to the external environment and may be configured to receive ambient air via the air inlet 1246 therein. The ambient air absorbs heat from the heated working fluid in the heat exchanger section 1238 to output the cooled or condensed working fluid via the outlet 1245. The heated ambient air is directed cyclically to expose each of the actuator bands 1256 or 1258 to heat, as will be explained below.

Figure 66:
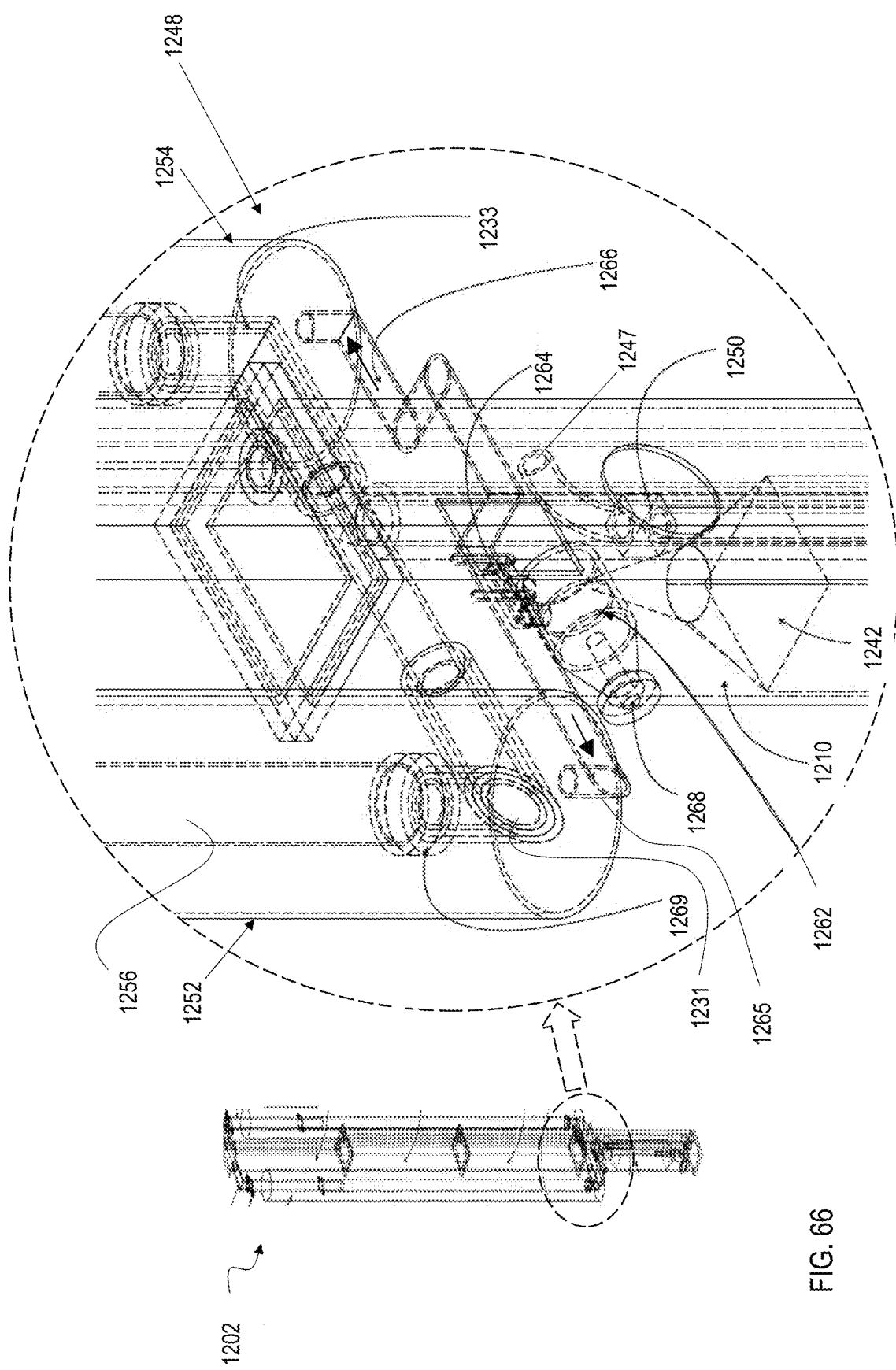

In an implementation, the heat engine 1202 may further include one or more heat switching mechanisms, such as a first heat switching mechanism 1248 (shown in FIG. 66) and a second heat switching mechanism 1276 (shown in FIG. 67), that may be operable to cyclically expose the first actuator band 1256 and/or the second actuator band 1258 to heat, for rotating a work output member, for example, an output shaft 1260 (shown in FIG. 67) via a drive assembly 1272. To this end, in one implementation, as shown in FIG. 66, the first heat switching mechanism 1248 includes a fan assembly 1262 and an airflow control valve 1264. The fan assembly 1262 includes a first fan and a second fan and adapted to expose the actuator bands 1256, 1258 to heat by forced convection. The fan assembly 1262 may be configured to pull heated air from the heat exchanger section 1238 and direct it towards one of the actuator bands 1256, 1258 via an airflow control valve 1264. For example, the first fan of the fan assembly may pull the heated air from the second heat exchanger component 1242 and direct to either one of a first tube 1252 or a second tube 1254 having the first actuator band 1256 and the second actuator band 1258 supported therein, respectively. The first tube 1252 and the second tube 1254 may be thermally insulated, in some examples, so as to allow the actuator bands 1256, 1258 to absorb heat from the heated air flowing therein. Further, the second fan of the fan assembly 1262 may be configured to pull ambient air via an ambient air inlet 1268 for directing to the other one of the first tube 1252 and the second tube 1254 via the airflow control valve 1264. The fan assembly 1262, in some examples, may be powered by utilizing a portion of power generated by the heat engine 1202 while in some other example implementations, may be powered by an external power source.

Further, the airflow control valve 1264 may be configured to direct air flow (cooler and/or warmer) to either the first tube 1252 via a first passage 1265 or to the second tube 1254 via a second passage 1266. The airflow control valve 1264 may be automatically controlled to cyclically switch between the first valve position and the second valve position at regular intervals. In one example, the airflow control valve 1264 may be a four-way and two position valve, while in other examples, may be any other type of valve capable of achieving the functionalities described herein. For example, the airflow control valve 1264, in a first valve position, may direct the warm airflow (i.e., heated air from the heat exchanger section 1238) to the first tube 1252 via the first passage 1265 for exposing the first actuator band 1256 to heat and may direct the cooler ambient air (from the ambient air inlet 1268 of the fan assembly 1262) to the second tube 1254 via the second passage 1266 for exposing the second actuator band to cooler air. Similarly, in a second valve position, the airflow control valve 1264 may direct the warm airflow to the second tube 1254 via passage 1266 for exposing the second actuator band 1258 to heat while directing the cooler ambient air to the first tube 1252 via passage 1265 for exposing the first actuator band 1256 to cooler air.

In the illustrated example, the actuator bands 1256 and 1258 are implemented as prestressed elastomer bands that are configured to contract when exposed to heat and expand when cooled down. However, other types and configurations of the actuator band 1256, 1258, including the ones described in the various examples above, may also be implemented to achieve similar results. Further, the prestressed actuator bands using the weight components, explained in this example, may also be implemented in any of the heat engine configurations according to the other example implementations described above, for example, as part of the driving mechanisms 7037 (shown in FIG. 40), the drive arrangements 8045 (shown in FIG. 51) and/or the drive arrangements 9045 (shown in FIG. 56). The actuator bands 1256 and 1258, in some examples, are fixedly coupled at one end to fixed mounting structures 1269 and 1270, provided in the respective first and second tubes 1252, 1254. Further, the actuator bands 1256 and 1258 are moveably coupled to the drive or rotate the work output member 1260 via a drive assembly 1272 (shown in FIG. 67).

Figure 67:
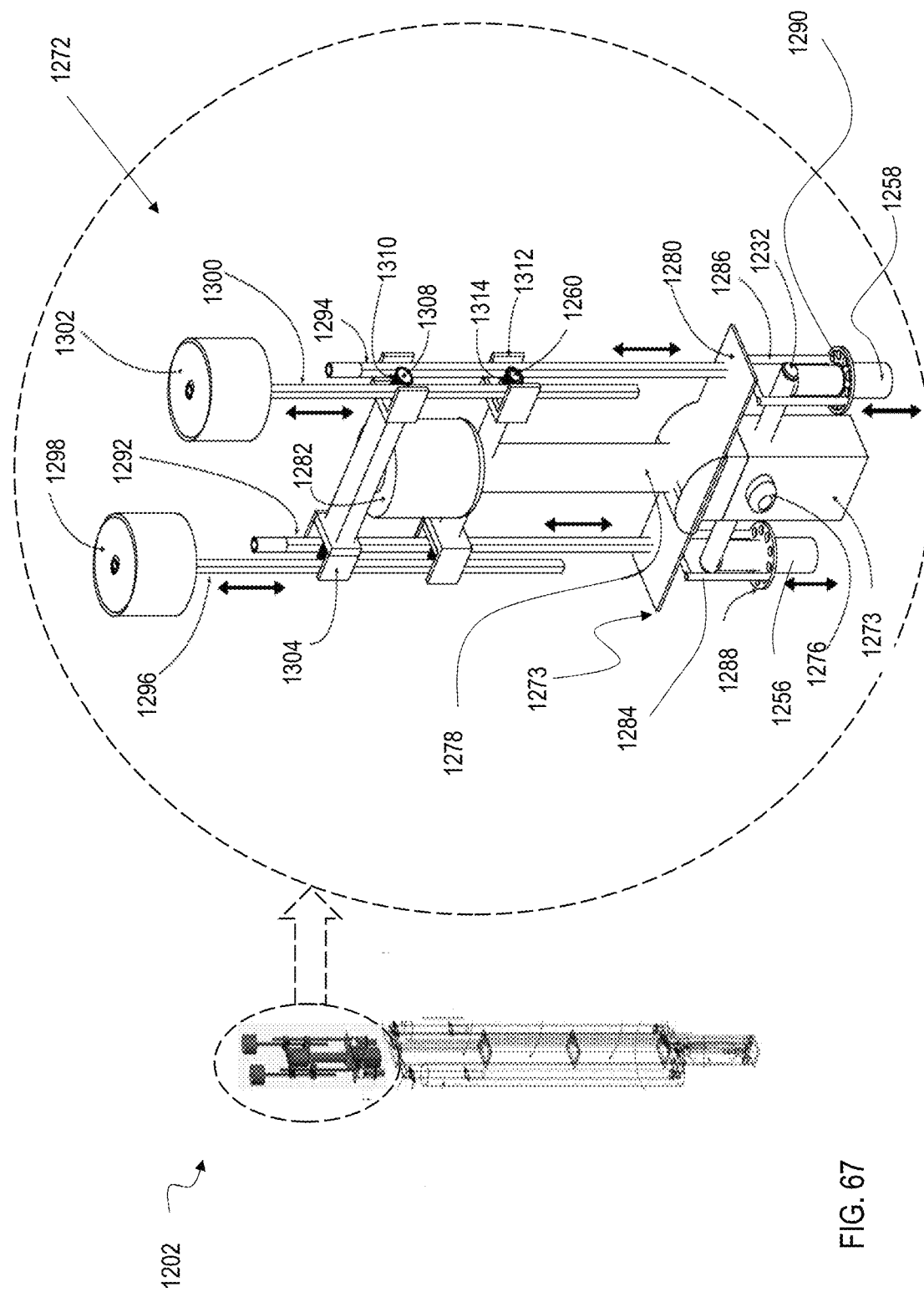

As shown in FIG. 67, the work output member 1260 is mounted on a mounting assembly 1273 that in turn is coupled to the flange member 1226 of the chassis 1204 by any known suitable fastening mechanisms. The mounting assembly 1273 further supports the drive assembly 1272 for rotating the output shaft 1260 in response to the contracting and expanding actions of the actuator bands 1256, 1258. The mounting assembly 1273 includes a housing 1274 having the second heat switching mechanism 1276, such as a fluid flow control valve (hereinafter the fluid flow control valve 1276) configured to switch heat exposure between the actuator bands 1256 and 1258. In some implementations, either the first heat switching mechanism 1264 or the fluid flow control valve 1276 or both may be operable at a time for operating the heat engine with or without the heat exchanger functionality. For example, when the heat exchanger section 1238 is in operation, only the first heat switching mechanism 1264 is operable and when the heat engine 1202 is operated without the heat exchanger section 1238, then only the fluid flow control valve 1276 is operable to cyclically expose the actuator bands 1256 and 1258 to heat. In order to operate the heat engine 1202 without the heat exchanger section 1238, the second valve element 1250 may be closed to prohibit entry of any heated working fluid in the first pipe 1232 into the heat exchanger section 1238, thereby directing the entire heated working fluid to either one of the condenser sections 1230, 1232. In some additional or alternative implementations, the heat switching mechanism 1248 and the fluid flow control valve 1276 may be operatively connected to switch the heat exposure between the actuator bands 1256 and 1258. The fluid flow control valve 1276 may be operated by a valve operating system (not shown) and may be configured to be in a first valve position to expose the first actuator band 1256 to heat and in a second valve position to expose the second actuator band 1258 to heat, in a similar manner as described above in the other example implementations.

Further, the mounting assembly 1273 includes a central support tube 1278 that is coupled to a mounting plate 1280 on one end and supports a power generation housing 1282 on the other end. The power generation housing 1282 may house a gear box, an electric power generation system (such as the system 104 of FIG. 1), a power conditioning system (such as the system 106 of FIG. 1), and so on, for receiving the rotations of the output shaft 1260 as input for generating electrical power in a similar manner as described above. The drive assembly 1272 includes a first movable mounting structure 1284 for movably mounting the first actuator band 1256 and a second movable mounting structure 1286 for movably mounting the second actuator band 1258 thereto. As illustrated, each of the first and second movable mounting structures 1284, 1286 may be U-shaped structures having two open ends that are secured to a respective movable plate (for example, to a first movable plate 1288 and a second movable plate 1290) that are in turn also secured to the first actuator band 1256 and the second actuator band 1258, respectively.

Further, the drive assembly 1272 includes a first driving bar 1292 coupled to the first movable mounting structure 1284 which is in turn operatively coupled to the first actuator band 1256 and a second driving bar 1294 coupled to the second movable mounting structure 1286 which is in turn operatively coupled to the second actuator band 1258. To this end, the mounting plate 1280 may include through holes to allow the driving bars 1292, 1294 to pass through and be coupled to the respective movable mounting structures 1284 and 1286. In an example implementation, the drive assembly 1272 further includes a first weighted bar 1296 having a first weight component 1298 and operatively coupled to the first driving bar 1292 and a second weighted bar 1300 having a weight component 1302 and operatively coupled to the second driving bar 1294.

The mounting assembly 1273 further includes a first holder 1304 having a first end for rotatably supporting the first driving bar 1292 and the first weighted bar 1296, and a second end for rotatably supporting the second driving bar 1294 and the second weighted bar 1300 thereto. The first holder 1304 further supports a fixed non-rotating shaft 1308 that is coupled to the driving bars 1292, 1294 and the weighted bars 1296, 1300 by respective gear assemblies 1310 (only one shown). Each of the gear assemblies 1310 may include respective gears positioned on bearings to allow a free-running gear movement. Therefore, the gear assemblies 1310 accommodate the linear movement of the bars without rotating the shaft 1308, during operation.

The mounting assembly 1273 further includes a second holder 1312 having a first end for movably supporting the first driving bar 1292 and the first weighted bar 1296, and a second end for movably supporting the second driving bar 1294 and the second weighted bar 1300 thereto. The second holder 1312 also rotatably supports the output shaft 1260 therein. In one example, the output shaft 1260 may include two independent and integrated co-axial shafts. The output shaft(s) 1260 may be rotatably engaged with the driving bars 1292, 1294 and the weighted bars 1296, 1300 by respective gear assemblies 1314 (only one shown), each having bevel and/or non-bevel gears supported on one-way rotating bearings to convert bi-lateral rotations of the output shaft(s) 1260 into unilateral rotations. In some implementations that use non-bevel gears, a rotor axis of the electric power generator housed in the power generation housing 1282 may be non-parallel to the weighted bars 1296 and 1300. In some examples, each of the driving bars 1292, 1294 and the weighted bars 1296, 1300 may include respective internal gear teethes (not shown), extending for example, along a part of their respective lengths, for mating with the gear assemblies 1310 and 1314. Similarly, each of the driving bars 1292, 1294 and the weighted bars 1296, 1300 may also include respective external gear teethes (not shown), extending for example, along a part of their respective lengths, for mating with the corresponding gears provided on each ends of the first holder 1304 and the second holder 1312.

In a first mode of operation using the heat exchanger section 1238, the first heat switching mechanism 1248 may be utilized. To this end, the heated working fluid from the evaporator section 1228 is received in the pipe 1234. In one example implementation, the valve elements 1244, 1250 may be operated to direct the heated working fluid into the heat exchanger section 1238. The air inlet 1246 of the heat exchanger section 1238 also pulls in ambient air that is heated by the heated working fluid flowing through the heat exchanger section 1238. In a first cycle of operation, in this example, the valve position of the airflow control valve 1264 is set to the first valve position to direct the heated air from the heat exchanger section 1238 to the first tube 1252 and direct the cooler ambient air to the second tube 1254. Similarly, in the second cycle of operation in this example, the airflow control valve 1264 is switched to the second valve position to direct the heated air from the heat exchanger to the second tube 1254 and the cooler ambient air to the first tube 1252. As explained previously, when in the first valve position, the airflow control valve 1264 directs the heated air from the heat exchanger section 1238 to the first tube 1252 via passage 1265 to expose the first actuator band 1256 to heat and simultaneously, directs the cooler ambient air drawn in from the inlet 1268 of the fan assembly 1262 to the second tube 1254 via passage 1266 for exposing the second actuator band 1258 to cooler air. Similarly, when in second valve position, the airflow control valve 1264 directs the heated air from the heat exchanger section 1238 to the second tube 1254 via passage 1266 to expose the second actuator band 1258 to heat and simultaneously directs the cooler ambient air from the fan assembly 1262 to the first tube 1252 via passage 1265 for exposing the first actuator band 1256 to cooler air.

In another additional or alternative mode of operation without utilizing the heat exchanger section 1238, only the fluid flow control valve 1276 is operational. To this, the second valve element 1250 is closed to direct the heated working fluid from the evaporator section 1228 to either one of the first condenser section 1230 and the respective first tube 1252 or the second condenser section 1232 and the respective second tube 1254 based on the position of the fluid flow control valve 1276, in a similar manner as described previously. Thus, in a first valve position of the fluid flow control valve 1276, the heated working fluid is directed to the first condenser section 1230 thereby exposing the first actuator band 1256 to heat. Similarly, in a second valve position, the heated working fluid is directed to the second condenser section 1232 to expose the second actuator band 1258 to heat. In such implementation, the heated working fluid transfers the heat to the respective actuator bands 1256 and 1258 by conduction instead of forced convection.

In some additional or alternative implementations, the first heat switching mechanism 1248 and the second heat switching mechanism (i.e., the fluid flow control valve) 1276 may be operatively connected and configured to cooperate to cyclically expose the actuator bands 1256 and 1258 to heat. For example, when the fluid flow control valve 1276 is switched to the first valve position, the airflow control valve 1264 is also switched to the first valve position to expose the first actuator band 1256 to heat and the second actuator band 1258 to cooler ambient air and when the fluid flow control valve 1276 is switched to the second valve position, the airflow control valve 1264 is also switched to the second valve position to expose the second actuator band 1258 to heat and the first actuator band 1256 to cooler ambient air. In some implementations, when the first and second heat mechanisms 1247 and 1276 cooperate, the valve elements 1250 and 1244 may be controlled in a manner to allow portions of the heated working fluid in pipe 1234 to be directed to both the heat exchanger section 1238 and one of the condenser sections 1230, 1232. Thus, the actuator bands 1256, 1258 may be exposed to heat by both conduction from the respective condenser sections 1230, 1232 and by forced convection from the respective tubes 1252, 1254 via the fan assembly 1262.

In operation, as one of the actuator bands 1256 or 1258 is exposed to heat the other one is simultaneously exposed to cold air, thereby resulting in contraction of one actuator band (that is exposed to heat) on one side and expansion of the other actuator band (that is exposed to cold air) on the other side. As one of the actuator bands 1256 or 1258 contracts, the corresponding U-shaped movable mounting member 1284 or 1286 is pulled in a downward direction and as the other one of the actuator bands 1256 or 1258 expands, the corresponding U-shaped movable mounting member 1284 or 1286 is moved in the upward direction. As the U-shaped movable mounting member 1284 or 1286 is pulled downward, the corresponding one of the driving bars 1292, 1294 is also pulled down by means of the gear assemblies supported on each of the first holder 1304 and the second holder 1312. The corresponding weighted bars 1296 and 1300 are also confined to move upward and downward by means of the gear assemblies supported on the holders 1304, 1312 in a similar manner. In some implementations, the weight components 1298 and 1302 are adapted to provide a downward force through the respective weighted bars 1296 and 1300 to counteract the downward movement of the diving bars 1292 and 1294 and pull them back upward. The counteracting force provided by the weight components 1298 and 1302 enables maintaining the prestress force that are required for operating the actuator bands 1256 and 1258 effectively.

As the actuator bands 1256, 1258 operate, the driving bars 1292, 1294 and the weighted bars 1296, 1300 cause bi-lateral rotations of the work output member 1260. As explained previously, the work output member 1260 is installed on multiple one-way rotating bearings and bevel gears that are arranged to convert the bi-lateral rotations of the shaft 1260 into unilateral rotations that are then provided to the power generation housing 1282. The housing 1282 may include suitable mechanisms for increasing the speed of unilateral rotations required for generating the electric power.

The heat engine 1202 uses forced convection by using the fan assembly 1262 to heat and/or cool the actuator bands 1256, 1258. Use of forced convection allows for faster heating and cooling of the actuator bands 1256, 1258, consequently reducing the cycle of operating time for the actuator bands 1256, 1258 and increasing the power generation capacity and efficiency of the heat engine 1202. The fan assembly 1262 can be operated by using a small fraction of power generated by the heat engine itself or by using an external power source. Therefore, by adding an additional fan assembly to the heat engine, the overall extracted mechanical power from such heat engine is increased. Thus, the arrangement effectively decreases the time required for converting thermal energy to electric power. Furthermore, the weight components 1298, 1302 provide a low cost and effective means for providing the required prestress on the actuator bands 1256, 1258.

As will be appreciated, the structure and configuration of the heat engine 1202 described above is merely an example and that concepts presented can be applied to any other configuration of heat engines to achieve similar results.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures, and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified. Although the above principles have been described with reference to certain specific examples, various modifications thereof will be apparent to those skilled in the art.

The invention claimed is:

1. A heat engine comprising:
   a chassis for supporting one or more heat engine components;
   a work output member supported on the chassis and adapted to generate and output mechanical power to an electric power generation system for generating electrical power; and
   an operating mechanism coupled to and adapted to operate the work output member for generating the mechanical power, the operating mechanism comprising:
      a first actuator band array operatively connected to a first end of a linear rack gear and adapted to linearly displace the linear rack gear in a first direction in response to heat exposure;
      a second actuator band array operatively connected to a second end of the linear rack gear and adapted to linearly displace the linear rack gear in a second direction in response to heat exposure, the second direction being opposite to the first direction; and
      a heat switching mechanism operable to alternately expose the first actuator band array and the second actuator band array to heat, thereby causing reciprocal linear displacement of the linear rack gear in the first and second directions;
   wherein the linear rack gear is operatively connected to the work output member, and wherein the reciprocal linear displacement of the linear rack gear causes cyclic displacement of the work output member for generating the mechanical power.

2. The heat engine of claim 1, wherein one or more of the first actuator band array and the second actuator band array include one or more actuator bands, and wherein each of the one or more actuator bands is made of a material having high thermal expansion or contraction coefficient and is adapted to change dimensions in response to heat exposure.

3. The heat engine of claim 2, wherein the one or more actuator bands in each of the first actuator band array and the second actuator band array are stretched elastomer bands adapted to change their respective lengths in response to heat exposure.

4. The heat engine of claim 2, wherein the one or more actuator bands in each of the at least one first and at least one second actuator band arrays are made of one of rubber, silicone-based rubbers, polyurethane, styrene butadiene copolymer, natural rubber, and elastomer.

5. The heat engine of claim 1, wherein the chassis includes a first longitudinal end and a second longitudinal end, and wherein:
   the work output member is supported at least on the first longitudinal end; and
   each of the first actuator band array and the second actuator band array is supported between the first longitudinal end and the second longitudinal end and is operatively connected to the work output member at the first longitudinal end.

6. The heat engine of claim 5, wherein the heat switching mechanism is supported on one or more of the first longitudinal end and the second longitudinal end of the chassis.

7. The heat engine of claim 1, wherein the operating mechanism comprises:
   a gear assembly supported on the chassis and adapted to cyclically rotate the work output member, the gear assembly comprising the linear rack gear operatively connected to a driven component supporting the work output member thereon;
   wherein when in use, the reciprocal linear displacement of the linear rack gear cyclically rotates the driven component, and wherein the rotations of the driven component cause rotations of the work output member supported thereon.

8. The heat engine of claim 7, wherein the driven component is a pinion gear.

9. The heat engine of claim 1, wherein the operating mechanism includes a band mounting member supported on one longitudinal end of the chassis, the band mounting member includes a first end to receive and secure one end of the first actuator band array and a second end to receive and secure one end of the second actuator band array thereto.

10. The heat engine of claim 9, wherein other ends of each of the first and second actuator band arrays are joined together to form a continuous loop.

11. The heat engine of claim 9, wherein we other ends of each of the first actuator band array and the second actuator band array is are secured to the longitudinal end of the chassis.

12. The heat engine of claim 1, wherein the chassis includes a box like structure having a top frame and a bottom frame defining a height of the chassis, and wherein each of the first actuator band array and the second actuator band array includes a plurality of actuator bands disposed in a layered manner to extend through the height of the chassis.

13. The heat engine of claim 1, wherein the chassis includes a box like structure having a top frame and a bottom frame defining a height of the chassis, and wherein each of the first actuator band array and the second actuator band array includes an actuator band having a height equal to the height of the chassis.

14. The heat engine of claim 1 being positioned at a facility having a first environment with a first environmental temperature and a second environment with a second environmental temperature lower than the first environmental temperature, and wherein the heat exposure is provided to the first and the second actuator band arrays as a temperature gradient between the first temperature and the second temperature.

15. The heat engine of claim 1, wherein the heat exposure is provided from a heat source including one or more of a low temperature waste heat source, a solar thermal energy source, a geothermal energy source, and natural thermal resources including heat from one or more of land, air, and water.

16. The heat engine of claim 15, wherein the solar thermal energy source includes one or more of vacuum glass tubes and mirror-wise collectors for collecting solar thermal energy.

17. The heat engine of claim 1, wherein each of the first and second actuator band arrays is supported on a plurality of band contacting assemblies mounted on the chassis, each of the plurality of band contacting assemblies including one or more pulleys mounted on a shaft arrangement and supported on one or more bearings.

18. The heat engine of claim 17, wherein the plurality of band contacting assemblies include a first set of band contacting assemblies rotatable in a first rotating direction and a second set of band contacting assemblies rotatable in a second rotating direction, and wherein the first rotating direction and the second rotating direction are configured to cooperate to generate unilateral rotations of work output member.

19. The heat engine of claim 17, wherein the one or more bearings include one-side rotating bearings and wherein the first and the second actuator band arrays are adapted to generate unilateral rotations of the work output member when supported on the one-side rotating bearings.

20. The heat engine of claim 17, wherein the one or more bearings include free-rotating bearings and wherein the first and the second actuator band arrays are adapted to generate bi-lateral rotations of the work output member when supported on the free-rotating bearings and when at least one end of each of the first and second actuator band arrays is secured to the chassis.

21. The heat engine of claim 1, wherein the heat switching mechanism includes a flow control valve adapted to switch valve positions to direct heat towards one of the first actuator band array and the second actuator band array, and wherein cyclically switching the valve positions of the flow control valve cyclically exposes each of the first and the second actuator band arrays to heat.

22. The heat engine of claim 1, wherein the operating mechanism includes a heat exchanger fluidly connected to a heat source and the heat switching mechanism, the heat exchanger comprising a first heat exchanger section having a working fluid for absorbing heat from the heat source, the heated working fluid being adapted to expose the first actuator band array and the second actuator band array to heat.

23. The heat engine of claim 22 being positioned at a facility having a first environment with a first environmental temperature and a second environment with a second environmental temperature lower than the first environmental temperature, wherein the first heat exchanger section is positioned in the first environment having the first environmental temperature.

24. The heat engine of claim 1, wherein the operating mechanism includes a heat exchanger fluidly connected to a heat source and the heat switching mechanism, the heat exchanger including a second heat exchanger section adapted to expose the first actuator band array supported therein to heat and a third heat exchanger section adapted to expose the second actuator band array supported therein to heat according to a position of the heat switching mechanism.

25. The heat engine of claim 24 being positioned at a facility having a first environment with a first environmental temperature and a second environment with a second environmental temperature lower than the first environmental temperature, wherein the second and third heat exchanger sections are positioned in the second environment.

26. The heat engine of claim 1, wherein:
the chassis includes a first arm and a second arm spaced apart to define a length of the chassis;
the work output member includes a rotatable shaft connected at one end to the first arm and at a second end to the second arm; and wherein
the operating mechanism comprising:
a rotating cylinder rotatably supported on the shaft and including a first longitudinal section adapted to mount the first actuator band array thereon and a second longitudinal section adapted to mount the second actuator array thereon.

27. The heat engine of claim 26, wherein a first end of each of the first actuator band array and the second actuator band array is operatively coupled to the shaft at one of the first or second arm via a respective driving mechanism adapted to rotate the shaft in response to the cyclic heat exposure of the first actuator band array and the second actuator band array.

28. The heat engine of claim 27, wherein each of the first actuator band array and the second actuator band array includes at least one first actuator band and a second actuator band, and wherein the driving mechanism comprising:
a first chain and sprocket arrangement adapted to movably connect one end of each of the first and second actuator band to the rotating cylinder and the first arm; and
a second chain and sprocket arrangement adapted to movably connect the other end of the second actuator band to the rotating cylinder and the second arm.

29. The heat engine of claim 28, wherein each of the first and second chain and sprocket arrangement is connected to a fixed bevel gear on each of the respective first and second arm of the chassis by an arrangement including:
a drive shaft, a pair of one-side rotating bearings, and a rotating gear member, wherein the pair of one-side rotating bearings are adapted to rotate the shaft and the rotating gear member in one direction.

30. The heat engine of claim 27, wherein the drive assembly comprising:
a fastening mechanism adapted to fixedly secure one end of the first actuator band to the rotating cylinder; and
a guiding bar secured to the fastening mechanism and to the second chain and sprocket arrangement, the guiding bar adapted to support a spring member adapted to allow movement of the first and second actuator band in each of the first and second actuator band arrays in response to heat exposure.

31. The heat engine of claim 1, wherein the operating mechanism includes a plurality of heat engine cylinders supported on the chassis, and wherein the first actuator band array and the second actuator band array are disposed on an outer surface of each of the plurality of heat engine cylinders.

32. The heat engine of claim 31, wherein the operating mechanism includes a heat switching mechanism coupled to each one of the plurality of heat engine cylinders.

33. The heat engine of claim 31, wherein the chassis is a cylindrical structure having the work output member rotatable therein, the chassis comprising:
   a lower portion fluidly coupled to a heat source via an evaporator section; and
   an upper portion including a first set of support arms extending radially outwardly at a top and a second set of support arms extending radially outwardly at a bottom of the upper portion, the first and second set of support arms being adapted to mount the respective heat engine cylinders thereon.

34. The heat engine of claim 31, wherein each of the plurality of heat engine cylinders comprises a thermally insulated inner cylindrical shell and a thermally conductive outer cylindrical shell defining a fluid passage space therebetween, the outer cylindrical shell being in contact with the first and second actuator band arrays disposed on the outer surface of the respective heat engine cylinder, and wherein a heated working fluid is received into the fluid passage space for exposing the first actuator band array and the second actuator band array disposed on the outer surface to heat of the heated working fluid.

35. The heat engine of claim 31 wherein the chassis is a cylindrical structure having the work output member rotatable therein, and wherein each of the first and the second actuator band arrays includes a plurality of actuator bands operatively connected to the work output member by an arrangement comprising:
   a first fixed flange member provided at a first longitudinal end of each of the plurality of heat engine cylinders and adapted to fixedly secure a first end of each of the plurality of actuator bands;
   a second fixed flange member provided at a second longitudinal end of each of the plurality of heat engine cylinders, the second fixed flange member being adapted to support a gear arrangement for rotating the work output member;
   a drive arrangement for movably coupling a second end of each of the plurality of actuator bands to the gear arrangement.

36. The heat engine of claim 35, wherein the drive arrangement comprises:
   a movable flange member provided between the first and second fixed flange members and adapted to movably secure a second end of each of the plurality of actuator bands thereto;
   a driving gear member connected at one end to the movable flange member and to the gear arrangement at the other end through the second fixed flange member, the movable flange member and the driving gear member being adapted to move linearly in response to the expansion or contraction of the actuator bands due to heat exposure, and wherein the linear movement of the linear gear member causes rotations of the gear arrangement and the work output member.

37. The heat engine of claim 36, wherein the driving gear member is further operatively coupled to a spring guiding rod by a movable fastening mechanism and wherein the spring guiding rod is fixedly connected to the second fixed flange member.

38. The heat engine of claim 35, wherein the drive arrangement comprises:
   a movable flange member provided between the first and second fixed flange members and adapted to movably secure a second end of each of the plurality of actuator bands thereto; and
   a chain and sprocket arrangement operatively coupled to a gear arrangement for rotating the work output member, the chain and sprocket arrangement including a chain member adapted to be:
   rotatably supported on a sprocket supported on the second fixed flange member;
   connected at one end to the movable flange by a fastening rod;
   connected at the other end to a spring guiding rod; and
   wherein the spring rod is fixedly coupled to the second fixed flange member.

39. The heat engine of claim 1, wherein the chassis includes a plurality of sections and wherein the operating mechanism includes:
   a heat exchanger section disposed in one of the plurality of sections and adapted to receive a heated working fluid for heating a first flow of ambient air therein;
   a fan assembly having an ambient air inlet to receive a second flow of ambient air therein, the fan assembly being adapted to direct the heated first flow ambient air towards one of the first actuator band array and the second actuator band array and the second flow of ambient air to the other one of the first actuator band array and the second actuator band array via an airflow control valve, and wherein
   the airflow control valve is operable to control the direction of flow of each of the heated first flow of ambient air and the second flow of ambient air to one of the first actuator band array and the second actuator band array.

40. The heat engine of claim 39, wherein the operating mechanism includes a drive assembly adapted to operatively connect the work output member to the first actuator band array and the second actuator band array, the drive assembly comprising:
   a first movable mounting structure and a second movable mounting structure supported on the chassis and adapted to movably connect to the first actuator band array and the second actuator band array, respectively;
   a first driving bar and a second driving bar connected to the first movable mounting structure and the second movable mounting structure, respectively; and
   a first weighted bar and a second weighted bar connected to the first driving bar and the second driving bar, respectively, and
   wherein the first and second driving bars and the first and second weighted bars rotatably engage the work output member and are adapted to allow rotation of the work output member in response to the displacement of each of the first actuator band array and the second actuator band array in response to heat exposure.

41. A power generation system comprising:
   an electric power generation system adapted to generate electrical power; and
   a heat engine operatively coupled to the electric power generation system, the heat engine comprising:
      a chassis for supporting one or more heat engine components;
      a work output member supported on the chassis and adapted to generate and output mechanical power to the electric power generation system; and an operating mechanism coupled to and adapted to operate the work output member for generating the mechanical power, the operating mechanism including:
- a first actuator band array operatively connected to a first end of a linear rack gear and adapted to linearly displace the linear rack gear in a first direction in response to heat exposure;
- a second actuator band array operatively connected to a second end of the linear rack gear and adapted to linearly displace the linear rack gear in a second direction in response to heat exposure, the second direction being opposite to the first direction; and
- a heat switching mechanism operable to alternately expose the first actuator band array and the second actuator band array to heat, thereby causing reciprocal linear displacement of the linear rack gear in the first and second directions;
- wherein the linear rack gear is operatively connected to the work output member, and wherein the reciprocal linear displacement of the linear rack gear causes cyclic displacement of the work output member for generating the mechanical power.

* * * * *